(12) United States Patent
Ryu

(10) Patent No.: US 9,613,591 B2
(45) Date of Patent: Apr. 4, 2017

(54) METHOD FOR REMOVING IMAGE STICKING IN DISPLAY DEVICE

(71) Applicant: LG ELECTRONICS INC., Seoul (KR)

(72) Inventor: Seunghak Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/730,412

(22) Filed: Jun. 4, 2015

(65) Prior Publication Data

US 2016/0063954 A1 Mar. 3, 2016

(30) Foreign Application Priority Data

Aug. 29, 2014 (KR) .................. 10-2014-0114130
Feb. 27, 2015 (KR) .................. 10-2015-0027799

(51) Int. Cl.
| | | |
|---|---|---|
| *G09G 5/00* | (2006.01) | |
| *G09G 5/10* | (2006.01) | |
| *G09G 3/20* | (2006.01) | |
| *G09G 3/32* | (2016.01) | |
| *G09G 3/28* | (2013.01) | |
| *G06F 3/048* | (2013.01) | |
| *G06F 3/14* | (2006.01) | |
| *G06F 3/0484* | (2013.01) | |
| *G06T 1/60* | (2006.01) | |

(Continued)

(52) U.S. Cl.
CPC ........... *G09G 5/10* (2013.01); *G06F 3/04847* (2013.01); *G06F 3/1454* (2013.01); *G06T 1/60* (2013.01); *G09G 3/20* (2013.01); *G09G 5/003* (2013.01); *G09G 5/02* (2013.01); *H04N 7/18* (2013.01); *G09G 2320/0271* (2013.01); *G09G 2320/046* (2013.01); *G09G 2320/0606* (2013.01); *G09G 2320/0686* (2013.01); *G09G 2370/02* (2013.01); *G09G 2370/16* (2013.01)

(58) Field of Classification Search
CPC combination set(s) only.
See application file for complete search history.

(56) References Cited

U.S. PATENT DOCUMENTS

2006/0072025 A1* 4/2006 Kakumoto ........... H04N 5/3653
348/308
2007/0146237 A1* 6/2007 Lee ....................... G09G 5/003
345/42

(Continued)

FOREIGN PATENT DOCUMENTS

| EP | 1 746 570 A1 | 1/2007 |
| EP | 2 579 142 | 4/2013 |

OTHER PUBLICATIONS

European Search Report dated Jan. 25, 2016 issued in Application No. 15174895.1.

*Primary Examiner* — Wesner Sajous
(74) *Attorney, Agent, or Firm* — Ked & Associates, LLP

(57) ABSTRACT

A method for remove image sticking in a display device is disclosed. Herein, the display device includes a display unit, and a controller, and the controller may be configured to execute an application for removing image sticking, to control the display unit to display a specific screen, to detect an image sticking area from the specific screen, and to adjust a luminance of the display unit corresponding to a surrounding area of a detected image sticking area.

20 Claims, 48 Drawing Sheets

(51) Int. Cl.
*G09G 5/02* (2006.01)
*H04N 7/18* (2006.01)

(56) References Cited

U.S. PATENT DOCUMENTS

| | | | |
|---|---|---|---|
| 2009/0225107 A1* | 9/2009 | Nose | G09G 3/3611 345/697 |
| 2010/0007656 A1 | 1/2010 | Okamoto et al. | |
| 2012/0113084 A1* | 5/2012 | Yang | G09G 3/3655 345/212 |
| 2013/0169663 A1* | 7/2013 | Seong | G09G 5/00 345/589 |
| 2013/0182001 A1* | 7/2013 | Hwang | G06T 11/00 345/581 |
| 2013/0257884 A1 | 10/2013 | Koh et al. | |
| 2014/0092070 A1* | 4/2014 | Kim | G09G 3/3614 345/209 |

* cited by examiner

METHOD FOR REMOVING IMAGE STICKING IN DISPLAY DEVICE

CROSS-REFERENCE TO RELATED APPLICATION(S)

Pursuant to 35 U.S.C. §119(a), this application claims the benefit of the Korean Patent Application Nos. 10-2014-0114130, filed on Aug. 29, 2014, and 10-2015-0027799, filed on Feb. 27, 2015, whose entire disclosures are hereby incorporated by reference as if fully set forth herein.

BACKGROUND

1. Field

The present disclosure relates to a display device and a method for removing an image sticking in a display device.

2. Background

Flat display devices, such as Liquid Crystal Displays (LCDs), Plasma Display Panels (PDPs), Organic Light Emitting Diode (OLED) display devices, are mostly being used as display devices.

Most particularly, display devices including OLED, which has advantages of high luminance and low power consumption, and which is not required to be equipped with a separate backlight unit, have recently been broadly used. Most particularly, in case of such display devices including OLED, the core objective is to prevent image sticking (also referred to as image retention or after-image) from occurring.

FIG. 1 illustrates problems occurring in a display device including OLED. More specifically, (a) of FIG. 1 illustrates a TV 10, which is given as an example of the display device, and (b) of FIG. 1 illustrates a mobile phone 20, which is given as an example of the display device.

Referring to FIG. 1, it may be verified that an afterimage 11 and 22 respectively occurs in display screens of each display device 10 and 20. Herein, an afterimage is generated due to a deterioration of the OLED, which is included in the display device 10 and 20, and, unless the corresponding OLED is physically replaced, such afterimage may correspond to irremovable image sticking (or image retention). Although a number of algorithms for preventing such image sticking 11 and 22 from being generated has been introduced in the past, such algorithms merely decelerate the generation of image sticking caused by the deterioration of the device, and problems still remain in that the generated image sticking cannot be removed.

SUMMARY OF THE DISCLOSURE

Accordingly, the present disclosure is directed to a method for removing image sticking in a display device that substantially obviates one or more problems due to limitations and disadvantages of the related art.

An object of the present disclosure is to provide a method for removing image sticking that can remove image sticking generated on a screen (or display screen) of a display unit.

Another object of the present disclosure is to provide a method for removing image sticking that can allow a user to remove the image sticking generated on the display screen of the display unit while verifying the process with his (or her) own eyes.

A further object of the present disclosure is to provide a method for removing image sticking that can receive an image including an image sticking generated on the display screen of the display unit from another device, and that can remove the image sticking by using the received image.

The technical objects of the present disclosure will not be limited only to the objects described above. Accordingly, technical objects that have not been mentioned above or additional technical objects of the present application may become apparent to those having ordinary skill in the art from the description presented below.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, according to an exemplary embodiment of the present disclosure, a display device includes a display unit, and a controller, wherein the controller may be configured to execute an application for removing image sticking, to control the display unit so as to display a specific display screen, to detect an image sticking area from the specific display screen, and to adjust a luminance of the display unit corresponding to a surrounding area of a detected image sticking area.

According to another exemplary embodiment of the present disclosure, a display device includes a network interface unit configured to establish wireless communication with an external device, a display unit, and a controller, wherein the controller may be configured to control the network interface unit so as to establish wireless communication with a specific external device, to execute an application for removing image sticking in accordance with a predetermined condition, to control the display unit so as to display a specific display screen, to control the network interface unit so as to receive information related to an image corresponding to the specific display screen from the specific external device, the specific external device establishing wireless communication with the network interface unit, to detect an image sticking area from the specific display screen based upon the received information related to the image, and to adjust a luminance of the display unit corresponding to a surrounding area of the detected image sticking area.

According to yet another exemplary embodiment of the present disclosure, a display device includes a wireless communication unit configured to establish wireless communication with an external device, a camera, a display unit, and a controller, wherein the controller may be configured to execute an application for removing image sticking of an external device, to control the wireless communication unit so as to establish wireless communication with a specific external device, to activate the camera, to acquire an image by using the activated camera, when an image capture command is detected, and to control the wireless communication unit so as to transmit information related to the acquired image to the specific external device being connected via wireless communication.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The embodiments will be described in detail with reference to the following drawings in which like reference numerals refer to like elements wherein.

DETAILED DESCRIPTION

Figure 1:
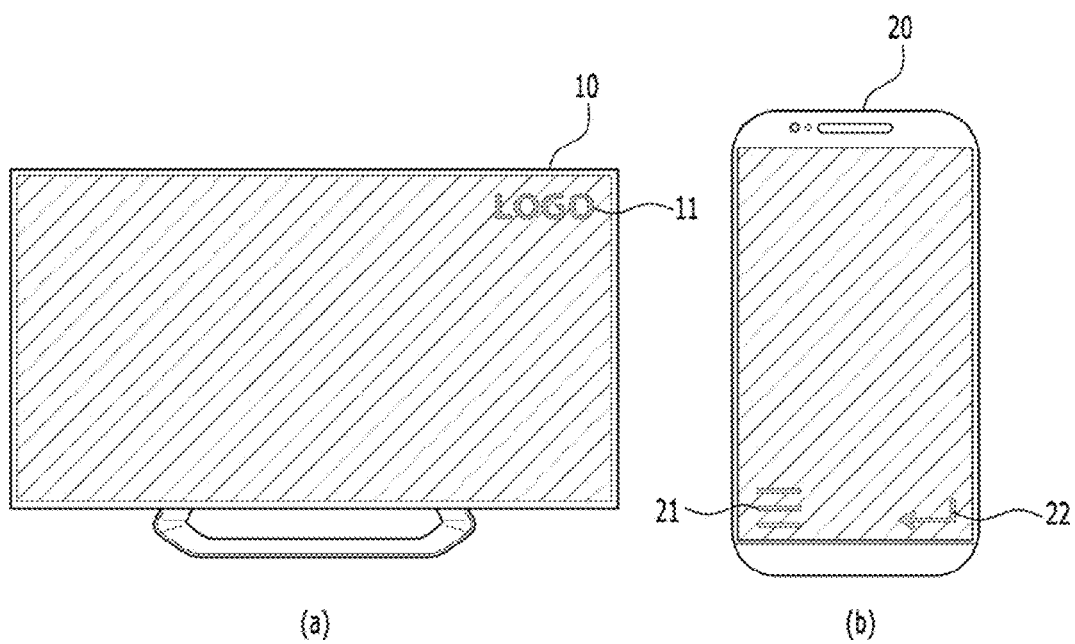
FIG. 1 illustrates problems occurring in a display device including OLED.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In this application, the terms "include(s)" or "have (or has)" are merely used to indicate the presence of a characteristic, number, step, operation, element, assembly part, or a combination of at least two or more of the above, which are mentioned in the description of the present disclosure. And, therefore, it should be understood that the presence or possibility of additionally including one or more of other characteristics, numbers, steps, operations, elements, assembly parts, or combinations of the above will not be excluded in advance.

A display device from which image sticking is to be removed, which is described in this specification, may corresponds to a TV being equipped with a display unit including light-emitting diodes, a smart TV, a Network TV, a Hybrid Broadcast Broadband TV (HBBTV), an Internet TV, a web TV, an Internet Protocol Television (IPTV), digital signage, a Personal Computer (PC) (or desktop computer), a Smart Phone, a Laptop computer (or notebook computer), a user equipment for digital broadcasting, a Personal Digital Assistant (PDA), a portable multimedia player (PMP), a navigation system (or navigator), a slate PC, a Tablet PC, an ultrabook, a wearable device (e.g., a smart watch, a smart glass, a head mounted display (HMD), and so on), and so on. Additionally, the display device may be implemented as a Plasma Display Panel (PDP), a Liquid Crystal Display (LCD), an Organic Light-Emitting Diode (OLED), a quantum dot (QD) display, a QD LED display, and so on.

Figure 2:
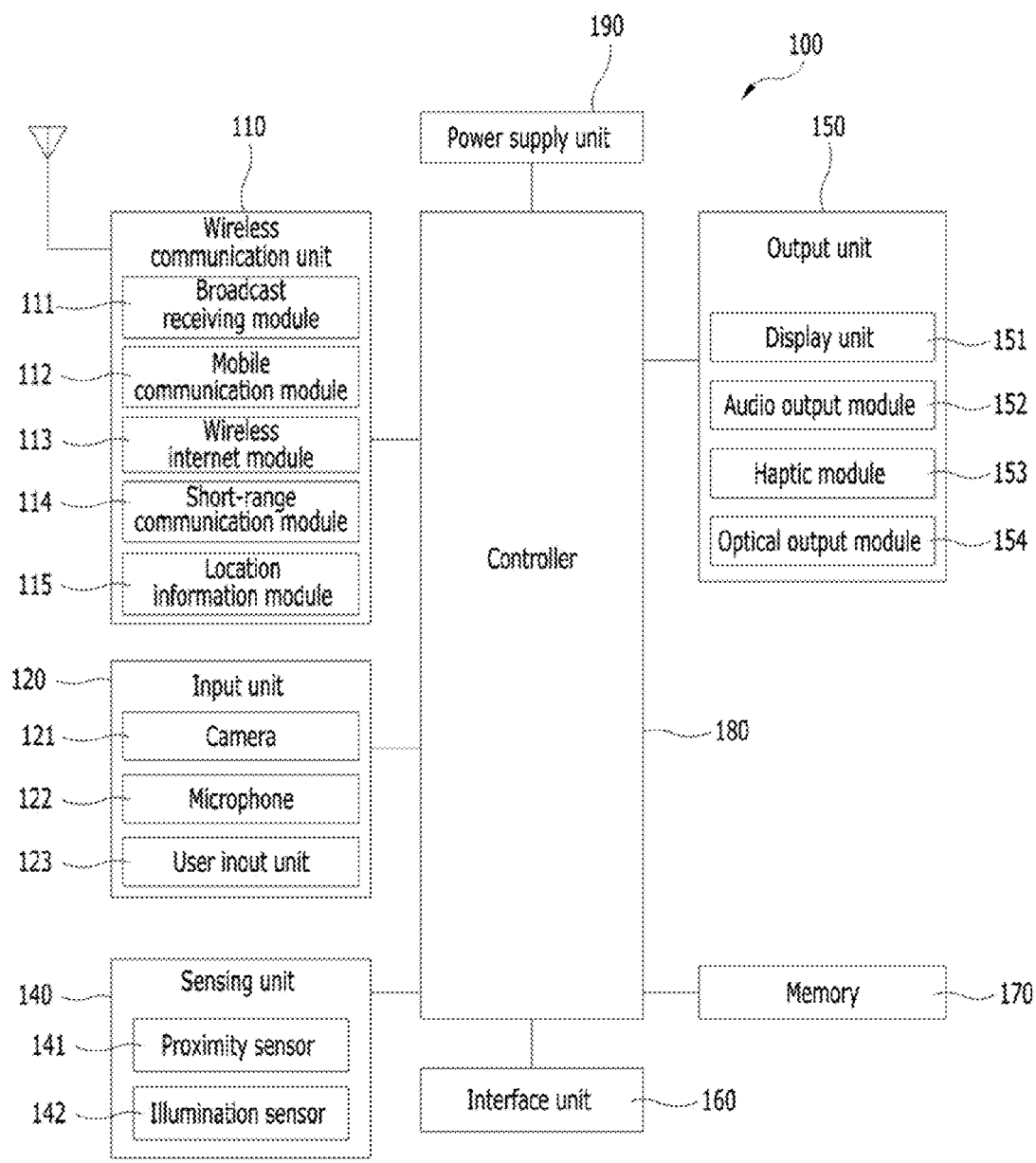
FIG. 2 illustrates a mobile terminal being given as an example of the display device.

FIG. 2 illustrates mobile terminal being given as an example of the display device.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 2, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 2, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 2, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 2, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast receiving module 111 may communicate with a system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 3:
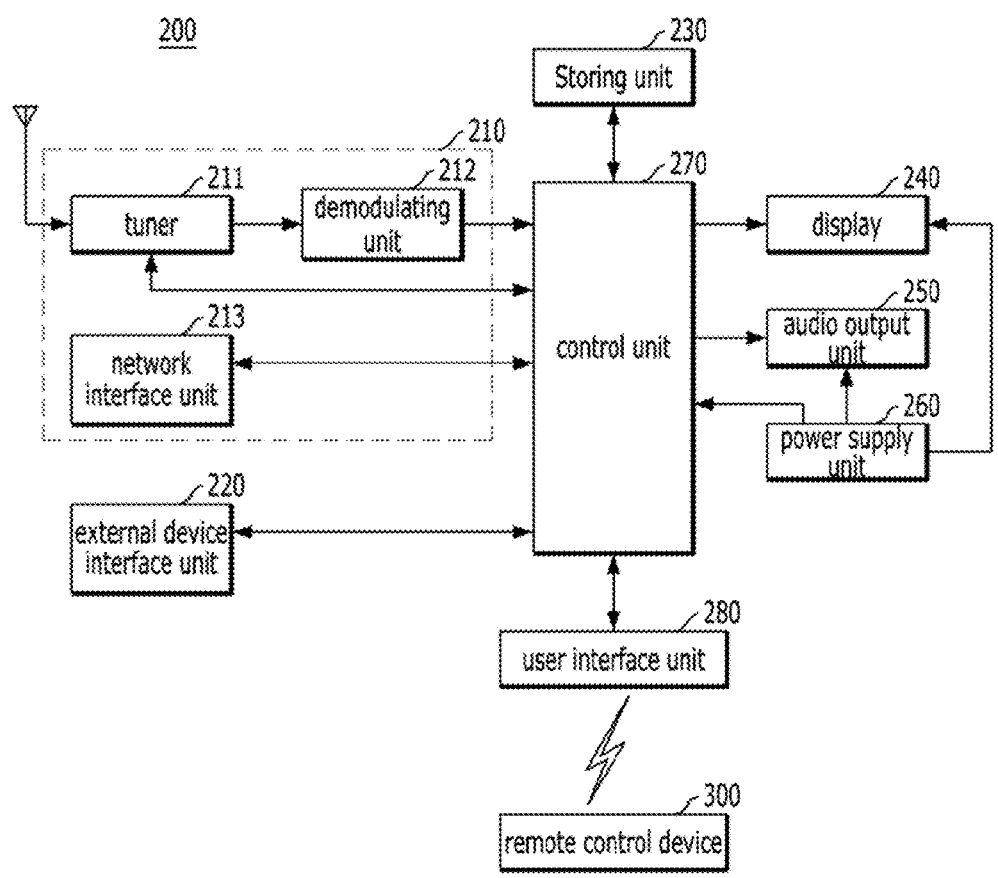
FIG. 3 illustrates a multimedia device being given as another example of the display device.

FIG. 3 illustrates a multimedia device being given as another example of the display device.

Referring to FIG. 3, a multimedia device 200 according to an embodiment of the present disclosure may include a broadcast receiving unit 210, an external device interface 220, a storage unit 230, a user input interface 280, a controller 270, a display unit 240, an audio output unit 250, a power supply unit 260, and a photographing unit. The broadcast receiving unit 205 may include at least one of one or more tuner 211, a demodulator 212, and a network interface 213. The broadcast receiving unit 210 may include the tuner 211 and the demodulator 212 without the network interface 213, or may include the network interface 213 without the tuner 211 and the demodulator 212. The broadcast receiving unit 210 may include a multiplexer to multiplex a signal, which is subjected to the tuner 211 and demodulated by the demodulator 212, and a signal received through the network interface 213. In addition, the broadcast receiving unit 210 can include a demultiplexer and demultiplex a multiplexed signal, a demodulated signal, or a signal received through the network interface 213.

The tuner 211 may receive a radio frequency (RF) broadcast signal by tuning to a channel selected by the user from among RF broadcast signals received through an antenna or all previously stored channels. The demodulator 212 may receive a digital IF (Intermediate Frequency) signal (DIF) converted by the tuner 211 and demodulate the DIF signal. A stream signal output from the demodulator 212 may be input to the controller 270. The controller 270 can control demultiplexing, audio/video signal processing, etc. Furthermore, the controller 270 can control output of an image through the display unit 240 and output of audio through the audio output unit 250.

The external device interface 220 may provide an environment for interfacing external devices with the multimedia device 200. To implement this, the external device interface 220 may include an NV input/output unit or an RF communication unit. The external device interface 220 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The multimedia device 200 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface unit 213 provides an interface for establishing connection between the multimedia device 200 with a wired/wireless network including an internet. For example, the network interface unit 213 may be equipped with an Ethernet terminal, and so on, in order to access a wired network, and the network interface unit 213 may use Wireless LAN (WLAN) (or Wi-Fi), Wireless broadband (Wibro), World Interoperability for Microwave Access (Wimax), High Speed Downlink Packet Access (HSDPA), Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, Wireless Universal Serial Bus (USB), and so on, in order to access a wireless network.

The network interface unit 213 may transmit or receive data to or from another user or another digital device through the accessed network or through another network being linked to the accessed network. Most particularly, among other users or other digital devices being registered to the multimedia device 200 in advance, a portion of content data, which are stored in the multimedia device 200, may be transmitted to a selected user or a selected digital device.

Meanwhile, the network interface unit 213 may access a predetermined web page through the accessed network or through another network being linked to the accessed network. More specifically, by accessing a predetermined web page through the network, the network interface unit 213 may transmit data to the corresponding server or may receive data from the corresponding server. Additionally, the network interface unit 213 may also receive content or data being provided by content providers or network operators (or managers). More specifically, the network interface unit 213 may receive movies, advertisements, games, Video On Demand (VOD), broadcast signals, and so on, and the related information, which are all provided by content providers or network providers, through the network. Furthermore, the network interface unit 213 may also receive update information and update files for firmware being provided by a network manager. And, finally, the network interface unit 213 may also transmit data through the internet or to content providers or network managers.

The network interface 213 can selectively receive a desired application from among publicly open applications through a network.

The storage unit 230 may store programs for signal processing and control and store a processed video, audio or data signal. In addition, the storage unit 230 may execute a function of temporarily storing a video, audio or data signal input from the external device interface 220 or the network interface 213. The storage unit 230 may store information about a predetermined broadcast channel through a channel memory function.

The storage unit 230 can store an application or a list of applications input from the external device interface 220 or the network interface 213. The storage unit 230 may store various platforms which will be described later. The storage unit 230 can include storage media of one or more types, such as a flash memory type, a hard disk type, a multimedia card micro type, a card type memory (e.g. SD or XD memory), RAM, EEPROM, etc. The multimedia device 200 may reproduce content files (a video file, a still image file, a music file, a text file, an application file, etc.) and provide them to the user.

While FIG. 3 illustrates an embodiment in which the storage unit 230 is separated from the controller 270, the configuration of the multimedia device 200 is not limited thereto and the storage unit 230 may be included in the controller 270. The user input interface 280 may transmit a signal input by the user to the controller 270 or deliver a signal output from the controller 270 to the user.

For example, the user input interface 280 can receive control signals such as a power on/off signal, a channel selection signal, an image setting signal, etc. from the remote controller 300 or transmit control signals of the controller 270 to the remote controller 300 according to various communication schemes such as RF communication, IR communication, and the like.

The user input interface 280 can transmit control signals input through a power key, a channel key, a volume key, and a local key of a set value to the controller 270. The user input interface 280 can transmit a control signal input from a sensing unit which senses a gesture of the user or deliver a signal of the controller 270 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 270 can generate and output a signal for video or audio output by demultiplexing streams input through the tuner 211, the demodulator 212 or the external device interface 220 or processing demultiplexed signals. A video signal processed by the controller 270 can be input to the display unit 240 and displayed as an image through the display unit 240. In addition, the video signal processed by the controller 270 can be input to an external output device through the external device interface 220.

An audio signal processed by the controller 270 can be applied to the audio output unit 250. Otherwise, the audio signal processed by the controller 270 can be applied to an external output device through the external device interface 220. The controller 270 may include a demultiplexer and an image processor, which are not shown in FIG. 3.

The controller 270 can control the overall operation of the multimedia device 200. For example, the controller 270 can control the tuner 211 to tune to an RF broadcast corresponding to a channel selected by the user or a previously stored channel. The controller 270 can control the multimedia device 200 according to a user command input through the user input interface 280 or an internal program. Particularly, the controller 270 can control the multimedia device 200 to be linked to a network to download an application or application list that the user desires to the multimedia device 200.

For example, the controller 270 may control the tuner 211 to receive a signal of a channel selected in response to a predetermined channel selection command received through the user input interface 280. In addition, the controller 270 may process a video, audio or data signal corresponding to the selected channel. The controller 270 may control information on a channel selected by the user to be output with a processed video or audio signal through the display unit 240 or the audio output unit 250.

Alternatively, the controller 270 may control a video signal or an audio signal received from an external apparatus, for example, a camera or a camcorder through the external device interface 220 to be output through the display unit 240 or the audio output unit 250 according to an external device image reproduction command received through the user input interface 280.

The controller 270 can control the display unit 240 to display images. For example, the controller 270 can control a broadcast image input through the tuner 211, an external input image received through the external device interface 220, an image input through the network interface 213, or an image stored in the storage unit 230 to be displayed on the display unit 240. Here, an image displayed on the display unit 240 can be a still image or video, and it can be a 2D or 3D image.

The controller 270 can control reproduction of content. Here, the content may be content stored in the multimedia device 200, received broadcast content, or content input from an external device. The content may include at least one of a broadcast image, an external input image, an audio file, a still image, an image of a linked web, and a text file.

The controller 270 can control display of applications or an application list, downloadable from the multimedia device 200 or an external network, when an application view menu is selected. The controller 270 can control installation and execution of applications downloaded from an external network in addition to various user interfaces. Furthermore, the controller 270 can control an image relating to an application executed by user selection to be displayed on the display unit 240.

The multimedia device 200 may further include a channel browsing processor which generates a thumbnail image corresponding to a channel signal or an external input signal. The channel browsing processor can receive a stream signal (e.g., TS) output from the demodulator 212 or a stream signal output from the external device interface 220 and extract an image from the received stream signal to generate a thumbnail image. The generated thumbnail image can be directly input to the controller 270 or can be encoded and then input to the controller 270. Also, the thumbnail image can be coded into a stream and then applied to the controller 270. The controller 270 can display a thumbnail list including a plurality of thumbnail images on the display unit 240 using thumbnail images input thereto. The thumbnail images included in the thumbnail list can be updated sequentially or simultaneously. Accordingly, the user can conveniently check content of a plurality of broadcast channels.

The display unit 240 may convert a video signal, a data signal, and an OSD signal processed by the controller 270 and a video signal and a data signal received from the external device interface 220 into RGB signals to generate driving signals. The display unit 240 may be a PDP, an LCD, an OLED, a flexible display, a 3D display or the like. The display unit 240 may be configured as a touch-screen and used as an input device rather than an output device. The audio output unit 250 receives a signal audio-processed by the controller 270, for example, a stereo signal, a 3.1 channel signal or a 5.1 channel signal, and outputs the received signal as audio. The audio output unit 250 can be configured as one of various speakers.

The multimedia device 200 may further include the sensing unit for sensing a gesture of the user, which includes at least one of a touch sensor, a voice sensor, a position sensor, and an action sensor, as described above. A signal sensed by the sensing unit can be delivered to the controller 270 through the user input interface 280. The multimedia device 200 may further include the photographing unit for photographing the user. Image information acquired by the photographing unit can be supplied to the controller 270. The controller 270 may sense a gesture of the user from an image captured by the photographing unit or a signal sensed by the sensing unit, or by combining the image and the signal.

The power supply unit 260 may supply power to the multimedia device 200. Particularly, the power supply unit 260 can supply power to the controller 270 which can be implemented as a system-on-chip (SoC), the display unit 240 for displaying images, and the audio output unit 485 for audio output.

The remote controller 300 may transmit user input to the user input interface 280. To achieve this, the remote controller 300 can use Bluetooth, RF communication, IR communication, UWB, ZigBee, etc. In addition, the remote controller 300 can receive audio, video or data signal output from the user input interface 280 and display the received signal or output the same as audio or vibration. Components of the multimedia device 200 in FIG. 3 can be integrated, added or omitted according to specifications thereof. That is, two or more components can be integrated into one component or one component can be subdivided into two or more components as required. The function executed by each component is exemplified to describe embodiments of the present disclosure and detailed operations or devices do not limit the scope of the present disclosure. Some of the components shown in FIG. 3 may be omitted or a component (not shown in FIG. 3) may be added as required. The multimedia device according to an embodiment of the present disclosure may not include the tuner and the demodulator, differently from the multimedia device shown in FIG. 3, and may receive content through the network interface or the external device interface and reproduce the content. The digital receiver is an example of image signal processors which process an image stored therein or an input image. Other examples of the image signal processors may include a set-top box (STB) which does not include the display unit 240 and the audio output unit 250 shown in FIG. 3, a DVD player, a Blu-ray player, a game device, a computer, etc.

Figure 4:
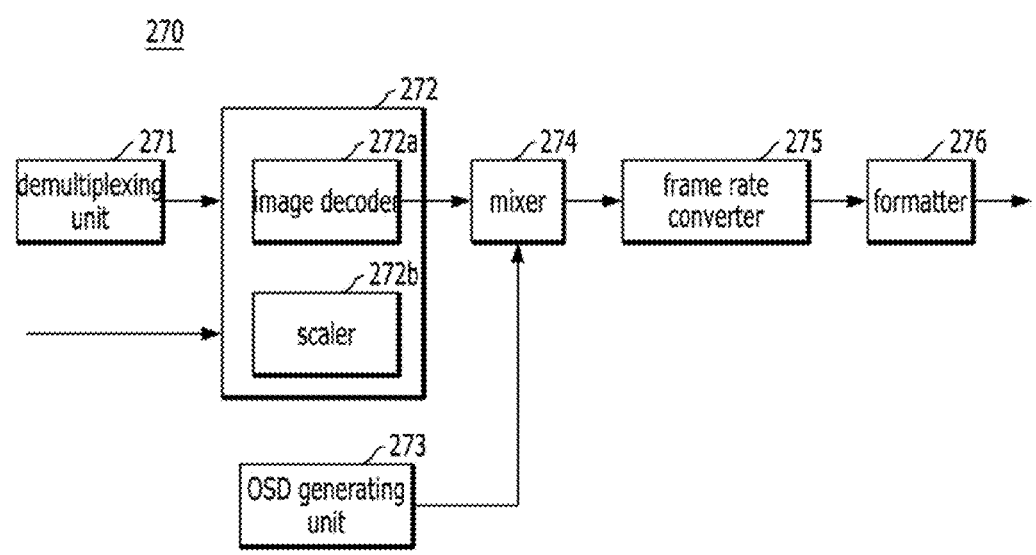
FIG. 4 illustrates a block view showing a detailed configuration of a controller shown in FIG. 3 according to an exemplary embodiment of the present disclosure.

FIG. 4 illustrates a block view showing a detailed configuration of a controller shown in FIG. 3 according to an exemplary embodiment of the present disclosure.

Particularly, FIG. 4 shows a configuration for implementing a 3D display device, which can be included in the configurations of FIG. 3. The multimedia device (especially, the controller 270) according to an embodiment of the present disclosure may include a demultiplexer 271, an image processor 272, an OSD generator 273, a mixer 274, a frame rate converter (FRC) 275, and a 3D formatter (or an Output formatter) 276.

The demultiplexer 271 can demultiplex an input stream signal into an MPEG-2 TS image, an audio signal and a data signal, for example. The image processor 272 can process a demultiplexed image signal using a video decoder 272a and a scaler 272b. The video decoder 272a can decode the demultiplexed image signal and the scaler 272b can scale the resolution of the decoded image signal such that the image signal can be displayed.

The image signal decoded by the image processor 272 may be input to the mixer 274. The OSD generator 273 may generate OSD data automatically or according to user input. For example, the OSD generator 273 may generate data to be displayed on the screen of an output unit in the form of an image or text based on a control signal of a user input interface. OSD data generated by the OSD generator 273 may include various data such as a user interface image of the multimedia device, various menu screens, widget, icons, and information on ratings. The OSD generator 273 can generate a caption of a broadcast image or data for displaying EPG based broadcast information.

The mixer 274 may mix the OSD data generated by the OSD generator 273 and the image signal processed by the image processor 272. The mixer 274 may provide the mixed signal to the 3D formatter 276. By mixing the decoded image signal and the OSD data, OSD may be overlaid on a broadcast image or external input image.

The frame rate converter (FRC) 275 may convert a frame rate of input video. For example, the frame rate converter 275 can convert the frame rate of an input 60 Hz video to a frame rate of 120 Hz or 240 Hz, according to an output frequency of the output unit. The frame rate converter 275 may be bypassed when frame conversion is not executed.

The 3D formatter 276 may change the output of the frame rate converter 275, which is input thereto, into a form suitable for the output format of the output unit. For example, the 3D formatter 276 can output an RGB data signal. In this instance, this RGB data signal can be output according to low voltage differential signaling (LVDS) or mini-LVDS. When a 3D image signal output from the frame rate converter 275 is input to the 3D formatter 276, the 3D formatter 276 can format the 3D image signal such that the 3D image signal is matched to the output format of the output unit, to thereby support a 3D service.

An audio processor may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Figure 5:
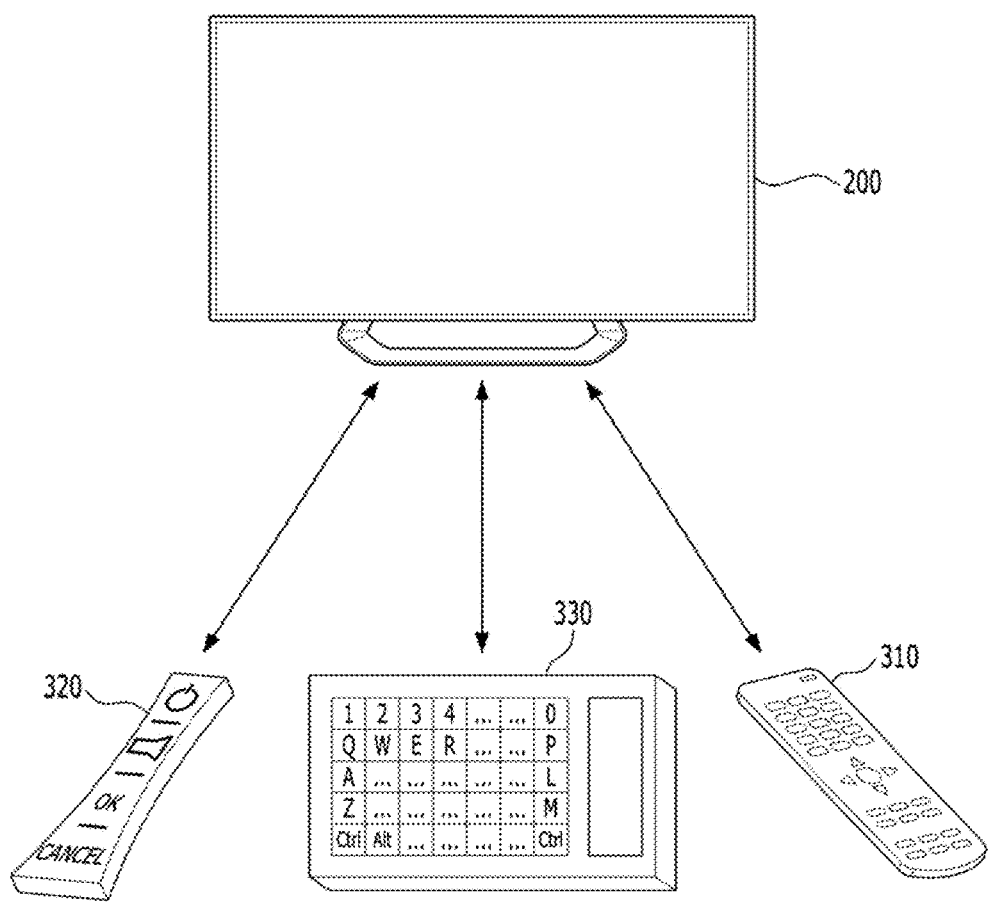
FIG. 5 illustrates examples of a remote controller for controlling the multimedia device according to the exemplary embodiment of the present disclosure.

FIG. 5 illustrates remote controllers of a multimedia device according to an embodiment of the present disclosure. To execute various operations for implementing the present disclosure according to embodiments, various user interface devices (UIDs) which can communicate with a multimedia device 200 in a wired/wireless manner can be used as remote controllers.

The remote controllers can use various communication protocols such as Bluetooth, RFID, IrDA, UWB, ZigBee, DLNA, etc. UIDs can include a mobile device (e.g., a smart phone, a tablet PC, and the like), a magic remote controller 320 and a remote controller 330 equipped with a keyboard and a touch pad in addition to a general remote controller 310.

The magic remote controller 320 may include a gyro sensor mounted therein to sense vibration of a user's hand or rotation. That is, the magic remote controller 320 can move a pointer according to up, down, left and right motions of the user such that the user can easily execute a desired action, for example, easily control a channel or a menu.

The remote controller 330 including the keyboard and touch pad can facilitate text input through the keyboard and control of movement of a pointer and magnification and reduction of a picture or video through the touch pad.

Hereinafter, a method for removing image sticking according to an exemplary embodiment of the present disclosure will be described in detail with reference to FIG. 6 to FIG. 48.

Figure 6:
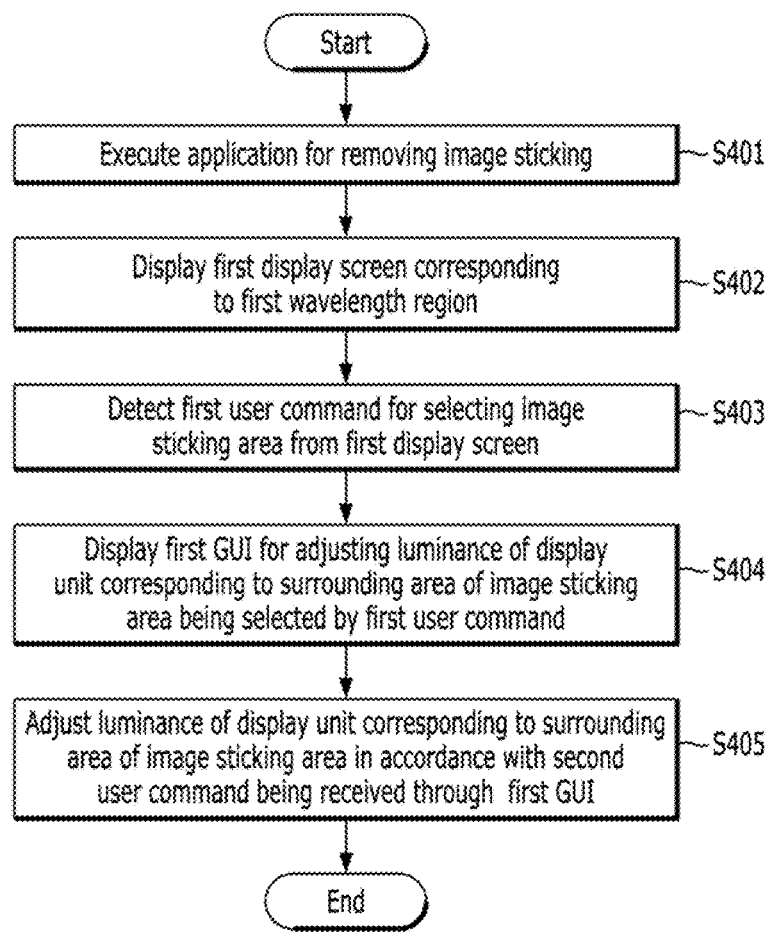
FIG. 6 illustrates a flow chart showing an exemplary method for removing image sticking in the display device according to the exemplary embodiment of the present disclosure.

FIG. 6 illustrates a flow chart showing an exemplary method for removing image sticking in the display device according to the exemplary embodiment of the present disclosure.

First of all, a case when the display device corresponds to the mobile device 100 shown in FIG. 2 will be given as an example as described below.

A controller 180 of the mobile terminal 100 executes an application for removing image sticking (S401). During the usage of the mobile terminal 100, in case an image sticking is shown on a display unit 151, the user may execute a menu for removing image sticking.

The controller 180 may display a first screen for removing image sticking on the display unit 151 (S402). The first screen may correspond to a screen respective to a first wavelength region among multiple wavelength regions being emitted from the display unit 151. For example, the display unit 151 may be configured by including at least one of a Blue light-emitting diode, a Red light-emitting diode, and a Green light-emitting diode, or the display unit 151 may also be configured by including at least one of a Blue light-emitting diode, a Red light-emitting diode, and a Green light-emitting diode and a White light-emitting diode. An image sticking removal process according to an exemplary embodiment of the present disclosure may be performed in accordance with a predetermined order with respect to each of the R/G/B/W light-emitting diodes, which are equipped to the display unit 151. And, alternatively, image sticking removal process according to an exemplary embodiment of the present disclosure may also be performed only with respect to the light-emitting diodes selected by the user, among the R/G/B/W light-emitting diodes, which are equipped to the display unit 151. For example, in case the image sticking, which is generated by the Blue light-emitting diode, is intended to be removed, the controller 180 deactivates the light-emitting diodes emitting light of other wavelength regions, and, then, the controller 180 may output the first screen, wherein only the Blue light-emitting diodes are activated, on the display unit 151.

The controller 180 detects a first user command selecting an image sticking area from the first screen (S403). The image sticking is generated due to a failure in an area of the display unit 151 (e.g., corresponding light-emitting diode) to display its luminance, which is caused by a deterioration in the corresponding diode. Accordingly, a level of image sticking that can be recognized (or noticed) by the user from an area (or section) of the first screen corresponding to the deteriorated light-emitting diode may be displayed. The first user command may correspond to a touch input, which is inputted through a touch screen, in case the display unit 151 is configured of a touch screen. In this case, the user may touch the area of the first screen, which is displayed on the display unit 151, having the image sticking displayed therein.

For example, the image sticking that is displayed on the display unit 151 of the mobile terminal 100 may correspond to a first indicator indicating reception sensitivity of a radio signal, a second indicator indicating remaining battery capacity, a third indicator indicating through which communication network and external server the radio signal is being transmitted and received, a fourth indicator indicating whether a notification mode notifying a generation of a specific event corresponds to a sound mode or a vibrating mode, a fifth indicator indicating the respective mobile communication service provider, and so on, which are displayed on a notification bar on an upper portion of the screen, and the image sticking may also correspond to a sixth indicator indicating a menu for entering a main Home screen, which is displayed on the lower portion of the screen, a seventh indicator indicating a menu for returning to a previous screen, an eighth indicator corresponding to a menu for verifying an application history listing applications that have been used within a predetermined period of time, and so on, which are display on a lower portion of the screen.

According to the exemplary embodiment, in case a trajectory (or path of contact) being displayed on the display unit 151 by the primary user command is not even due to shaking (or trembling) of the user's hand, the controller 180 may also apply a compensation algorithm (or correction algorithm).

According to the exemplary embodiment, indicator-related information being related to an indicator that can be outputted to the display unit 151 may be stored in the memory 170. Herein, the indicator-related information may include at least one of first information being related to a form of the indicator and second information being related to a location where the indicator is being displayed within the display screen of the display unit 151. Additionally, the controller 180 may output a GUI to the display unit 151, wherein the GUI includes indicators corresponding to the indicator-related information being stored in the memory 170. And, among the indicators included in the GUI, the indicator-related information being related to the indicators that are selected by the user command may be used for detecting the image sticking area. Alternatively, according to the exemplary embodiment, logo-related information being related to a channel logo or a program logo that can be viewed through the mobile terminal 100 may be stored in the memory 170, and the controller 180 may use the logo-related information of the logo, which is selected by the user, in order to detect the image sticking area.

The controller 180 displays a first GUI on the display unit 151, wherein the first GUI is configured to adjust a luminance (or brightness) of the display unit 151, which corresponds to a surrounding area of the image sticking area that is selected by the first user command (S404). Herein, the display unit 151 corresponding to the surrounding area of the image sticking area may refer only to an area of the display unit 151 corresponding to a boundary of the image sticking area or may also refer to an area of the display unit 151 corresponding to the surrounding area including the boundary of the image sticking area. The controller 180 detects the image sticking area, which is generated in the display unit 151, based upon the image sticking area that is selected by the first user command. Herein, in case an indicator selected by the user exists, the image sticking area may be detected by referring to the image sticking area selected by the first user command and the selected indicator-related information. Thereafter, the display unit 151 is controlled so as to display the first GUI, which is configured to adjust the luminance of the display unit 151 corresponding to the surrounding area of the detected image sticking area (e.g., luminance of the Blue light-emitting diode).

According to the exemplary embodiment, the first GUI may include an adjustment bar, which is configured to adjust the luminance of the display unit 151 corresponding to the surrounding area, and a movable indicator that can move within the adjustment bar. According to the exemplary embodiment, the first GUI may include a "+" menu icon and/or a "−" menu icon in order to adjust the luminance of the display unit 151 corresponding to the surrounding area.

Alternatively, according to the exemplary embodiment, the first GUI may include at least a first menu, which is configured to adjust the luminance of the display unit 151 corresponding to the surrounding area to a predetermined first level, and a second menu, which is configured to adjust the luminance of the display unit 151 corresponding to the surrounding area to a second level set to be lower than the first level.

In accordance with a second user command, which is received through the first GUI, the controller 180 adjusts a luminance of the display unit 151 corresponding to the surrounding area (S405). The second user command may include a user command, which is configured to move an indicator included in the first GUI within the adjustment bar, and the second user command may also include a user command configured to select at least one the "+" menu icon and/or the "−" menu icon included in the first GUI, and the second user command may also include a user command configured to select a first menu or a second menu included in the first GUI.

According to the exemplary embodiment, the controller 180 may adjust the luminance of the display unit 151 corresponding to a predetermined surrounding area of the detected image sticking area, and the controller 180 may also adjust the luminance of the display unit 151 corresponding to the remaining area excluding the detected image sticking area. Herein, since the image sticking should not be recognized by the eyes of the user, the adjustment of the luminance of the display unit 151 may refer to an adjustment of a gain value so that the luminance of the display unit 151 corresponding to the surrounding area of the image sticking area can become lower than its initially (or originally) determined level of luminance. For example, the gain value may refer to a value of Average Picture Level (APL) data being applied to the display unit 151 corresponding to the surrounding area of the image sticking area.

Thereafter, the controller 180 maps the gain value to the area of the display unit 151 corresponding to the surrounding area of the image sticking area and stores the mapped result to the memory 170.

The user may end the image sticking removal process, and the user may also re-perform the above-described process steps with respect to a second display screen. Among the light of diverse wavelength regions being emitted from the display unit 151, the second display screen may correspond to a display screen respective to a second wavelength region. For example, in case the display unit 151 is configured by including light-emitting diodes, the controller 180 may deactivate the light-emitting diodes that emit light of other wavelength regions and may output a second display screen, wherein only the Green light-emitting diodes are activated, on the display unit 151.

Meanwhile, an exemplary case when the display device corresponds to the multimedia device 200 shown in FIG. 3 will be described as follows. Description that overlaps with the description provided above on the exemplary case when the display device corresponds to the mobile terminal 100 will be omitted for simplicity.

A controller 270 of the multimedia device 200 executes an application for removing image sticking (S401). During the usage of the multimedia device 200, in case an image sticking is shown on a display unit 240, the user may execute a menu for removing image sticking.

The controller 270 may display a first screen for removing image sticking on the display unit 240 (S402). The first screen may correspond to a screen respective to a first wavelength region among multiple wavelength regions being emitted from the display unit 240. For example, in case the display unit 240 is configured by including light-emitting diodes, the display unit 240 may be configured by including at least one of a Blue light-emitting diode, a Red light-emitting diode, and a Green light-emitting diode, or the display unit 240 may also be configured by including at least one of a Blue light-emitting diode, a Red light-emitting diode, and a Green light-emitting diode and a White light-emitting diode. For example, in case image sticking that is generated by the Blue light-emitting diode, the controller 270 may deactivate the light-emitting diodes that emit light of other wavelength regions and may output a first display screen, wherein only the Blue light-emitting diodes are activated, on the display unit 240.

The controller 270 detects a first user command selecting the image sticking area from the first display screen (S403). The first user command may be transmitted from a remote controller 300, which is configured to control the multimedia device 200. The user may select the image sticking area through a pointer respective to movements of the remote controller 300 within the first display screen of the display unit 240.

For example, the image sticking area being generated on the display unit 240 of the multimedia device 200 may correspond to a logo of a channel that can be viewed through the multimedia device 200 or a logo of a program being transmitted through each channel.

According to the exemplary embodiment, logo-related information being related to a logo of a channel that can be viewed through the multimedia device 200 or a logo of a program being transmitted through each channel may be stored in the memory 230. Herein, the logo-related information may include at least one of first information being related to a form of the logo and second information being related to a location where the logo is being displayed within the display screen of the display unit 240. Additionally, the controller 270 may output a GUI to the display unit 240, wherein the GUI includes logos corresponding to the logo-related information being stored in the memory 230. And, among the logos included in the GUI, the logo-related information being related to the logos that are selected by the user command may be used for detecting the image sticking area. Alternatively, according to the exemplary embodiment, indicator-related information being related to an indicator that can be outputted to the display unit 240 may be stored in the memory 230. Herein, an indicator that can be outputted to the display unit 240 may refer to an indicator being indicated (or displayed on a notification bar or menu bar at an upper/lower portion of the display screen. And, the controller 270 may use the indicator-related information of the indicator, which is selected by the user, in order to detect the image sticking area.

The controller 270 displays a first GUI on the display unit 240, wherein the first GUI is configured to adjust a luminance (or brightness) of the display unit 240, which corresponds to a surrounding area of the image sticking area that is selected by the first user command (S404). Herein, the display unit 240 corresponding to the surrounding area of the image sticking area may refer only to an area of the display unit 240 corresponding to a boundary of the image sticking area or may also refer to an area of the display unit 240 corresponding to the surrounding area including the boundary of the image sticking area. The controller 270 detects the image sticking area, which is generated in the display unit 240, based upon the image sticking area that is selected by the first user command. Herein, in case a logo selected by the user exists, the image sticking area may be detected by referring to the image sticking area selected by the first user command and the selected logo-related information. Thereafter, the display unit 240 is controlled so as to display the first GUI, which is configured to adjust the luminance of the display unit 240 corresponding to the surrounding area of the detected image sticking area.

In accordance with a second user command, which is received through the first GUI, the controller 270 adjusts a luminance of the display unit 240 corresponding to the surrounding area (S405). Thereafter, the controller 270 maps the gain value to the area of the display unit 240 corresponding to the surrounding area of the image sticking area and stores the mapped result to the memory 230.

By giving a case when the display device, from which the image sticking is to be removed, corresponds to a multimedia device 200 as an example, the exemplary method for removing image sticking, which is described above with reference to FIG. 6, will hereinafter be described in detail with reference to FIG. 7 to FIG. 16.

Figure 7:
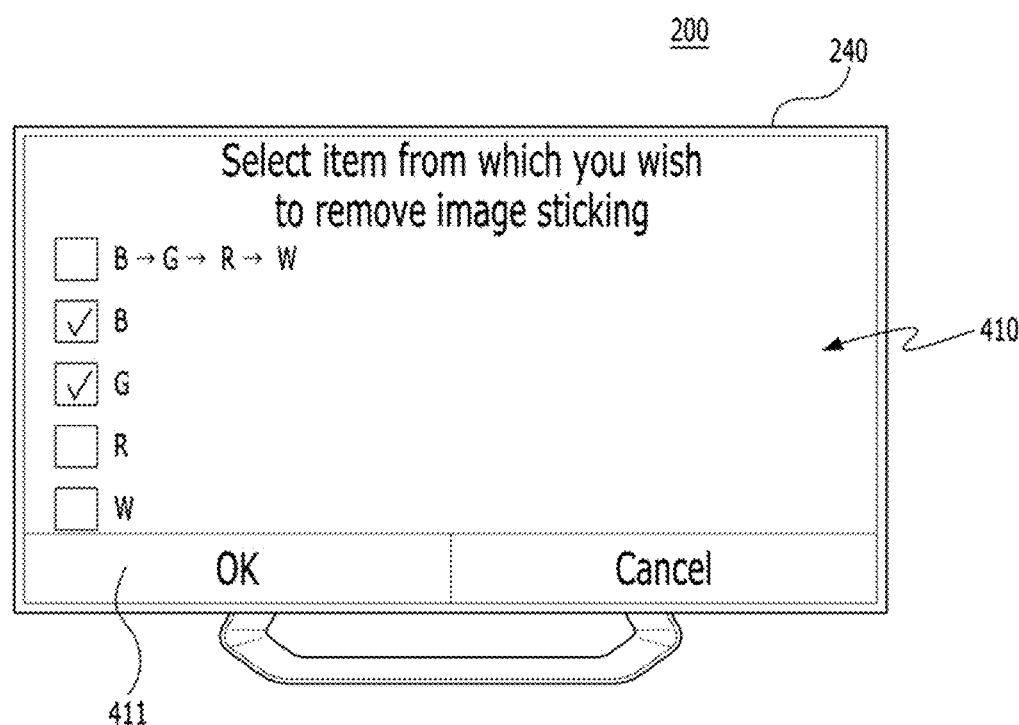
FIG. 7 illustrates an exemplary display screen being outputted to a display unit, in case an image sticking removal application is being executed in the multimedia device according to the exemplary embodiment of the present disclosure.

FIG. 7 illustrates an exemplary display screen being outputted to a display unit, in case an image sticking removal application is being executed in the multimedia device according to the exemplary embodiment of the present disclosure.

The controller 270 of the multimedia device 200 may execute an application for removing image sticking and may output its execution screen 410 to the display unit 240. While using the multimedia device 200, in case image sticking is displayed on the display unit 240, the user may execute a menu for removing the image sticking.

In this exemplary embodiment, it will be assumed that the display unit 240 is configured to include a Blue light-emitting diode, a Red light-emitting diode, a Green light-emitting diode, and a White light-emitting diode.

The image sticking removal process, which is performed by the application for removing the image sticking, may be performed in accordance with a predetermined order with respect to each of the R/G/B/W light-emitting diodes, which are equipped to the display unit 240. And, alternatively, image sticking removal process may also be performed only with respect to the light-emitting diodes selected by the user, among the R/G/B/W light-emitting diodes, which are equipped to the display unit 240. In this exemplary embodiment, it will be assumed that the image sticking removal process is performed by the user with respect to only the Blue light-emitting diode and the Green light-emitting diode.

Figure 8:
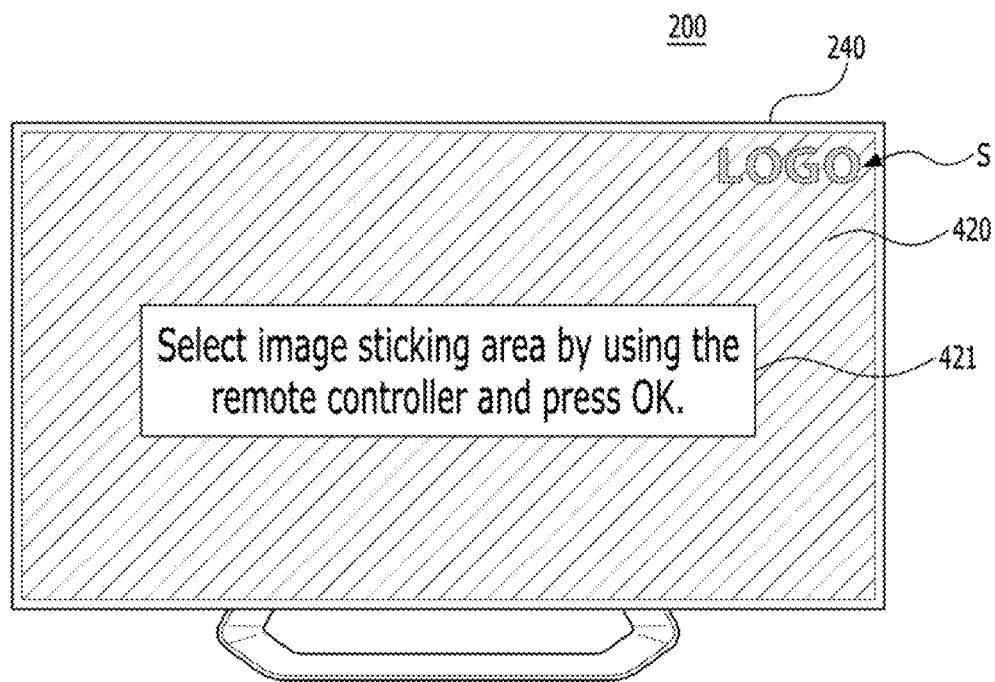
FIG. 8 illustrates an exemplary display screen being outputted to a display unit, in case an image sticking removal application is being executed in the multimedia device according to the exemplary embodiment of the present disclosure.

FIG. 8 illustrates an exemplary display screen being outputted to a display unit, in case an image sticking removal application is being executed in the multimedia device according to the exemplary embodiment of the present disclosure.

When the user select an OK menu 411 from the execution screen 410, which is shown in FIG. 7, the display screen of FIG. 8 may be outputted to the display unit 240. First of all, the image sticking removal process respective to the Blue light-emitting diode will be described in detail.

The controller 270 may output a first display screen 420 to the display unit 240. In the first display screen 420, a first light-emitting diode emitting light of a first wavelength region (e.g., Blue light-emitting diode) is activated, and light-emitting diodes respectively emitting light of the other wavelength regions (e.g., Green, Red, and White light-emitting diodes) are deactivated. In order to verify the image sticking that is generated by the first light-emitting diode, the first display screen 420 corresponding to when the first light-emitting diode is being activated is verified. In this exemplary embodiment, it is assumed that an image sticking S representing "LOGO" is generated on the first display screen 420.

The controller 270 may control the display unit 240 by using the remote controller 300 so that a guidance message 421, which is configured to guide the user to select the image sticking area, can be displayed on the first display screen 420. The user may select the image sticking area corresponding to the image sticking S by using the remote controller 300.

Figure 9:
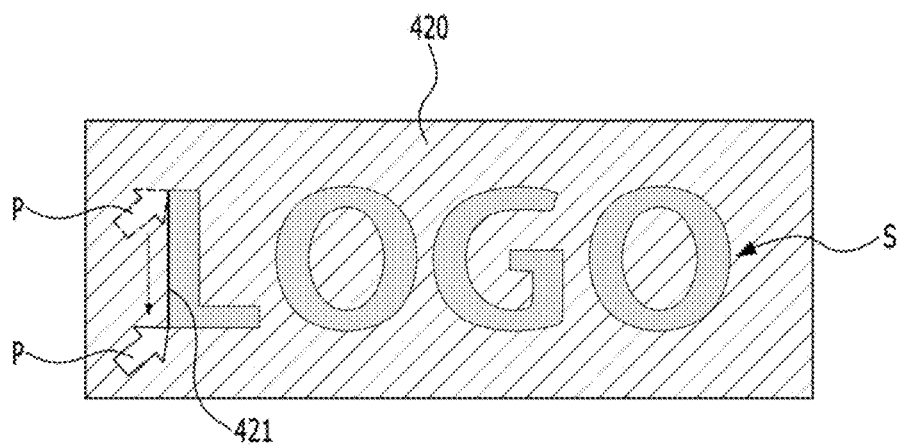
FIG. 9 illustrates an exemplary method for selecting an image sticking area by using a remote controller in the multimedia device according to the exemplary embodiment of the present disclosure.

FIG. 9 illustrates an exemplary method for selecting an image sticking area by using a remote controller in the multimedia device according to the exemplary embodiment of the present disclosure.

Referring to FIG. 9, the image sticking S part shown in the first display screen 420 is enlarged.

The user may select the image sticking area by using a pointer P corresponding to movements of the remote controller 300. For example, the image sticking area may be selected by having the pointer pass over the boundary (or edge) of the image sticking S while pressing on a specific button provided on the remote controller 300. According to the exemplary embodiment, a trajectory 421 corresponding to the movement of the pointer P may be displayed on the section where the pointer P has passed while the user is pressing on the specific button provided on the remote controller 300. According to the exemplary embodiment, in case the size of the image sticking S is excessively small to have its image sticking area selected by using the remote controller, the controller 270 may control the display unit 240 so that a display ratio of the first display screen 420 can be increased.

Alternatively, according to the exemplary embodiment, when increasing the display ratio of the first display screen 420, the controller 270 may control the display unit 240 so that the display unit 240 can display a grid pattern including multiple cells on the first display screen 420. Each of the cells may correspond to each image pixel configuring the first display screen 420, or, among the image pixels configuring the first display screen 420, each of the cells may correspond to two neighboring pixels or four neighboring pixels. By using the pointer P respective to the movements of the remote controller 300, the user may easily select the image sticking area by selecting the cells included in the grid pattern.

Alternatively, according to the exemplary embodiment, when increasing the display ratio of the first display screen 420, within the first display screen 420, the controller 270 may output a partially enlarged display screen, which displays an enlarged view of a partial area including a specific point where the pointer P is located, to the display unit 240, and the partially enlarged display screen may be outputted by being overlaid with the first display screen 420, which has its display ratio unchanged. Additionally, the partially enlarged display screen may have its position within the first display screen 420 changed in accordance with the movement of the pointer P.

Alternatively, according to the exemplary embodiment, when increasing the display ratio of the first display screen 420, the controller 270 may output a graphic image on the display unit 240, wherein the graphic image indicates which part of the entire first display screen 420 having the unchanged display ratio corresponds to the enlarged part of the first display screen 420 being displayed on the display unit 240. The graphic image may be outputted to the display unit 240 to overlay with the enlarged part of the first display screen 420, which is displayed on the display unit 240.

Figure 10:
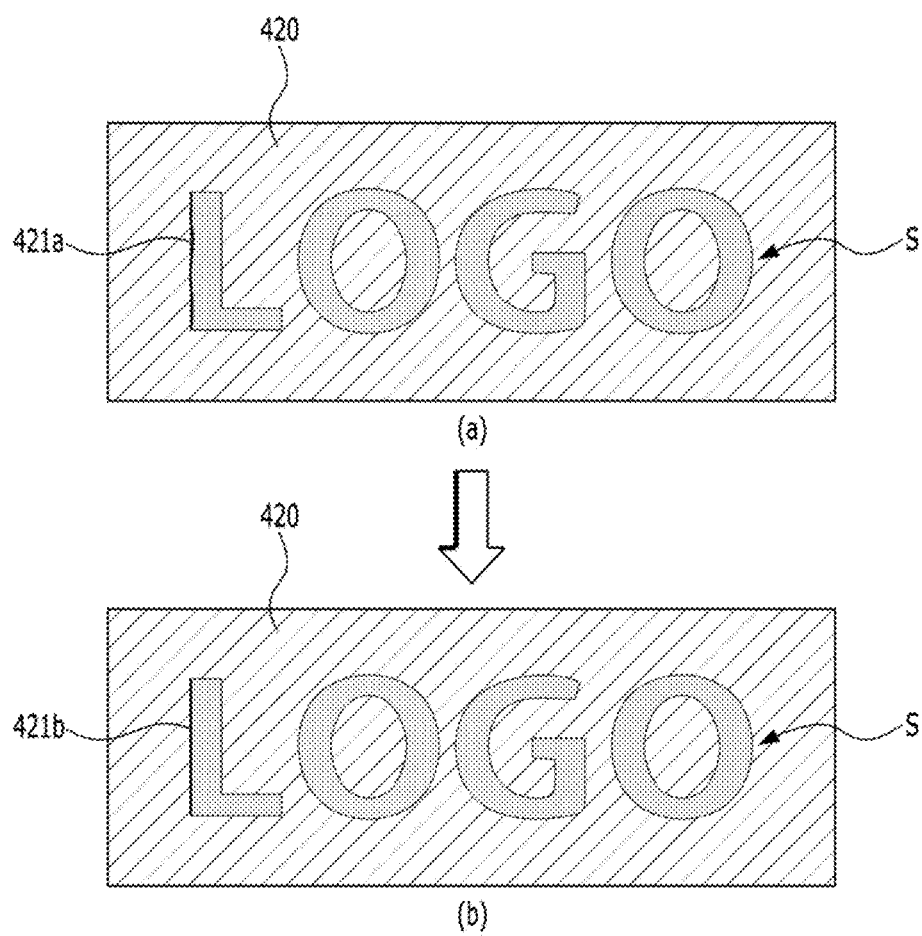
FIG. 10 illustrates another exemplary method for selecting an image sticking area by using a remote controller in the multimedia device according to the exemplary embodiment of the present disclosure.

FIG. 10 illustrates another exemplary method for selecting an image sticking area by using a remote controller in the multimedia device according to an exemplary embodiment of the present disclosure.

Referring to FIG. 10, the image sticking S part shown in the first display screen 420 is enlarged.

The user may select the image sticking area by using a pointer P corresponding to movements of the remote controller 300. However, in this case, due to the shaking (or trembling) of the user's hand(s), it may be difficult to select the image sticking area so that the actual image sticking S can be accurately reflected by using the remote controller 300.

In case the trajectory 421a that is displayed by the remote controller 300 is not even, as shown in (a) of FIG. 10, the controller 270 may correct the initial trajectory 421a to a new shape (or form) of trajectory 421b, as shown in (b) of FIG. 10, by applying a predetermined correction algorithm. For example, based upon the shape of the trajectory 421a, the controller 270 may determine the user's intention to move the pointer P downward along a straight line. Thereafter, the controller 270 may output a linear (or straight-lined) trajectory 421b, which connects the point where the pointer P is located at a time point when the specific button provided on the remote controller 300 is pressed and the point where the pointer P is located at a time point when the specific button is released, to the display unit 240.

Figure 11:
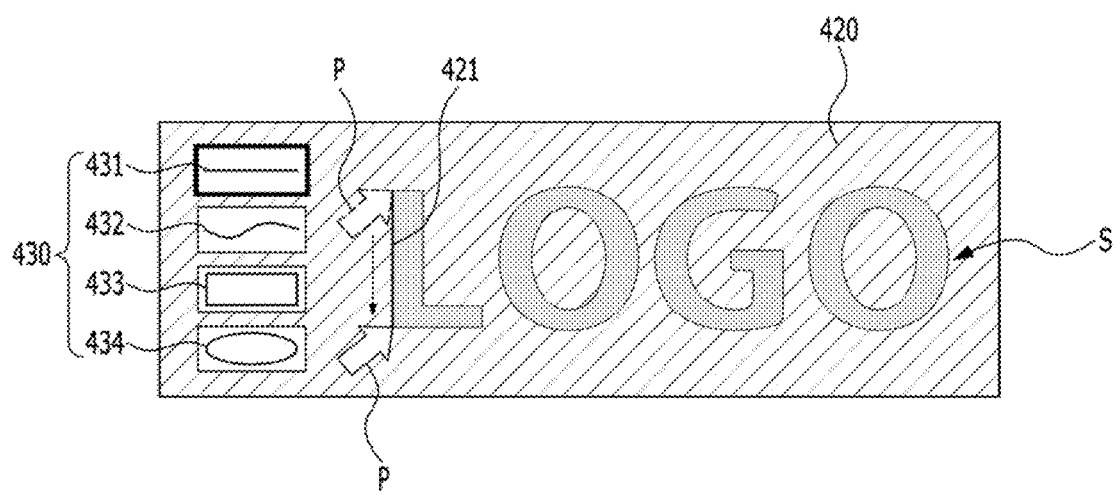
FIG. 11 illustrates yet another exemplary method for selecting an image sticking area by using a remote controller in the multimedia device according to the exemplary embodiment of the present disclosure.

FIG. 11 illustrates yet another exemplary method for selecting an image sticking area by using a remote controller in the multimedia device according to the exemplary embodiment of the present disclosure.

Referring to FIG. 11, the image sticking S part shown in the first display screen 420 is enlarged.

The user may select the image sticking area by using a pointer P corresponding to movements of the remote controller 300. However, in this case, due to the shaking (or trembling) of the user's hand(s), it may be difficult to select the image sticking area so that the actual image sticking S can be accurately reflected by using the remote controller 300.

In order to facilitate the process of selecting the image sticking by using the remote controller 300, a shape menu 430 that can be used by the user may be outputted to the display unit 240. For example, the shape menu 430 may include a first menu 431 corresponding to straight lines, a second menu 432 corresponding to curved lines, a third menu 433 corresponding to quadrangular shapes, a fourth menu 434 corresponding to circular shapes, and so on.

For example, the user may select the first menu 431 corresponding to straight lines by using the remote controller 300, and, while the first menu 431 is in an activated state, the user may select the image sticking area by using the pointer P corresponding to the movements of the remote controller 300.

As described above with reference to FIG. 9 to FIG. 11, when the user selects the OK button after user selecting the image sticking area by using the remote controller 300, the controller 270 may detect the image sticking area based upon this process.

Meanwhile, according to exemplary embodiment of the present disclosure, in detecting image sticking area from the first display screen 420, the controller 270 may use logo-related information of a logo, which is selected by the user. This will be described in detail with reference to FIG. 12.

Figure 12:
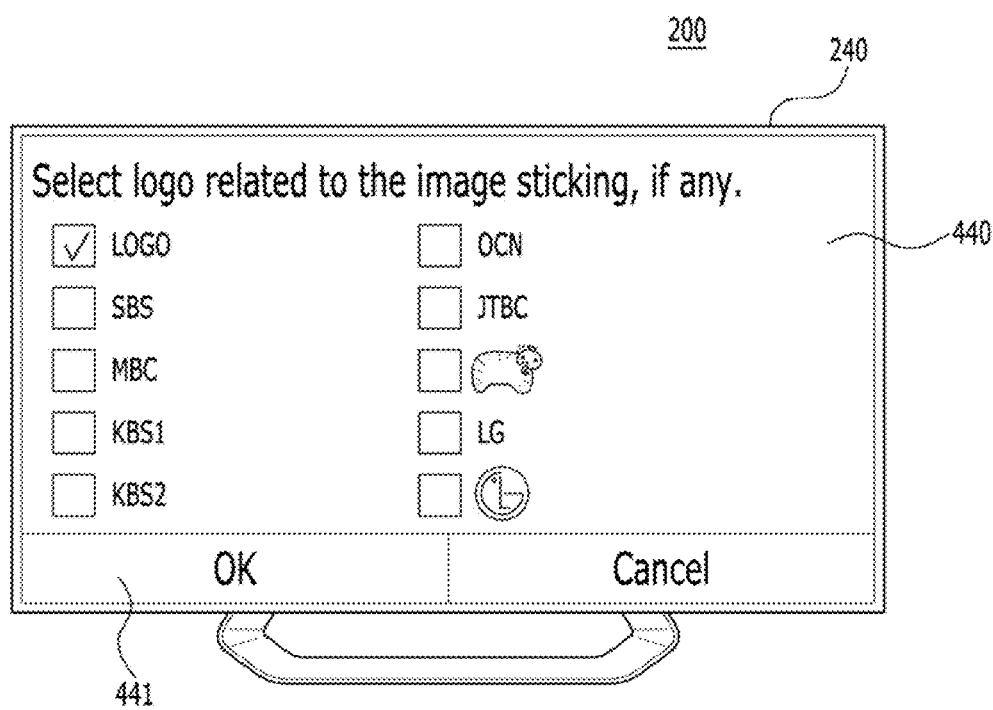
FIG. 12 illustrates an exemplary method for selecting a logo being related to an image sticking occurring (or being generated) in a display unit of the multimedia device according to the exemplary embodiment of the present disclosure.

FIG. 12 illustrates an exemplary method for selecting a logo being related to an image sticking occurring (or being generated) in a display unit of the multimedia device according to the exemplary embodiment of the present disclosure.

The memory 230 of the multimedia device 200 may store logo-related information being related to a logo of a channel that can be viewed through the multimedia device 200 or a logo of a program being transmitted through each channel. Herein, the logo-related information may include at least one of first information being related to a form (or shape) of the logo and second information being related to a location where the logo is being displayed within the display screen of the display unit 240. The second information may include coordinate information for indicating a specific location where the logo is located within the display screen of the display unit 240. For example, instead of including information indicating in which approximate area within the display screen of the display unit 240 the logo is located, the second information may include accurate coordinate information respective to an entire area being displayed as the corresponding logo.

Generally, in case of the same channel, since the logo of the corresponding broadcasting station is mostly displayed at the same location within the display screen, and since such logo is expressed as a still image that does not move, the light-emitting diode of the display unit 240 corresponding to the area where the logo is being displayed is more likely to become degraded (or deteriorated). Additionally, in case of the same program, since the logo of the corresponding program is mostly displayed at the same location within the display screen, and since such logo is expressed as a still image that does not move, an image sticking is highly likely to be generated due to the degradation of the corresponding light-emitting diode. Accordingly, logo-related information that is related to the logo of a specific channel and logo-related information that is related to the logo of a specific program are stored in the memory 230, and the controller 270 may detect the image sticking area by using the stored logo-related information.

Such logo-related information may be downloaded from an external server, and such logo-related information may also be periodically or aperiodically updated. According to the exemplary embodiment, in case logo-related information is included in EPG data of a broadcast signal, the controller 270 may acquire the logo-related information by parsing the EPG data.

The controller 270 may control the display unit 240 so that the display unit 240 can display a GUI 440, which includes logos corresponding to the logo-related information stored in the memory 230. The GUI 440 may be outputted after the image sticking area is selected by the remote controller 300, which is described above with reference to FIG. 8 to FIG. 11, or the GUI 440 may be outputted before the image sticking area is selected by the remote controller 300, or the GUI 440 may be outputted regardless of the selection of the image sticking area by using the remote controller 300.

The GUI 440 may include a list of all of the logos corresponding to the logo-related information stored in the memory 230. And, in case the image sticking area has already been selected by the remote controller 300, among all of the logos corresponding to the logo-related information stored in the memory 230, a list of logos listing only the logos that are determined to have similar forms (or shapes) and locations as the selected image sticking area.

Herein, it will be assumed that, among the logos included in the GUI 440, the user has selected "LOGO", which is related to the image sticking S, and that the user has selected the OK menu 441 afterwards. Then, the shape (or form) of "LOGO" and the location of "LOGO" within the display screen of the display unit 240 may be detected, based upon the logo-related information stored in the memory 230.

For example, in case the GUI 440 is being outputted before or after the image sticking area is selected by the remote controller 300, which is described above with reference to FIG. 8 to FIG. 11, the controller 270 may be capable of more accurately detecting the image sticking area corresponding to the image sticking S, which is generated in the first display screen 420, based upon the image sticking area selected by the remote controller 300 and the logo-related information stored in the memory 230. According to the exemplary embodiment, before outputting the GUI 440 to the display unit 240, the controller 270 may detect the image sticking area based upon the image sticking area, which is selected by the remote controller 300, and, then, the controller 270 may output the GUI including the information on the detected image sticking area to the display unit 240. For example, information on the detected image sticking area may correspond to information related to the detected image sticking area, among the logo-related information stored in the memory 230, and the information on the detected image sticking area may also correspond to information corresponding to letters (or characters), shapes, icons, logos, and so on. The GUI may include a guidance message for verifying whether or not the detected image sticking area coincides (or matches) with the image sticking that is seen by the user. As another example, even in case the GUI 440 has been outputted without any image sticking area selection performed by the remote controller 300, which is described above with reference to FIG. 8 to FIG. 11, the controller 270 may detect the image sticking area corresponding to the image sticking S, which is generated in the first display screen 420, based upon the logo-related information stored in the memory 230.

Figure 13:
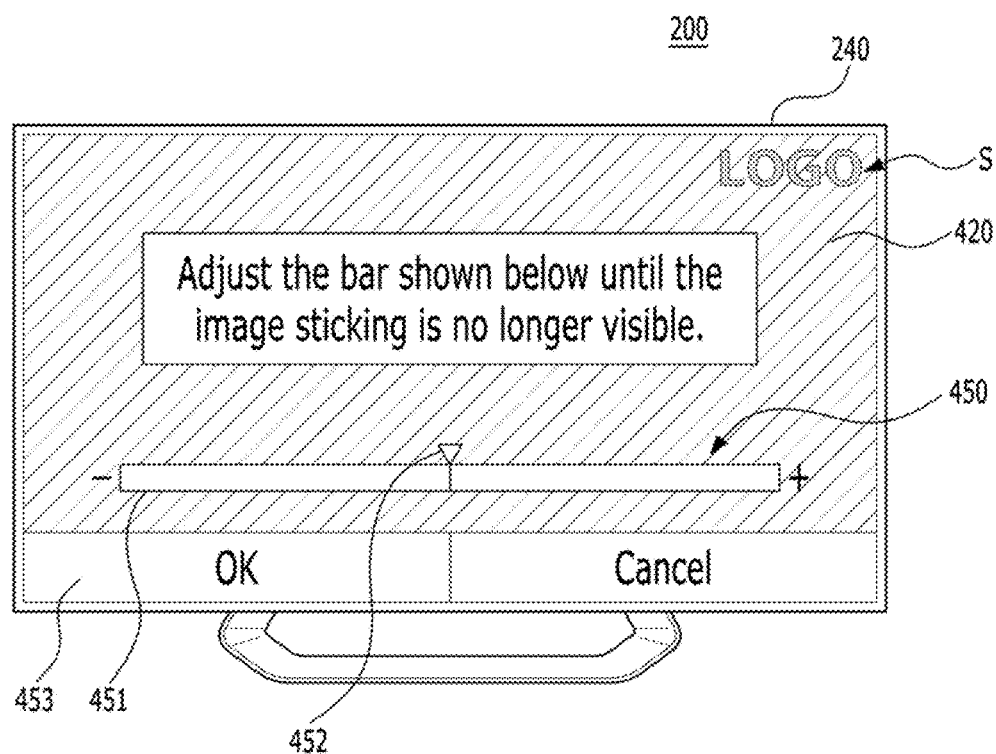
FIG. 13 and FIG. 14 illustrate examples of a GUI being outputted to a display unit in order to remove image sticking, in case an image sticking area is detected in the multimedia device according to the exemplary embodiment of the present disclosure.
Figure 14:
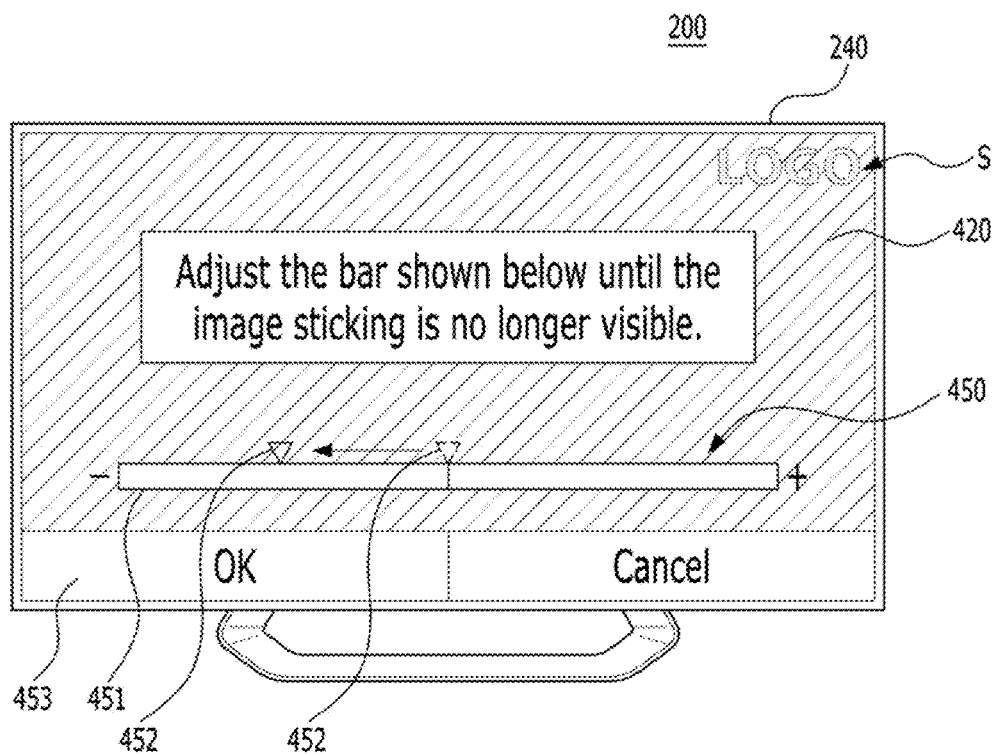

FIG. 13 and FIG. 14 illustrate examples of a GUI being outputted to a display unit in order to remove image sticking, in case an image sticking area is detected in the multimedia device according to the exemplary embodiment of the present disclosure.

Referring to FIG. 13, in case the image sticking area has been detected, the controller 270 of the multimedia device 200 may output a first GUI 450, which is configured to adjust a luminance of the display unit 240 corresponding to the surrounding area of the detected image sticking area (e.g., luminance of a first light-emitting diode corresponding to the surrounding area of the detected image sticking area), to the display unit 240.

For example, the first GUI 450 may include an adjustment bar 451 configured to adjust a luminance of a first light-emitting diode corresponding to the surrounding area, and an indicator 452 configured to be movable within the adjustment bar 451. In case the indicator 452 is moved rightward within the adjustment bar 451, the controller 270 may accordingly increase the luminance of the first light-emitting diode corresponding to the surrounding area of the image sticking area. And, alternatively, in case the indicator 452 is moved leftward within the adjustment bar 451, the controller 270 may accordingly decrease the luminance of the first light-emitting diode corresponding to the surrounding area of the image sticking area. Since an image sticking S is generated due to a malfunction in the light-emitting diode being incapable of emitting the appropriate level of luminance, which is caused by a degradation in the light-emitting diode, by reducing the luminance of the light-emitting diode corresponding to the surrounding area of the image sticking area, the image sticking S may no longer be recognized (or noticed) by the user. According to the exemplary embodiment, since this exemplary embodiment relates to removing image sticking, the first GUI 450 may be realized so that the indicator 452 can be moved within the adjustment bar 451 only toward a direction that can reduce the luminance of the first light-emitting diode, which corresponds to the surrounding area.

Referring to FIG. 14, by moving the indicator 452 within the adjustment bar 451 until the image sticking S is no longer shown on the first display screen 420, the user may adjust the luminance of the first light-emitting diode corresponding to the surrounding area.

In case the OK menu 453 is selected within the first GUI 450, the controller 270 may map a gain value, which corresponds to a specific point within the adjustment bar 451 at which the indicator 452 is located, to the first light-emitting diode, which corresponds to the surrounding area, and may then store the mapped result to the memory 230.

According to the exemplary embodiment, in case a luminance of the display unit 240 that is selected by using the first GUI 450 is lower than a predetermined luminance level, the controller 270 may output a notification message (or warning message), which notifies the user that the display screen of the display unit 240 corresponding to the image sticking area may appear to be darker than expected.

Figure 15:
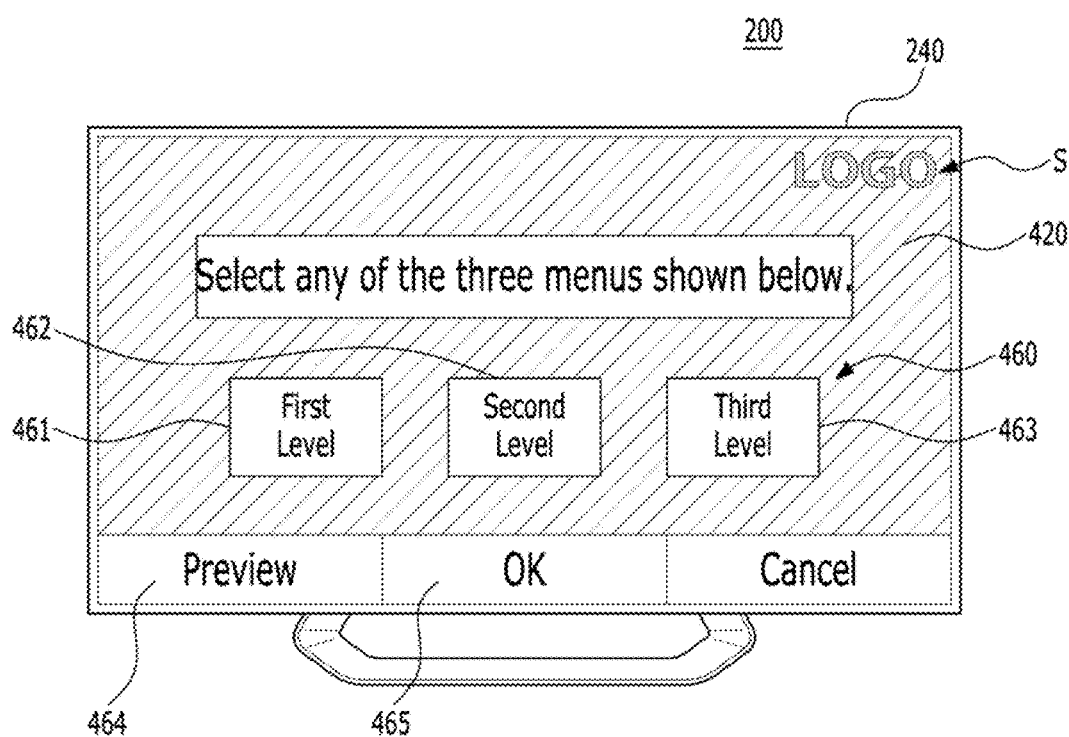
FIG. 15 illustrates another example of a GUI being outputted to a display unit in order to remove image sticking, in case an image sticking area is detected in the multimedia device according to the exemplary embodiment of the present disclosure.

FIG. 15 illustrates another example of a GUI being outputted to a display unit in order to remove image sticking, in case an image sticking area is detected in the multimedia device according to the exemplary embodiment of the present disclosure.

In case the image sticking area has been detected, the controller 270 of the multimedia device 200 may output a second GUI 460, which is configured to adjust a luminance of the display unit 240 corresponding to the surrounding area of the detected image sticking area (e.g., luminance of a first light-emitting diode corresponding to the surrounding area of the detected image sticking area), to the display unit 240.

For example, the second GUI 460 may include a first menu 461, which is configured to adjust the luminance of the first light-emitting diode corresponding to the surrounding area to a predetermined first level, a second menu 462, which is configured to adjust the luminance to a second level that is lower than the first level, and a third menu 463, which is configured to adjust the luminance to a third level that is lower than the second level.

The controller 270 may decide gain values respective to each of the first level, the second level, and the third level based upon a number of image sticking removal processes that have been performed with respect to the Blue light-emitting diode up to the current time point, a time period that has elapsed starting from the previous image sticking removal process performed with respect to the Blue light-emitting diode up to the current time point, a gain value applied in the image sticking removal process performed with respect to the Blue light-emitting diode, and so on. Each of the gain values corresponding to each of the first level, the second level, and the third level may vary depending upon the type of light-emitting diode and also each time the image sticking removal process is performed.

When the user selects any one of the first menu 461, the second menu 462, and the third menu 463 and selects a Preview menu 464, the controller 270 may adjust a luminance level of the first light-emitting diode, which corresponds to the surrounding area, by using the gain value corresponding to the selected menu, and, then, the controller 270 may output a Preview screen including the adjusted result to the display unit 240. The user may finally decide which one of the first menu 461, the second menu 462, and the third menu 463 he (or she) will be selecting, based upon a level of the image sticking S and a presence or absence of the image sticking S shown in the Preview screen. When the user selects an OK menu 465 after selecting any one of the first menu 461, the second menu 462, and the third menu 463, the controller 270 may map a gain value corresponding to the selected menu to the first light-emitting diode corresponding to the surrounding area of the image sticking area, and, then, the controller 270 may store the mapped result in the memory 230.

According to the exemplary embodiment, in case the second menu 462 or the third menu 463 is selected by using the second GUI 460, the controller 270 may output a notification message (or warning message), which notifies the user that the display screen of the display unit 240 corresponding to the image sticking area may appear to be darker than expected.

Figure 16:
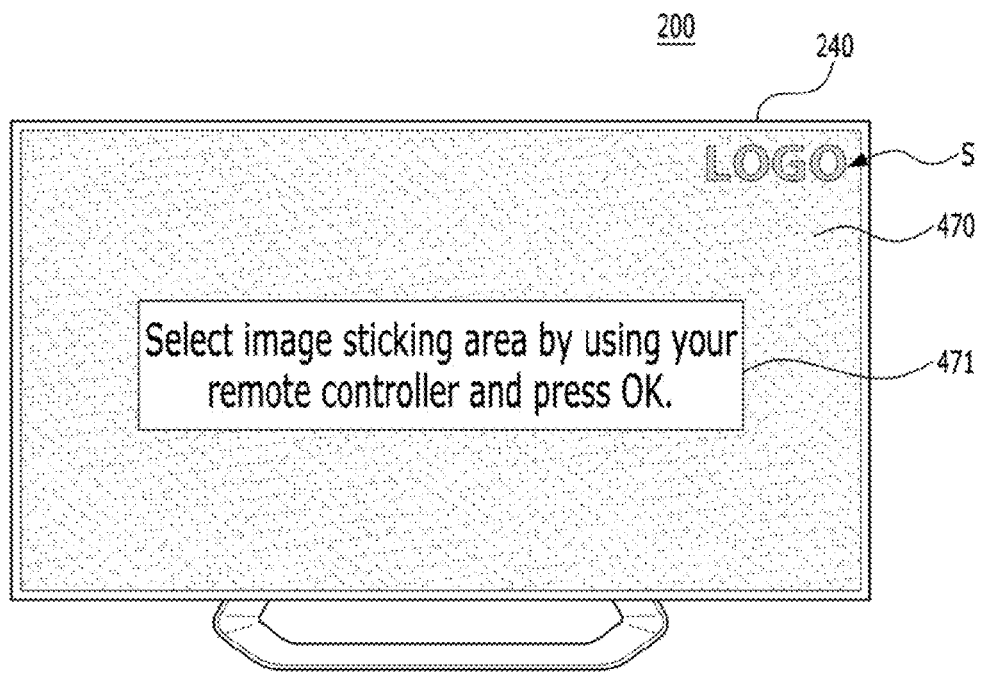
FIG. 16 illustrates an exemplary screen being outputted to a display unit, in case an image sticking removal application is being executed in the multimedia device according to the exemplary embodiment of the present disclosure.

FIG. 16 illustrates an exemplary screen being outputted to a display unit, in case an image sticking removal application is being executed in the multimedia device according to the exemplary embodiment of the present disclosure.

In FIG. 7, since the user has selected to perform the image sticking removal process with respect to the Blue light-emitting diode and the Green light-emitting diode, after the image sticking removal process respective to the Blue light-emitting diode is completed in accordance with the description provided above, the image sticking removal process respective to the Green light-emitting diode may be processed.

The controller 270 may output a second display screen 470 to the display unit 240. In the second display screen 470, a second light-emitting diode emitting light of a second wavelength region (e.g., Green light-emitting diode) is activated, and light-emitting diodes respectively emitting light of the other wavelength regions (e.g., Blue, Red, and White light-emitting diodes) are deactivated. In order to verify the image sticking that is generated by the second light-emitting diode, the second display screen 470 corresponding to when the second light-emitting diode is being activated is verified. In this exemplary embodiment, it is assumed that an image sticking S representing "LOGO" is generated on the second display screen 470.

The controller 270 may control the display unit 240 by using the remote controller 300 so that a guidance message 471, which is configured to guide the user to select the image sticking area, can be displayed on the second display screen 470. The user may select the image sticking area corresponding to the image sticking S by using the remote controller 300.

Since the subsequent process is similar or identical to the process described above with reference to FIG. 9 to FIG. 15, the detailed description of the same will be omitted for simplicity.

Hereinafter, a case when a mobile terminal 100 corresponds to the display device from which the image sticking is to be removed will be given as an example for the method for removing image sticking, as described above in FIG. 6, which will be described in more detail with reference to FIG. 17 to FIG. 20. However, part of the description that overlaps with the detailed description provided above with reference to FIG. 7 to FIG. 16 will be omitted for simplicity.

Figure 17:
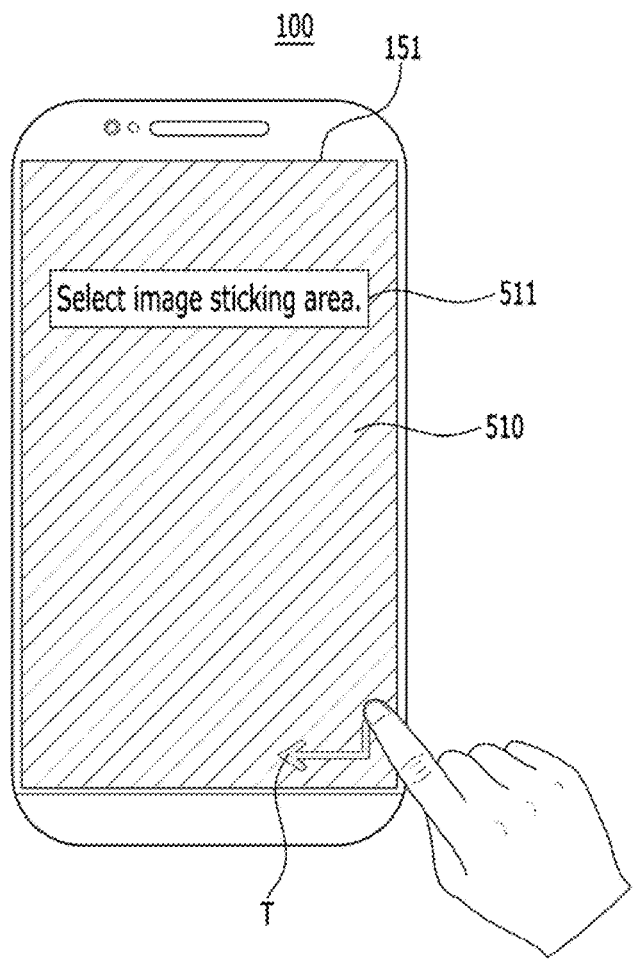
FIG. 17 illustrates an exemplary screen being outputted to a display unit, in case an image sticking removal application is being executed in the mobile terminal according to the exemplary embodiment of the present disclosure.

FIG. 17 illustrates an exemplary screen being outputted to a display unit, in case an image sticking removal application is being executed in the mobile terminal according to the exemplary embodiment of the present disclosure.

In this exemplary embodiment, among multiple light-emitting diodes emitting light of diverse wavelength regions, which are included in the display unit 151, an exemplary image sticking removal process respective to the first light-emitting diode, which corresponds to the first wavelength region, will hereinafter be described in detail.

The controller 180 of the mobile terminal 100 may output a first display screen 510, wherein only the first light-emitting diode (e.g., Blue light-emitting diode) is activated, and wherein the light-emitting diodes emitting light of other wavelength regions are deactivated, on the display unit 151. In this exemplary embodiment, it will be assumed that an image sticking T corresponding to an indicator, which indicates a menu for returning to a previous screen, is generated.

The controller 180 may control the display unit 151 so that a guidance message 511, which is configured to guide the user to select the image sticking area, can be displayed on the first display screen 510. The user may select the image sticking area corresponding to the image sticking T by touching a touch screen 151. When the user touches the touch screen 151 in order to select the image sticking area, a trajectory corresponding to such touch input may be displayed on the display unit 151. According to the exemplary embodiment, in case the size of the image sticking T is excessively small to have its image sticking area touched by the user's hand (or finger), the controller 180 may control the display unit 151 so that a display ratio of the first display screen 510 can be increased in accordance with a predetermined touch input. Thereafter, based upon the image sticking area, which is selected by the user's touch input, the image sticking area that is generated on the first display screen 510 may be detected.

Alternatively, according to the exemplary embodiment, when increasing the display ratio of the first display screen 510, the controller 180 may control the display unit 151 so that the display unit 151 can display a grid pattern including multiple cells on the first display screen 510. Each of the cells may correspond to each image pixel configuring the first display screen 510, or, among the image pixels configuring the first display screen 510, each of the cells may correspond to two neighboring pixels or four neighboring pixels. The user may easily select the image sticking area by selecting the cells included in the grid pattern.

Alternatively, according to the exemplary embodiment, when increasing the display ratio of the first display screen 510, within the first display screen 510, the controller 180 may output a partially enlarged display screen, which displays an enlarged view of a partial area including a specific point where the pointer P is located, to the display unit 151, and the partially enlarged display screen may be outputted by being overlaid with the first display screen 510, which has its display ratio unchanged. Additionally, the partially enlarged display screen may have its position within the first display screen 510 changed in accordance with the movement of the pointer P.

Alternatively, according to the exemplary embodiment, when increasing the display ratio of the first display screen 510, the controller 180 may output a graphic image on the display unit 151, wherein the graphic image indicates which part of the entire first display screen 510 having the unchanged display ratio corresponds to the enlarged part of the first display screen 510 being displayed on the display unit 151. The graphic image may be outputted to the display unit 151 to overlay with the enlarged part of the first display screen 510, which is displayed on the display unit 151. When the user selects the image sticking area, it will be apparent that the description provided above with reference to FIG. 10 and FIG. 11 may also be identically or similarly applied to a mobile terminal 100.

Meanwhile, according to the exemplary embodiment of the present disclosure, when the controller 180 detects the image sticking area from the first display screen 510, the information related to the indicator that is selected by the user may be applied. And, this will hereinafter be described in detail with reference to FIG. 18.

Figure 18:
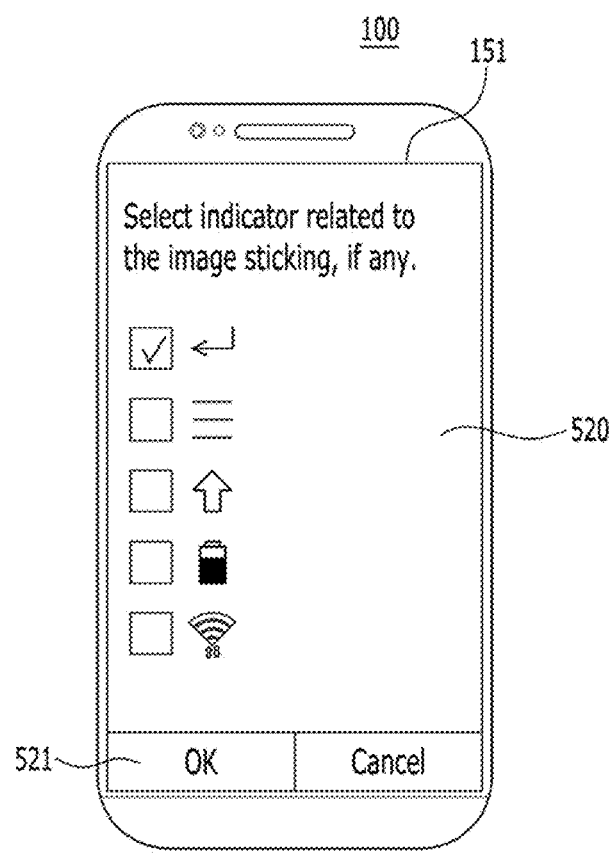
FIG. 18 illustrates an exemplary method for selecting an indicator related to the image sticking shown in the display unit of the mobile terminal according to the exemplary embodiment of the present disclosure.

FIG. 18 illustrates an exemplary method for selecting an indicator related to the image sticking shown in the display unit of the mobile terminal according to the exemplary embodiment of the present disclosure.

The memory 170 of the mobile terminal 100 may store indicator-related information being related to an indicator that can be outputted to the display unit 151. Herein, the indicator-related information may include at least one of first information being related to a form of the indicator and second information being related to a location where the indicator is being displayed within the display screen of the display unit 151. The second information may include coordinate information for indicating a specific location where the indicator is located within the display screen of the display unit 151. For example, instead of including information indicating in which approximate area within the display screen of the display unit 151 the indicator is located, the second information may include accurate coordinate information respective to an entire area being displayed as the corresponding indicator.

The indicator may correspond to a first indicator indicating reception sensitivity of a radio signal, a second indicator indicating remaining battery capacity, a third indicator indicating through which communication network and external server the radio signal is being transmitted and received, a fourth indicator indicating whether a notification mode notifying a generation of a specific event corresponds to a sound mode or a vibrating mode, a fifth indicator indicating the respective mobile communication service provider, and so on, which are displayed on a notification bar on an upper portion of the screen, and the indicator may also correspond to a sixth indicator indicating a menu for entering a main Home screen, which is displayed on the lower portion of the screen, a seventh indicator indicating a menu for returning to a previous screen, an eighth indicator corresponding to a menu for verifying an application history listing applications that have been used within a predetermined period of time, and so on, which are display on a lower portion of the screen.

Generally, in case of the same indicator, since the corresponding indicator is mostly displayed at the same location within the display screen, the light-emitting diode of the display unit 151 corresponding to the area where the indicator is being displayed is more likely to become degraded (or deteriorated). Accordingly, indicator-related information that is related to a specific indicator is stored in the memory 170, and the controller 180 may detect the image sticking area by using the stored indicator-related information.

Such indicator-related information may be downloaded from an external server, and such indicator-related information may also be periodically or aperiodically updated.

In this exemplary embodiment, although a case when indicator-related information is being stored in the memory 170 is given as an example and described accordingly, since the mobile terminal 100 may also receive a broadcast signal, logo-related information, which is described above with reference to FIG. 12, may also be stored in the memory 170. In this case, in detecting the image sticking area, the controller 180 may also apply and use logo-related information corresponding to a logo that is selected by the user.

Similarly, in FIG. 12, although a case when logo-related information is being stored in the memory 230 of the multimedia device 200 is given as an example and described accordingly, it will be apparent that indicator-related information corresponding to an indicator that can be outputted to the display unit 240 may also be stored in the memory 230. In this case, in detecting the image sticking area, the controller 270 may also use and apply indicator-related information, which corresponds to an indicator that is selected by the user.

Referring back to FIG. 18, the controller 180 may control the display unit 151 so that the display unit 151 can display a GUI 520, which includes indicators corresponding to the indicator-related information stored in the memory 170. The GUI 520 may be outputted after the image sticking area is selected the touch input, which is described above with reference to FIG. 17, or the GUI 520 may be outputted before the image sticking area is selected by the touch input, or the GUI 520 may be outputted regardless of the selection of the image sticking area by using the touch input.

The GUI 520 may include a list of all of the indicators corresponding to the indicator-related information stored in the memory 170. And, in case the image sticking area has already been selected by the touch input, among all of the indicators corresponding to the indicator-related information stored in the memory 170, a list of indicators listing only the indicators that are determined to have similar forms (or shapes) and locations as the selected image sticking area.

Herein, it will be assumed that, among the indicators included in the GUI 520, the user has selected an indicator, which is related to the image sticking T, and that the user has selected the OK menu 521 afterwards. Then, the controller 180 may determine the shape (or form) of the indicator and the location of indicator within the display screen of the display unit 151, based upon the indicator-related information stored in the memory 170.

For example, in case the GUI 520 is being outputted before or after the image sticking area is selected by the touch input, which is described above with reference to FIG. 17, the controller 180 may be capable of more accurately detecting the image sticking area corresponding to the image sticking T, which is generated in the first display screen 510, based upon the image sticking area selected by the touch input and the indicator-related information stored in the memory 170. According to the exemplary embodiment, before outputting the GUI 520 to the display unit 151, the controller 180 may detect the image sticking area based upon the image sticking area, which is selected by the touch input, and, then, the controller 180 may output the GUI including the information on the detected image sticking area to the display unit 151. For example, information on the detected image sticking area may correspond to information related to the detected image sticking area, among the logo-related information stored in the memory 170, and the information on the detected image sticking area may also correspond to information corresponding to letters (or characters), shapes, icons, logos, and so on. The GUI may include a guidance message for verifying whether or not the detected image sticking area coincides (or matches) with the image sticking that is seen by the user.

As another example, even in case the GUI 520 has been outputted without any image sticking area selection performed by the touch input, which is described above with reference to FIG. 17, the controller 180 may detect the image sticking area corresponding to the image sticking T, which is generated in the first display screen 510, based upon the indicator-related information stored in the memory 170.

Figure 19:
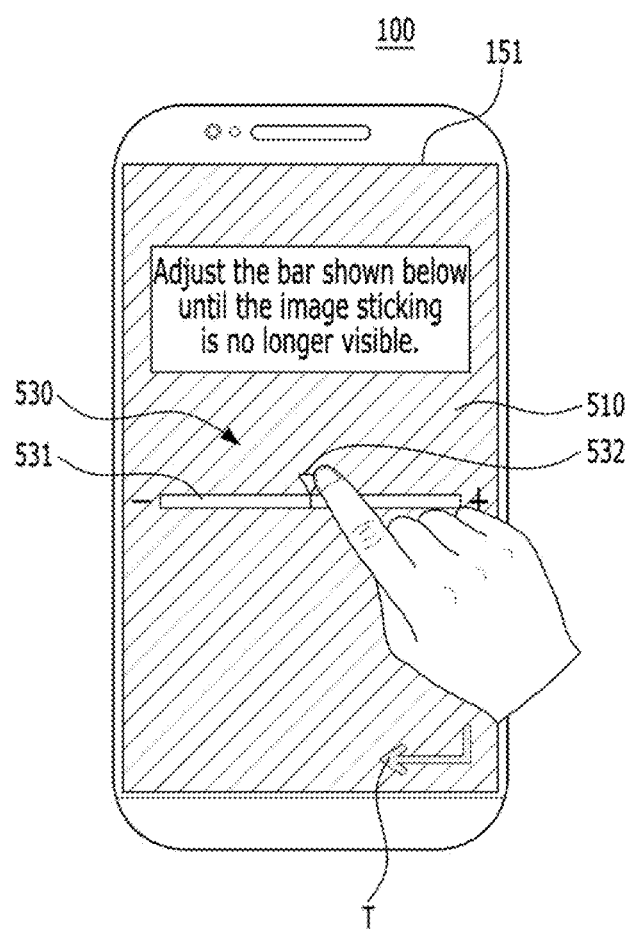
FIG. 19 illustrates an example of a GUI being outputted to a display unit in order to remove image sticking, in case an image sticking area is detected in the mobile terminal according to the exemplary embodiment of the present disclosure.

FIG. 19 illustrates an example of a GUI being outputted to a display unit in order to remove image sticking, in case an image sticking area is detected in the mobile terminal according to the exemplary embodiment of the present disclosure.

Referring to FIG. 19, in case the image sticking area has been detected, the controller 180 of the mobile terminal 100 may output a first GUI 530, which is configured to adjust a luminance of the first light-emitting diode corresponding to the surrounding area of the detected image sticking area, to the display unit 151.

For example, the first GUI 530 may include an adjustment bar 531 configured to adjust a luminance of a first light-emitting diode corresponding to the surrounding area, and an indicator 532 configured to be movable within the adjustment bar 531. In case the indicator 532 is moved rightward within the adjustment bar 531, the controller 180 may accordingly increase the luminance of the first light-emitting diode corresponding to the surrounding area of the image sticking area. And, alternatively, in case the indicator 532 is moved leftward within the adjustment bar 531, the controller 180 may accordingly decrease the luminance of the first light-emitting diode corresponding to the surrounding area of the image sticking area.

By moving the indicator 532 within the adjustment bar 531 until the image sticking T is no longer shown on the first display screen 530, the user may adjust the luminance of the first light-emitting diode corresponding to the surrounding area.

The controller 180 may map a gain value, which corresponds to a specific point within the adjustment bar 531 at which the indicator 532 is finally located by the user, to the first light-emitting diode, which corresponds to the surrounding area, and may then store the mapped result to the memory 170.

According to the exemplary embodiment, in case a luminance of the display unit 240 that is selected by using the first GUI 530 is lower than a predetermined luminance level, a notification message (or warning message), which notifies the user that the display screen of the display unit 151 corresponding to the image sticking area may appear to be darker than expected, may be outputted.

Figure 20:
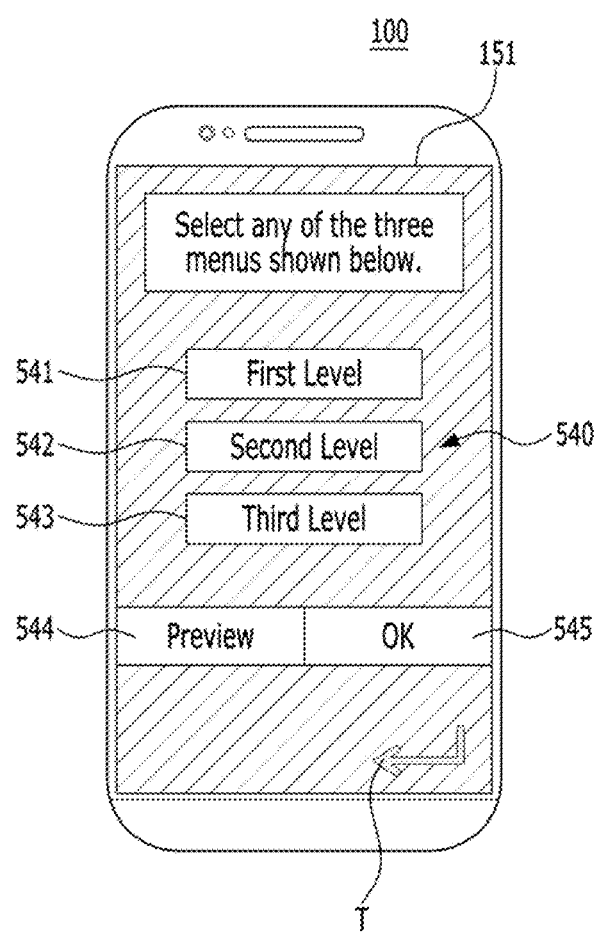
FIG. 20 illustrates another example of a GUI being outputted to a display unit in order to remove image sticking, in case an image sticking area is detected in the mobile terminal according to the exemplary embodiment of the present disclosure.

FIG. 20 illustrates another example of a GUI being outputted to a display unit in order to remove image sticking, in case an image sticking area is detected in the mobile terminal according to the exemplary embodiment of the present disclosure.

In case the image sticking area has been detected, the controller 180 of the mobile terminal 100 may output a second GUI 540, which is configured to adjust a luminance of the first light-emitting diode corresponding to the surrounding area of the detected image sticking area, to the display unit 151.

For example, the second GUI 540 may include a first menu 541, which is configured to adjust the luminance of the first light-emitting diode corresponding to the surrounding area to a predetermined first level, a second menu 542, which is configured to adjust the luminance to a second level that is lower than the first level, and a third menu 543, which is configured to adjust the luminance to a third level that is lower than the second level.

The controller 180 may decide gain values respective to each of the first level, the second level, and the third level based upon a number of image sticking removal processes that have been performed with respect to the Blue light-emitting diode up to the current time point, a time period that has elapsed starting from the previous image sticking removal process performed with respect to the Blue light-emitting diode up to the current time point, a gain value applied in the image sticking removal process performed with respect to the Blue light-emitting diode, and so on. Each of the gain values corresponding to each of the first level, the second level, and the third level may vary depending upon the type of light-emitting diode and also each time the image sticking removal process is performed.

When the user selects any one of the first menu 541, the second menu 542, and the third menu 543 and selects a Preview menu 544, the controller 180 may adjust a luminance level of the first light-emitting diode, which corresponds to the surrounding area, by using the gain value corresponding to the selected menu, and, then, the controller 180 may output a Preview screen including the adjusted result to the display unit 151. The user may finally decide which one of the first menu 541, the second menu 542, and the third menu 543 he (or she) will be selecting, based upon a level of the image sticking T and a presence or absence of the image sticking T shown in the Preview screen. When the user selects an OK menu 545 after selecting any one of the first menu 541, the second menu 542, and the third menu 543, the controller 180 may map a gain value corresponding to the selected menu to the first light-emitting diode corresponding to the surrounding area of the image sticking area, and, then, the controller 180 may store the mapped result in the memory 170.

According to the exemplary embodiment, in case the second menu 542 or the third menu 543 is selected by using the second GUI 540, the controller 180 may output a notification message (or warning message), which notifies the user that the display screen of the display unit 151 corresponding to the image sticking area may appear to be darker than expected.

The user may also perform the image sticking removal process with respect to the light-emitting diodes corresponding to the other wavelength regions, and since the corresponding process is similar to the process described above with reference to FIG. 17 to FIG. 20, the detailed description of the same will be omitted for simplicity.

Figure 21:
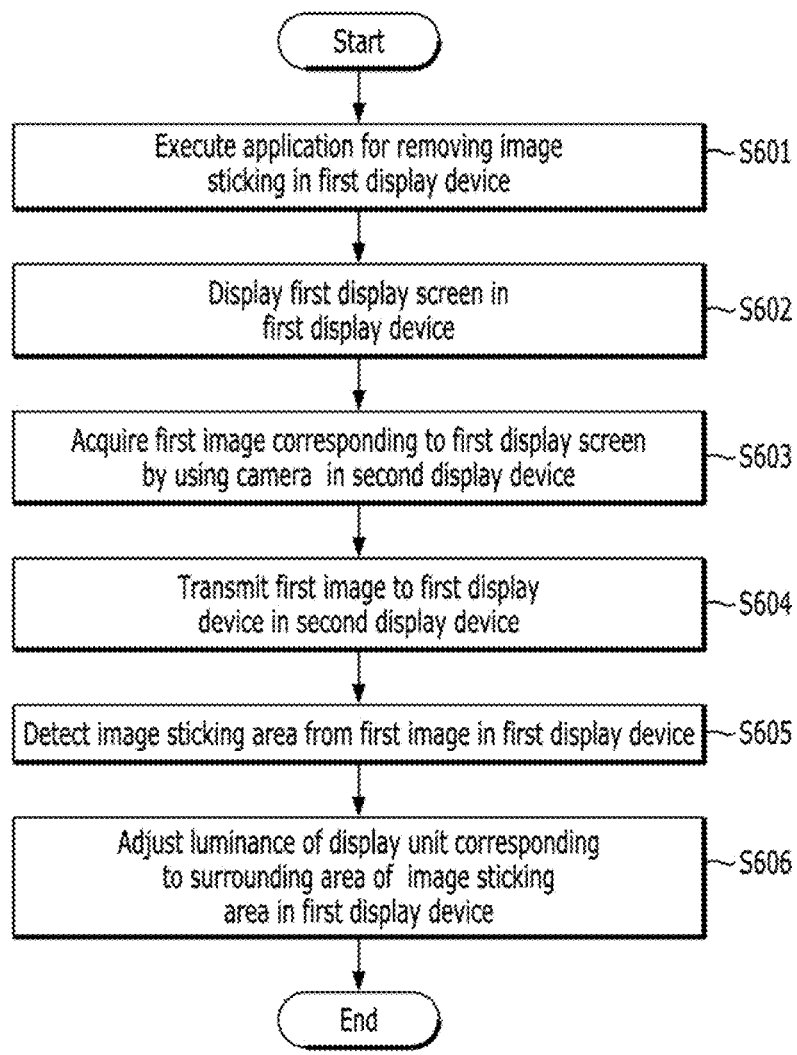
FIG. 21 illustrates a flow chart showing another exemplary method for removing image sticking in the display device according to the exemplary embodiment of the present disclosure.

FIG. 21 illustrates a flow chart showing another exemplary method for removing image sticking in the display device according to the exemplary embodiment of the present disclosure. In FIG. 21, it will be assumed that a first display device corresponds to the target device (or subject device) from which the image sticking is to be removed, and it will also be assumed that, as a device that is being used in order to remove the image sticking of the first display device, a second display device corresponds to a device that is equipped with a camera and that can be interconnected to the first display device (e.g., paired with the first display device or connected to the first display device via wireless communication).

An application for removing image sticking is executed in the first display device (S601). An execution screen of the application for removing image sticking may be displayed on the display unit of the first display device. According to the exemplary embodiment, an application for removing image sticking of an external device may first be executed in the second display device, and, then, an application for removing image sticking may also be executed in the first display device in accordance with a predetermined condition. In case of the latter, the corresponding process will be described in more detail later on with reference to FIG. 25 to FIG. 28.

In the first display device, a first display screen is displayed (S602). The first screen may correspond to a screen respective to a first wavelength region among multiple wavelength regions being emitted from the display unit of the first display device. For example, the display device may be configured of at least one of a Blue light-emitting diode, a Red light-emitting diode, and a Green light-emitting diode, or the display device may also be configured of at least one of a Blue light-emitting diode, a Red light-emitting diode, and a Green light-emitting diode and a White light-emitting diode. An image sticking removal process according to an exemplary embodiment of the present disclosure may be performed in accordance with a predetermined order with respect to each of the R/G/B/W light-emitting diodes, which are equipped to the display unit of the first display device. And, alternatively, image sticking removal process according to an exemplary embodiment of the present disclosure may also be performed only with respect to the light-emitting diodes selected by the user, among the R/G/B/W light-emitting diodes, which are equipped to the display unit of the first display device. For example, in case the image sticking, which is generated by the Blue light-emitting diode, is intended to be removed, the first display device deactivates the light-emitting diodes emitting light of other wavelength regions, and, then, the first display device may output the first screen, wherein only the Blue light-emitting diodes are activated, on the display unit.

According to the exemplary embodiment, when a predetermined signal being transmitted from a second display device, which is connected to the first display device via wireless communication, is detected, the first display device may execute an application for removing image sticking and may output the first display screen on the display unit.

The second display device activates a camera and acquires a first image by using the camera (S603). In this case, the first display device may output a guidance message to the display unit, wherein the guidance message directs the user to capture an image (or perform imaging) of the first display screen by using the camera of the second display device and to transmit the captured image to the first display device.

For example, in case an application for removing image sticking is first executed in the first display device, the first display device discovers (or searches for) a device that is available for connection via wireless communication, and, then, among devices having previous connection history (e.g., second display device) or devices that have been verified by the discovery process, the first display device may transmit a first signal for establishing connection via wireless communication in order to perform image sticking removal to a device that is selected by the user (e.g., second display device). Thereafter, the second display device may execute the image sticking removal application in response to the received first signal, activate the camera, and display a preview image, which is acquired by the camera, on the display unit.

For example, in case an application for removing image sticking is first executed in the second display device, the second display device discovers (or searches for) a device that is available for connection via wireless communication, and, then, among devices having previous connection history (e.g., first display device) or devices that have been verified by the discovery process, the second display device may transmit a second signal for establishing connection via wireless communication in order to perform image sticking removal to a device that is selected by the user (e.g., first display device). Subsequently, the first display device may execute the image sticking removal application in response to the received second signal and display the first display screen on the display unit. Thereafter, the second display device may activate the camera and may display a preview image, which is acquired by the camera, on the display unit.

According to the exemplary embodiment, when outputting the preview image, the second display device may also output a guidance message directing the user to capture an image of (or to perform imaging on) the first display screen, which is outputted to the first display device.

Meanwhile, the first image may correspond to an image including the first display screen of the first display device, which is acquired by the camera of the second display device.

The second display device transmits information related to the first image, which is acquired by the camera, to the first display device (S604).

For example, the second display device may output the first image to the display unit, detect a first signal for selecting the image sticking area from the outputted first image, and transmit information on the image sticking area, which is selected by the first signal, to the first display device by including the corresponding information in the information related to the first image.

As another example, the second display device may also output a first image to the display unit, detect a second signal for selecting a logo and/or indicator being related to the image sticking included in the outputted first image, and transmit information related to a logo and/or indicator being selected by the second signal to the first display device by including the corresponding information in the information related to the first image.

As yet another example, the second display device may detect an area having a luminance that is lower than or equal to a predetermined luminance level within the first image, and, then, the second display device may include at least any one of luminance data of the detected area, position data of the detected area within the first image, and shape data (or form data) of the detected area within the first image in the information related to the first image and may then transmit the processed data to first display device.

According to the exemplary embodiment, a combination of the above-described three examples may also be realized.

The information on the first image may include at least one of image data of an image corresponding to a first display screen, which is acquired by the camera of the second display device, position data of an area that is presumed to be an image sticking (e.g., the selected area or the detected area) within the first image, shape data (or form data) of an area that is presumed to be an image sticking (e.g., the selected area or the detected area) within the first image, luminance data of an area that is presumed to be an image sticking (e.g., the selected area or the detected area) within the first image, data related to a logo of a specific channel, and data related to a specific indicator.

Additionally, according to the exemplary embodiment, in case a predetermined set of image data can be processed by the first display device, the first display screen itself, which is outputted to the first display device, may be self-captured by the first display device so that the first image can be acquired.

The first display device may receive information related to the first image from the second display device and may detect an image sticking area from the first display screen based upon the received information related to the first image (S605). The first display device may detect a first area corresponding to the first display screen from the first image based upon the image data of the first image, which is included in the information related to the first image, detect a second area presumed as the image sticking from the detected first area, and detect the image sticking area from the first display screen based upon a position of the second area within the first area (e.g., relative position information). At this point, the first display device may refer to any one of position data of an area that is presumed to be an image sticking (e.g., the selected area or the detected area) within the first image, shape data (or form data) of an area that is presumed to be an image sticking within the first image, luminance data of an area that is presumed to be an image sticking within the first image, data related to a logo of a specific channel, and data related to a specific indicator, which are included in the information related to the first image.

Subsequently, the first display device adjusts the luminance of the display unit corresponding to the surrounding area of the detected image sticking area (S606). More specifically, the first display device may adjust the luminance of the first light-emitting diode, which corresponds to the surrounding area of the detected image sticking area.

For example, the first display device may detect the luminance of the display unit corresponding to the detected image sticking area within the first image and the luminance of the display unit corresponding to the surrounding area of the detected image sticking area based upon the image data of the first image, which is included in the information related to the first image. And, then, the first display device may adjust the luminance of the display unit corresponding to the surrounding area of the image sticking area so that the difference between the luminance corresponding to the image sticking area and the luminance of the surrounding area can be reduced.

As another example, the first display device may adjust the luminance of the display unit corresponding to the surrounding area of the detected image sticking area so that the difference between the luminance of the detected image sticking area and the luminance of the surrounding area can be reduced, based upon luminance data of an area presumed to be the image sticking included in the information related to the first image.

Additionally, the first display device may store a gain value, which is used for adjusting the luminance of the display unit corresponding to the surrounding area, may be stored in the memory.

Thereafter, the first display unit may output a first display screen, wherein the first light-emitting diode corresponding to a first wavelength region is activated, back to the display unit. The user verifies whether or not any image sticking remains in the first display unit, which is outputted once again (or re-outputted). And, in case image sticking still remains, the user may execute the image sticking removal process once again with respect to the first light-emitting diode by performing steps S603 and S604. If image sticking no longer remains in the re-outputted first display device, the user may end the image sticking removal application or may carry out the image sticking removal process with respect to another light-emitting diode corresponding to another wavelength region.

Hereinafter, in case the first display device corresponds to the multimedia device 200, and in case the second display device corresponds to the mobile terminal 100, an example of the method for removing image sticking, which is described above with reference to FIG. 21, will be described in detail with reference to FIG. 22 to FIG. 44.

Figure 22:
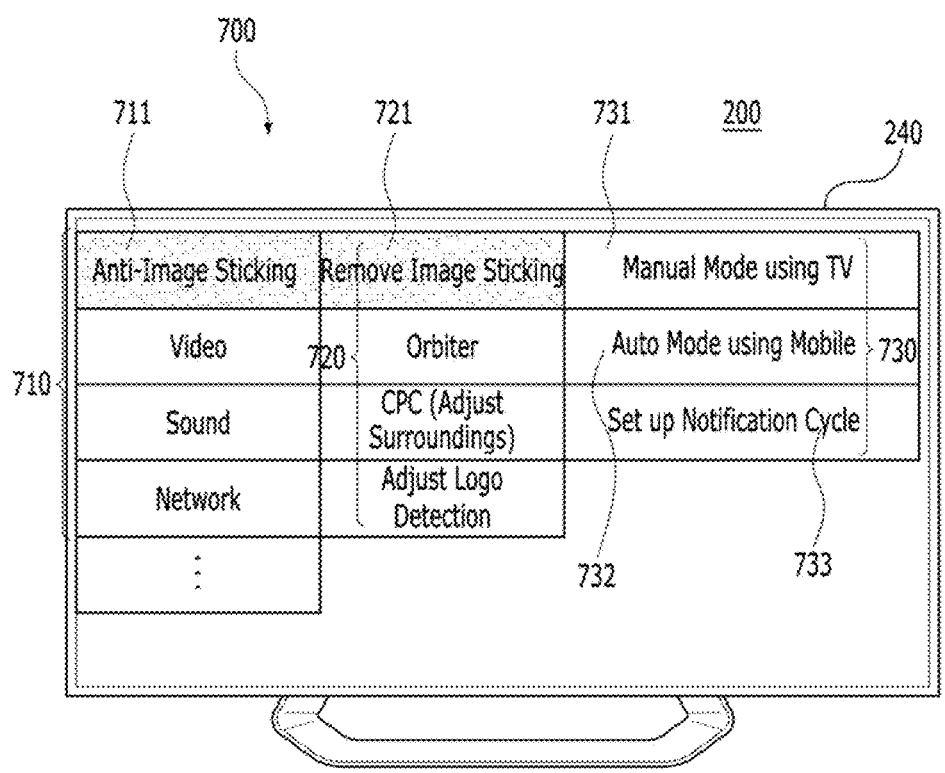
FIG. 22 and FIG. 23 illustrate an exemplary method for executing an image sticking removal application in the multimedia device according to the exemplary embodiment of the present disclosure.
Figure 23:
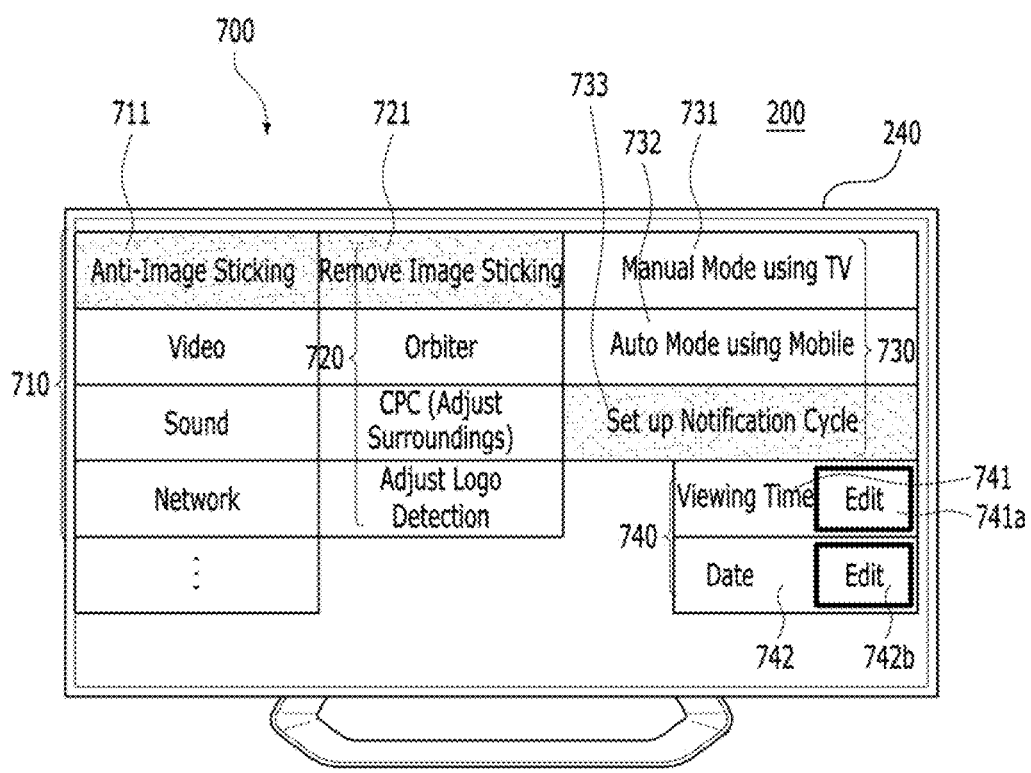

FIG. 22 and FIG. 23 illustrate an exemplary method for executing an image sticking removal application in the multimedia device according to the exemplary embodiment of the present disclosure.

When a signal for executing an Environment Set-up menu of the multimedia device 200 is detected, the controller 270 of the multimedia device 200 may output a GUI 700 on the display unit 240, as shown in FIG. 22. For example, the signal may be received from the remote controller, or the signal may be generated in case a specific button, which is provided on an exterior feature of the multimedia device 200, has been selected.

The GUI 700 may include a list of menus for setting up an environment, which is related to a predetermined set of functions of the multimedia device 200. For example, in case the GUI 700 is displayed in response to the signal, the GUI 700 may include a first menu list 710 for setting up functions that are related to anti-image sticking/video/audio/network, and so on, of the multimedia device 200. When the Anti-Image Sticking menu 711 is selected from the first menu list 710, the controller may include a second menu list 720, which is configured to remove the image sticking generated in the display unit 240 or to prevent image sticking from occurring in the display unit 240, in the GUI 700 and display the GUI 700 including the second menu list

720. For example, within the GUI 700, the second menu list 720 may be located on a right side of the first menu list 710.

For example, when a signal for selecting an Application for Removing Image Sticking menu 721 from the second menu list 720 is detected, the controller 270 may execute an application for removing image sticking.

As another example, when a signal for selecting an Application for Removing Image Sticking menu 721 from the second menu list 720 is detected, the controller 270 may include a third menu list 730, which is configured to perform detailed settings related to the removal of image sticking, in the GUI 700 and display the GUI 700 including the second menu list 730. For example, the third menu list 730 may include a menu 731 for removing image sticking in accordance with a manual selection made by the user within the multimedia device 200 itself, and a menu 732 for automatically removing image sticking by using an external device that is interconnected to the multimedia device 200. According to the exemplary embodiment, the third menu list 730 may further include a menu 733 for setting up notification to the user regarding image sticking. When a signal for selecting menu 731 or menu 732 from the third menu list 730 is detected, the controller 270 executes the application for removing image sticking and may output an execution screen related to the corresponding menu to the display unit 240.

Meanwhile, when a signal for selecting menu 733 from the third menu list 730 is detected, the controller 270 may include a fourth menu list 740 for setting up notification regarding image sticking to the GUI 700 and may display the GUI 700 including the fourth menu list 740, as shown in FIG. 23. For example, the fourth menu list 740 may include a menu 741 for providing a notification to the user each time a predetermined period of time has elapsed based upon an actual viewing time of the multimedia device 200, and a menu 742 for providing a notification to the user each time a predetermined period of time has elapsed based upon a date since the removal of the image sticking through the image sticking removal application. When a signal selecting menu 741 from the fourth menu list 740 is detected, the controller 270 configures settings so that a notification for removing image sticking can be provided to the user each time a predetermined period of viewing time has elapsed. And, when a signal selecting menu 742 from the fourth menu list 740 is detected, the controller 270 configures settings so that a notification for removing image sticking can be provided to the user each time a predetermined period of time has elapsed since the last image sticking removal process. An Edit icon 741*a* and 742*b* is included in each menu 741 and 742, and, by selecting each of the Edit icons 741*a* and 742*b*, the user may be capable of editing the time or data, which function as the basis of the notification cycle.

Figure 24:
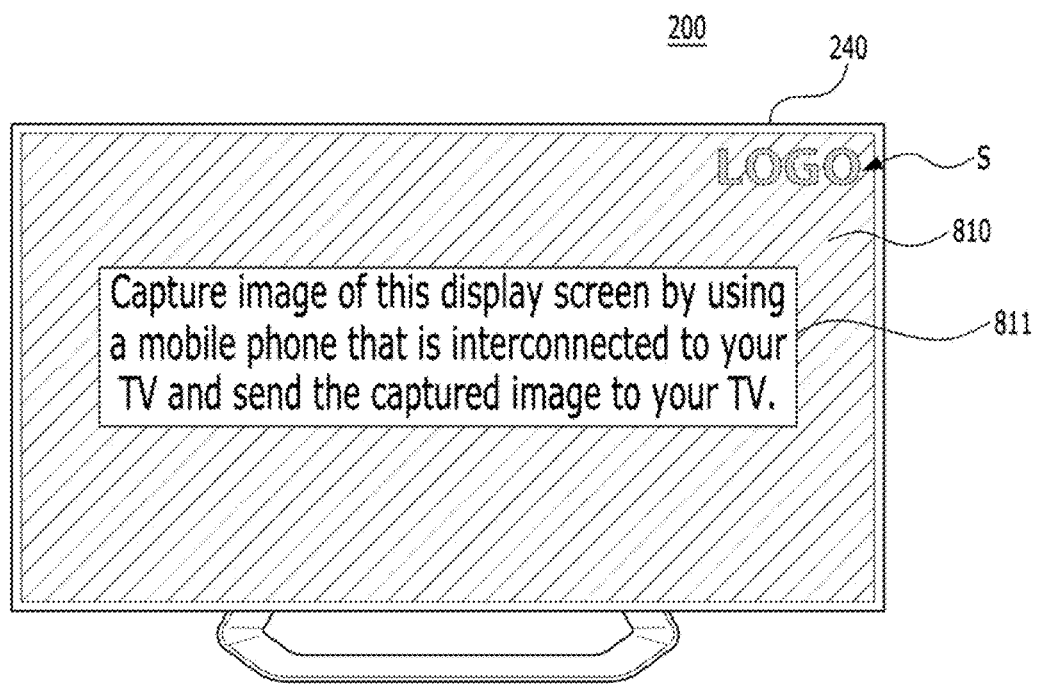
FIG. 24 illustrates an exemplary case of an image sticking removal application being executed in the multimedia device, which is given as an example of a first display device according to the exemplary embodiment of the present disclosure.

FIG. 24 illustrates an exemplary case of an image sticking removal application being executed in the multimedia device, which is given as an example of a first display device according to the exemplary embodiment of the present disclosure.

In this exemplary embodiment, although it is assumed that the image sticking removal process with respect to the first light-emitting diode (e.g., Blue light-emitting diode), which corresponds to the first wavelength region, is being performed, and although the respective description is being provided, as described above with reference to FIG. 7, it will be evident that the image sticking removal process will be performed in accordance with a predetermined order with respect to each of the light-emitting diodes (e.g., R/G/B/W light-emitting diodes), which correspond to predetermined wavelength areas included in the display unit 240, or that the image sticking removal process will be performed only with respect to the light-emitting diodes selected by the user, among the light-emitting diodes (e.g., R/G/B/W light-emitting diodes), which correspond to predetermined wavelength areas included in the display unit 240.

The controller 270 of the multimedia device 200 executes the image sticking removal application and outputted a first display screen 810 to the display unit 240. Evidently, the display screen 410, which is described above with reference to FIG. 7, may be outputted to the display unit 240 before the first display screen 810. In the first display screen 810, a first light-emitting diode corresponding to a first wavelength region is activated, and light-emitting diodes corresponding to the other wavelength regions included in the display unit 240 are deactivated. In this exemplary embodiment, it is assumed that an image sticking S representing "LOGO" is generated on the first display screen 810.

For example, in case a command for executing the image sticking removal application is detected, the controller 270 may output the first display screen 810 to the display unit 240. In this case, the controller 270 may search for an external device that is available for connection with the multimedia device 200 via wireless communication, and, then, among devices having previous connection history (e.g., mobile terminal 100) or devices that have been verified by the discovery process (e.g., mobile terminal 100), the controller 270 may transmit a first signal for establishing connection via wireless communication in order to perform image sticking removal. According to the exemplary embodiment, the controller 270 may transmit a guidance message 811 to the display unit 240, wherein the guidance message 811 directs the user to capture an image (or perform imaging) of the first display screen 810 by using the mobile terminal 100, which is interconnected to the multimedia device 200, and to transmit the captured image to the multimedia device 200. Additionally, according to the exemplary embodiment, in case the first signal is received from the multimedia device 200, the controller 180 of the mobile terminal 100 may automatically execute the application for removing image sticking, which is installed in the mobile terminal 100.

As another example, in case a second signal for establishing wireless connection with the external device (e.g., mobile terminal 100) in order to remove image sticking is received, the controller 270 executes the image sticking removal application and may output the first display screen 810 to the display unit 240. The controller 270 may control a network interface unit 213 so as to establish a wireless connection with the mobile terminal 100 in response to the second signal. Moreover, the controller 270 may transmit a guidance message 811 to the display unit 240, wherein the guidance message 811 directs the user to capture an image (or perform imaging) of the first display screen 810 by using the mobile terminal 100, which is interconnected to the multimedia device 200, and to transmit the captured image to the multimedia device 200.

Figure 25:
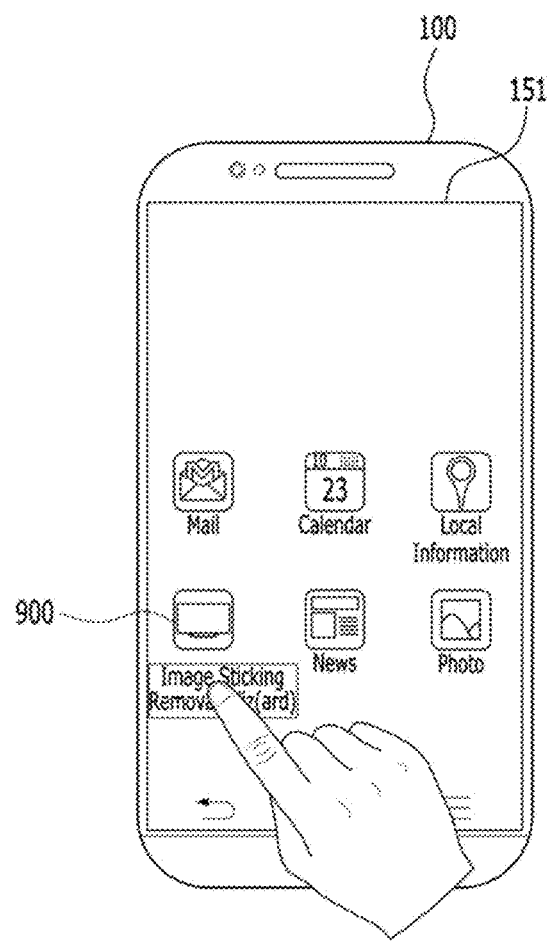
FIG. 25 illustrates an exemplary case of an image sticking removal application being executed in the multimedia device, which is given as an example of a second display device according to the exemplary embodiment of the present disclosure.

FIG. 25 illustrates an exemplary case of an image sticking removal application being executed in the multimedia device, which is given as an example of a second display device according to the exemplary embodiment of the present disclosure.

According to the exemplary embodiment of the present disclosure, an application for removing image sticking may be installed in the mobile terminal 100. In case the first display device from which the image sticking is to be removed corresponds to the mobile terminal 100, the user may remove the image sticking, which is formed on the display unit 151 of the mobile terminal 100, by using the application for removing image sticking. And, in case the mobile terminal 100 corresponds to the second display device being used for removing the image sticking of the first display device, the user may remove the image sticking of the first display device by using the application for removing image sticking.

An icon 900 of the application for removing image sticking is displayed on a Home screen of the mobile terminal 100 or displayed on a Menu screen listing icons of applications being installed in the mobile terminal 100. By selecting the icon 900 displayed on the display screen of the mobile terminal 100, the user may execute the application for removing image sticking.

According to the exemplary embodiment, in case the application for removing image sticking is first executed in the multimedia device 200, and in case a first signal for establishing wireless connection is transmitted from the multimedia device 200 to the mobile terminal 100 accordingly, in response to the received first signal, the controller 180 of the mobile terminal 100 controls the wireless communication unit 110 in order to establish wireless connection with the multimedia device 200, and, then, the controller 180 may automatically execute the application for removing image sticking.

Figure 26:
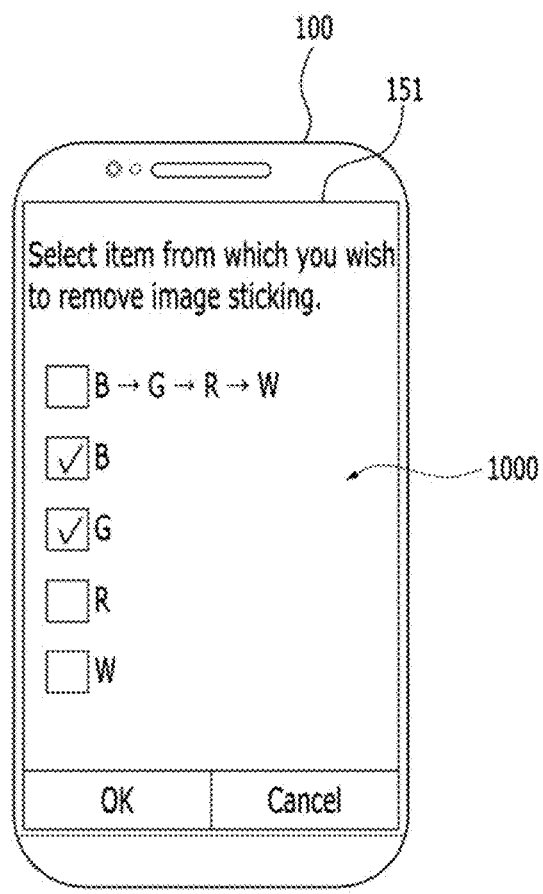
FIG. 26 illustrates an exemplary display screen being outputted to a display unit, in case an image sticking removal application is being executed in the mobile terminal according to the exemplary embodiment of the present disclosure.

FIG. 26 illustrates an exemplary display screen being outputted to a display unit, in case an image sticking removal application is being executed in the mobile terminal according to the exemplary embodiment of the present disclosure.

In case the application for removing image sticking is executed, the controller 180 of the mobile terminal 100 may output an execution screen 1000 to the display unit 151, as shown in FIG. 26. According to the exemplary embodiment, the execution screen 1000 may not be outputted, and, most particularly, in case the display screen 410 is outputted from the multimedia device 200, as shown in FIG. 7, the output of the execution screen 1000 may be omitted by the mobile terminal 100.

The execution screen 1000 may correspond to a display screen for selecting a type of light-emitting diode with respect to which the multimedia device 200 is to perform the image sticking removal process, wherein the multimedia device 200 corresponds to the device from which image sticking is to be removed by using the mobile terminal 100. Since the execution screen 1000 is similar to the execution screen 410, which is described above with reference to FIG. 7, detailed description of the same will be omitted for simplicity.

According to the exemplary embodiment, in case the execution screen 1000 is outputted to the display unit 151 after the wireless connection is established between the multimedia device 200 and the mobile terminal 100, the multimedia device 200 may transmit information related to the light-emitting diode, which is included in its display unit 240, to the mobile terminal 100, and, then, based upon the information related to the light-emitting diode, which is transmitted from the multimedia device 200, the controller 180 of the mobile terminal 100 may configure the execution screen 1000.

Figure 27:
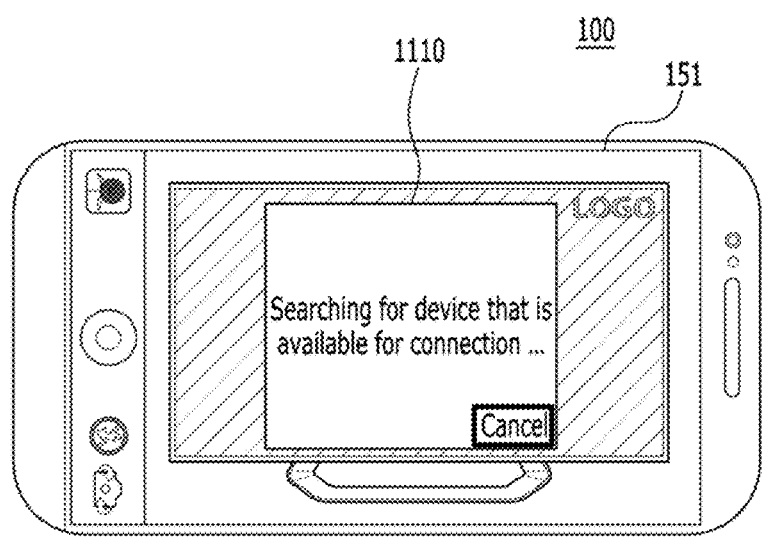
FIG. 27 illustrates an exemplary display screen being outputted to a display unit, in case an image sticking removal application is being executed in the mobile terminal according to the exemplary embodiment of the present disclosure.

FIG. 27 illustrates an exemplary display screen being outputted to a display unit, in case an image sticking removal application is being executed in the mobile terminal according to the exemplary embodiment of the present disclosure.

In case the application for removing image sticking is executed, the controller 180 of the mobile terminal 100 controls the wireless communication unit 110 so as to search for an external device that is available for connection via wireless communication. According to the exemplary embodiment, the controller 180 may also output a notification message 1110 to the display unit 151, wherein the notification message 1110 notifies the user that a search process is being performed for an external device that is available for wireless connection.

The search process for an external device that is available for wireless connection, which is performed by the mobile terminal 100, may be performed in case the icon 900 corresponding to the application for removing image sticking is selected, as described above with reference to FIG. 25. And, the search process may also be performed in case a type of light-emitting diode from which the user wishes to remove image sticking is selected from the execution screen 1000, and in case the OK menu is selected afterwards, as shown in FIG. 26. According to the exemplary embodiment, in case the application for removing image sticking is first executed in the multimedia device 200, and in case the application for removing image sticking is performed in the mobile terminal 100 due to a signal for establishing wireless connection, which is transmitted from the multimedia device 200, the search process for an external device that is available for wireless connection and the output of the notification message 1110 may be omitted.

Figure 28:
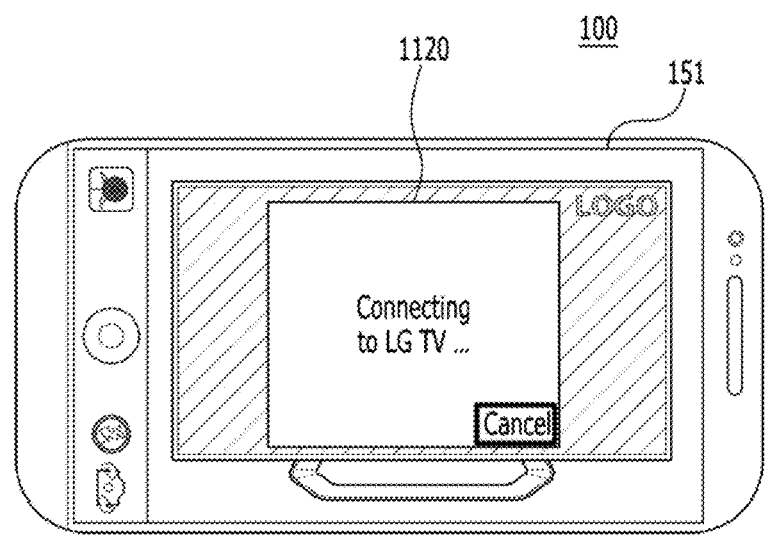
FIG. 28 illustrates an exemplary display screen being outputted to a display unit, in case an image sticking removal application is being executed in the mobile terminal according to the exemplary embodiment of the present disclosure.

FIG. 28 illustrates an exemplary display screen being outputted to a display unit, in case an image sticking removal application is being executed in the mobile terminal according to the exemplary embodiment of the present disclosure.

In case the application for removing image sticking is executed, the controller 180 of the mobile terminal 100 controls the wireless communication unit 110 so as to establish wireless connection with a specific external device. According to the exemplary embodiment, the controller 180 may output a notification message 1120 to the display unit 151, wherein the notification message 1120 notifies the user that wireless connection is being established with the specific external device.

In case a specific external device having a wireless connection history with the mobile terminal 100 exists, and in case the user selects a specific external device among a plurality of external devices that are searched in accordance with the method described above with reference to FIG. 27, or in case the application for removing image sticking is first executed in the specific external device, and in case a signal for establishing wireless connection is transmitted from the specific external device, the controller 180 may control the wireless communication unit 110 so as to establish wireless connection with the specific external device.

Figure 29:
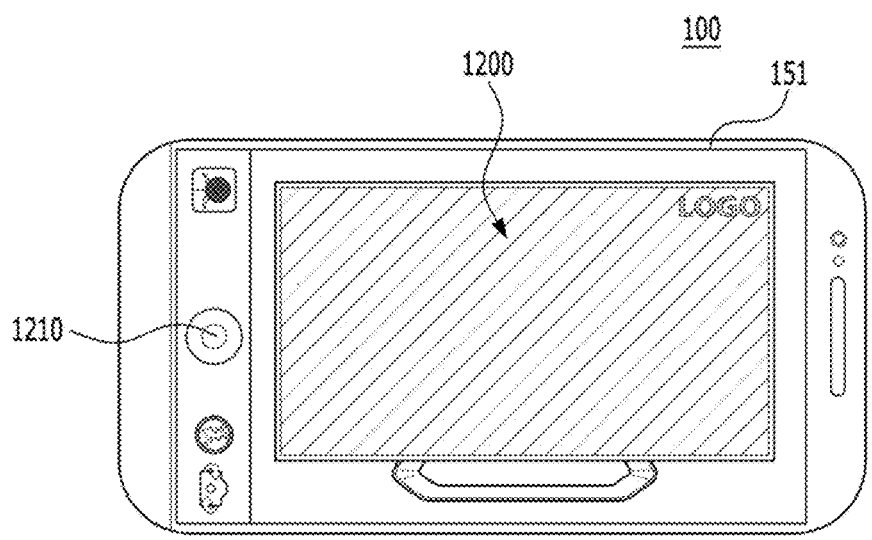
FIG. 29 illustrates an exemplary display screen being outputted to a display unit, in case an image sticking removal application is being executed in the mobile terminal according to the exemplary embodiment of the present disclosure.

FIG. 29 illustrates an exemplary display screen being outputted to a display unit, in case an image sticking removal application is being executed in the mobile terminal according to the exemplary embodiment of the present disclosure.

In case the application for removing image sticking is executed, the controller 180 of the mobile terminal 100 may activate the camera 121, and, then, the controller 180 may output a preview image 1200, which is acquired by the camera 121, to the display unit 151.

For example, in case the icon 900 corresponding to the application for removing image sticking is selected, as described above with reference to FIG. 25, the controller 180 of the mobile terminal 100 may activate the camera 121, and, then, the controller 180 may output a preview image 1200, which is acquired by the camera 121, to the display unit 151. And, thereafter, the process that is described above with reference to FIG. 27 and FIG. 28 may be performed.

As another example, in case the process described above with reference to FIG. 27 and FIG. 28 is performed, the controller 180 may activate the camera 121, and, then, the controller 180 may output a preview image 1200, which is acquired by the camera 121, to the display unit 151.

According to the exemplary embodiment, the controller 180 may also activate the camera 121 by a user command for selecting an icon, which corresponds to the camera 121, within the display screen of the mobile terminal 100 without having to select the application for removing image sticking.

After adjusting the location of the mobile terminal 100 so that the display unit 240 of the multimedia device 200 can be located within the preview image 1200, the user may select a Capture menu 1210 and may then acquire a first image. The acquired first image may be transmitted to the multimedia device 200 and may then be used for detecting the image sticking area, which is included in the display unit 240 of the multimedia device 200. In order to accurately detect the image sticking so that the image sticking can coincide (or match) with the actual image sticking S, it is preferable that the display unit 240 of the multimedia device 200 is located within the first image without any distortion. In order to do so, a guidance message guiding (or directing) the user to perform a proper and correct method for capturing an image of the first display screen 810 may also be transmitted to the display unit 151 of the mobile terminal 100. And, this will hereinafter be described in detail with reference to FIG. 30.

Figure 30:
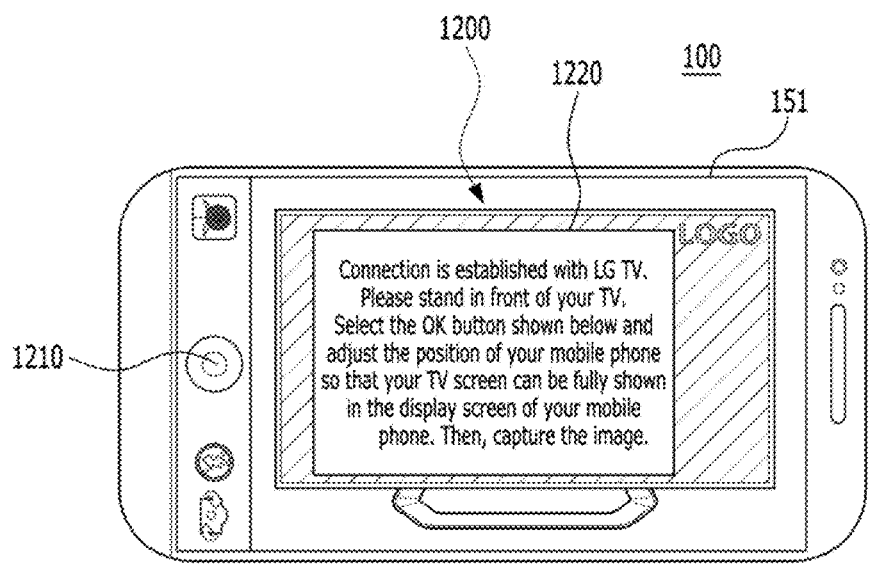
FIG. 30 illustrates an exemplary guidance message being outputted to a display unit of the mobile terminal according to the exemplary embodiment of the present disclosure.

FIG. 30 illustrates an exemplary guidance message being outputted to a display unit of the mobile terminal according to the exemplary embodiment of the present disclosure.

The controller 180 of the mobile terminal 100 may also output a guidance message 1220 guiding (or directing) the user to perform a proper and correct method for capturing an image of the first display screen 810 to the display unit 151. The guidance message 1220 may be displayed on the preview message 1200 shown in FIG. 29, or the guidance message 1220 may be displayed before the preview image 1200 is displayed.

Figure 31:
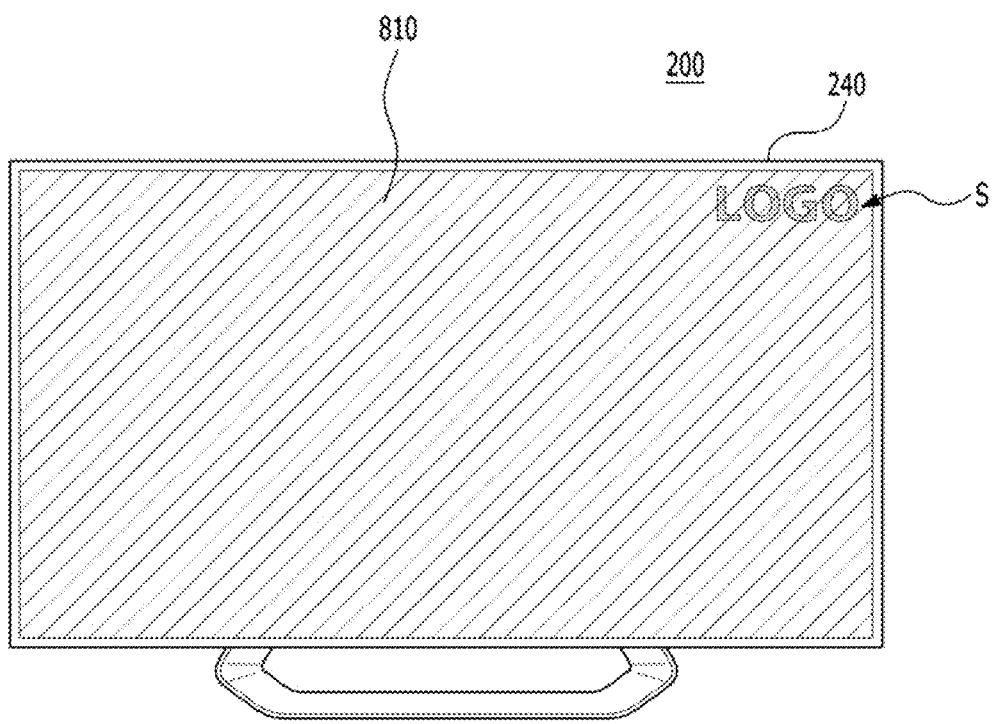
FIG. 31 illustrates an exemplary display screen of a multimedia device from which the image sticking is to be removed, in case an application for removing the image sticking is being executed in the mobile terminal according to the exemplary embodiment of the present disclosure.

FIG. 31 illustrates an exemplary display screen of a multimedia device from which the image sticking is to be removed, in case an application for removing the image sticking is being executed in the mobile terminal according to the exemplary embodiment of the present disclosure.

In case the application for removing image sticking is executed, and in case a signal for establishing connection with a specific external device (i.e., multimedia device 200) is received, the controller 180 of the mobile terminal 100 may control the wireless communication unit 110 so as to establish wireless connection with the multimedia device 200. The specific external device may correspond to a device among multiple devices having previous connection history, as described above with reference to FIG. 29, or the specific external device may correspond to a device among multiple devices that have been verified by the discovery process, as described above with reference to FIG. 27.

In response to the signal for establishing wireless connection, which is transmitted from the mobile terminal 100, the controller 270 of the multimedia device 200 may control the network interface unit 213 in order to establish wireless connection with the mobile terminal 100, and, then, the controller 270 may output the first display screen to the display unit 240.

The first display screen 810 may correspond to a display screen, wherein, among a plurality of light-emitting diodes included in the display unit 240, a light-emitting diode corresponding to an arbitrary wavelength region is activated. According to the exemplary embodiment, a type of light-emitting diode on which the image sticking removal process is to be performed is selected by the user, as described above with reference to FIG. 26, and, in case information related to the selected light-emitting diode is received from the mobile terminal 100 to the multimedia device 200, the controller 270 of the multimedia device 200 may output the first display screen 810, wherein a light-emitting diode corresponding to a predetermined arbitrary wavelength region is activated among a plurality of light-emitting diodes included in the display unit 240, to the display unit 240 based upon the received information related to the light-emitting diode.

Hereinafter, examples of a process for capturing images of a display screen of the multimedia device 200 by using the mobile terminal 100 and for transmitting the captured image to the multimedia device 200 will be described in detail with reference to FIG. 32 to FIG. 38.

Figure 32:
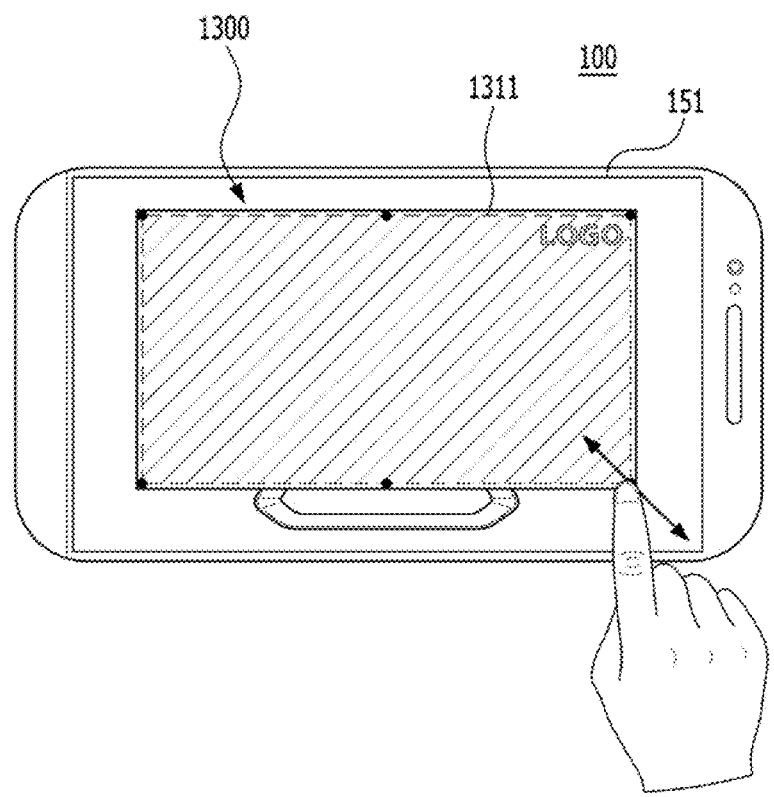
FIG. 32 illustrates an exemplary display screen being outputted to the display unit of the mobile terminal, in case imaging of a display screen of the multimedia device has been performed by using the mobile terminal according to the exemplary embodiment of the present disclosure.

FIG. 32 illustrates an exemplary display screen being outputted to the display unit of the mobile terminal, in case imaging of a display screen of the multimedia device has been performed by using the mobile terminal according to the exemplary embodiment of the present disclosure.

As described above with reference to FIG. 29, after adjusting the location of the mobile terminal 100 so that the display unit 240 of the multimedia device 200 can be located within the preview image 1200, and by selecting the Capture menu 1210, the user may acquire a first image 1300.

Thereafter, referring to FIG. 32, the controller 180 of the mobile terminal 100 may output the acquired first image 1300 to the display unit 151.

According to the exemplary embodiment, the controller 180 may also detect an area corresponding to the display unit 240 of the multimedia device 200 from the first image 1300. For example, by using an outline detection algorithm, and so on, which is stored in the memory 170, the controller 180 may detect an area corresponding to the display unit of the display device, from which the image sticking is to be removed, from the image acquired by the camera 121 in order to remove image sticking.

The controller 180 may detect an area corresponding to the display unit 240 of the multimedia device 200 from the first image 1300, and, then, the controller 180 may output an indicator 1311 indicating the detected area to the display unit 151 of the mobile terminal 100. According to the exemplary embodiment, the user may adjust the size of the indicator 1311 by touching arbitrary points of the indicator 1311 and dragging the indicator 1311 inward or outward, or the user may adjust the location of the indicator 1311 by touching arbitrary points of the indicator 1311 and dragging the indicator 1311 to another location. Thus, in case the area detected by the controller 180 does not match with the area corresponding to the display unit 240 of the multimedia device 200 within the first image 1300, the user may adjust the indicator 1311, so that the indicator 1311 can match (or coincide) with the area corresponding to the display unit 240 of the multimedia device 200 within the actual first image 1300.

Alternatively, according to the exemplary embodiment, without having to detect the area corresponding to the display unit 240 of the multimedia device 200 from the first image 1300, the controller 180 may control the display unit 151 so that the display unit 151 can output the indicator 1311 on a predetermined area within the first image 1300. Thereafter, the user may adjust the size of the indicator 1311 by touching arbitrary points of the indicator 1311 and by dragging the indicator 1311 inward or outward, or the user may adjust the location of the indicator 1311 by touching arbitrary points of the indicator 1311 and by dragging the indicator 1311 to another location, so that the indicator 1311 can match (or coincide) with the area corresponding to the display unit 240 of the multimedia device 200 within the actual first image 1300.

The controller 180 may store or temporarily store information related to the area corresponding to the display unit 240 of the multimedia device 200 within the first image 1300 in the memory 170.

When information related to the first image 1300 is transmitted to the multimedia device 200, which will be described in detail later on with reference to FIG. 38, by transmitting the information related to the area corresponding to the display unit 240 of the multimedia device 200 within the first image 1300 to the multimedia device 200, the controller 180 may contribute to enhancing accuracy in removing image sticking from the multimedia device 200.

Alternatively, according to the exemplary embodiment, when outputting only the area that is finally selected by the indicator 1311 from the first image 1300, and when transmitting the information related to the first image 1300 to the multimedia device 200, which will be described later on in detail with reference to FIG. 38, by transmitting the information related to the area that is finally selected by the indicator 1311 within the first image 1300 to the multimedia device 200, the controller 180 may also contribute to enhancing accuracy in removing image sticking from the multimedia device 200.

Meanwhile, according to the exemplary embodiment of the present disclosure, the user may also directly select the image sticking area from the acquired first image 1300. This will hereinafter be described in detail with reference to FIG. 33 and FIG. 34.

Figure 33:
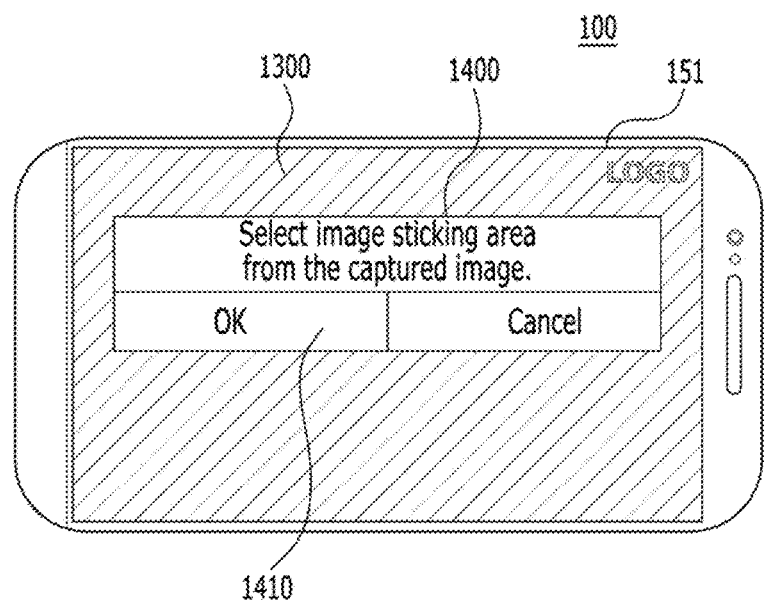
FIG. 33 illustrates an exemplary display screen being outputted to the display unit of the mobile terminal according to the exemplary embodiment of the present disclosure.

FIG. 33 illustrates an exemplary display screen being outputted to the display unit of the mobile terminal according to the exemplary embodiment of the present disclosure.

The controller 180 of the mobile terminal 100 may output the first image 1300, which is acquired by the camera 121, to the display unit 151. The first image 1300 may correspond to an image of the first display screen 610, which is outputted to the display unit 240 of the multimedia device 200, that captured by the camera 121, as described above, and, according to the exemplary embodiment, the first image 1300 may also refer to the area that is finally selected by the indicator 1311 within the first image 1300 acquired by the camera 121, as described above with reference to FIG. 32.

The first image 1300 that is acquired by the camera 121 may be transmitted to the multimedia device 200 so as to be used for removing image sticking in the display unit 240 of the multimedia device 200. In this case, before the first image 1300 is transmitted to the multimedia device 200 from the mobile terminal 100, the user may also directly select the image sticking area from the first image 1300.

According to the exemplary embodiment, the controller 180 may output a guidance message 1400 to the display unit 151, wherein the guidance message 1400 directs (or guides) the user to select the image sticking area from the captured image. Herein, the guidance message 1400 may be outputted within the first image 1300.

Figure 34:
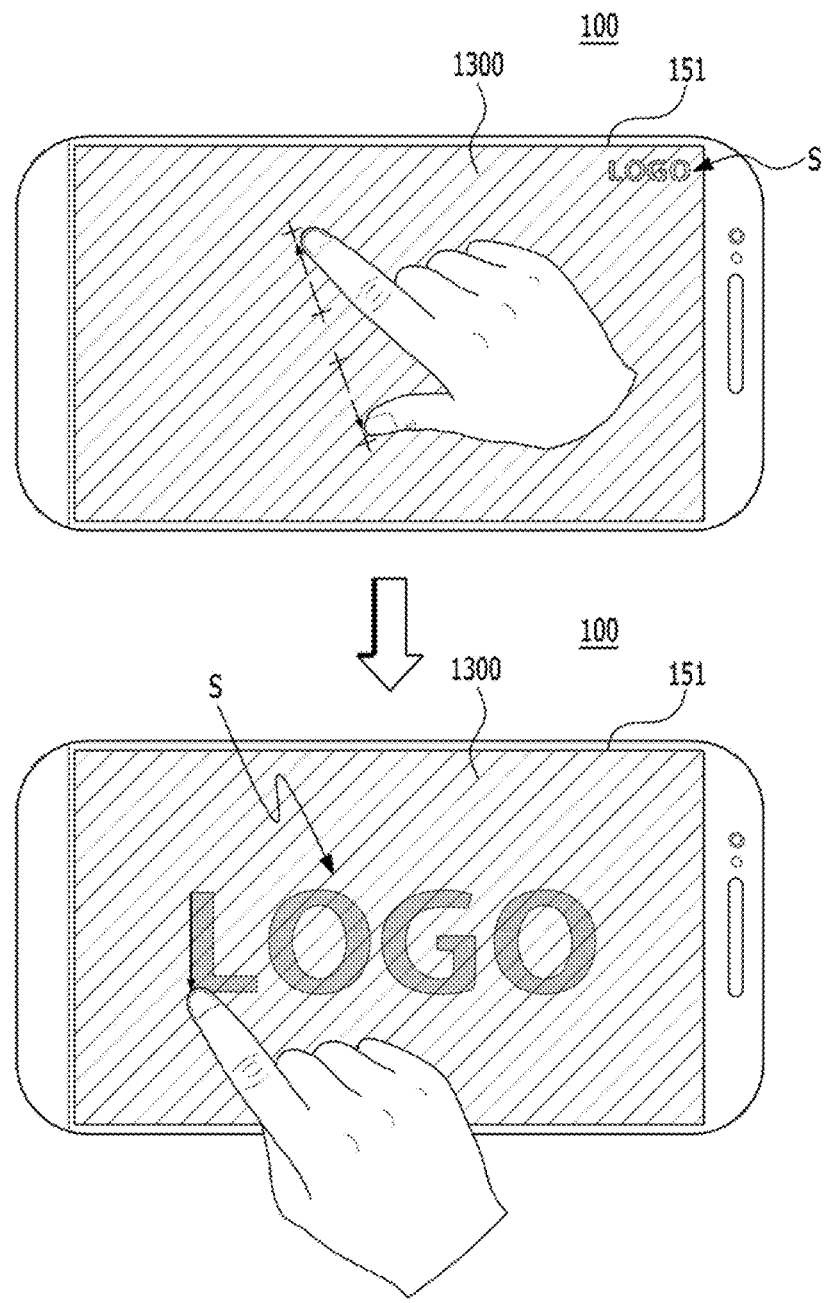
FIG. 34 illustrates an exemplary method used by the user for selecting an image sticking area in the mobile terminal according to the exemplary embodiment of the present disclosure.

FIG. 34 illustrates an exemplary method used by the user for selecting an image sticking area in the mobile terminal according to the exemplary embodiment of the present disclosure.

When an OK menu 1410 included in the guidance message 1400, which is described above with reference to FIG. 33, is selected, the display screen shown in FIG. 34 may be outputted to the display unit 151.

The controller 180 of the mobile terminal 100 may output the first image 1300 to the display unit 151, and the controller 180 may detect a signal (i.e., user command) for selecting the image sticking area from the first image 1300. For example, the user command may correspond to the touch input that is being received through the touch screen 151.

According to the exemplary embodiment, when it is difficult to select the image sticking are due to the small size of the image sticking S included in the first image 1300, the user may select the image sticking area after enlarging the corresponding image sticking S by zooming-in the first image 1300. Since the process of selecting the image sticking area by using the touch input is similar to the process described above with reference to FIG. 17, detailed description of the same will be omitted for simplicity.

When the process of selecting the image sticking area is completed, the controller 180 may store or temporarily store information related to the selected image sticking area to the memory 170.

Meanwhile, according to the exemplary embodiment of the present disclosure, the controller 180 of the mobile terminal 100 may analyze the acquired first image 1300 and may then detect the image sticking area. This will hereinafter be described in detail with reference to FIG. 35 and FIG. 36.

Figure 35:
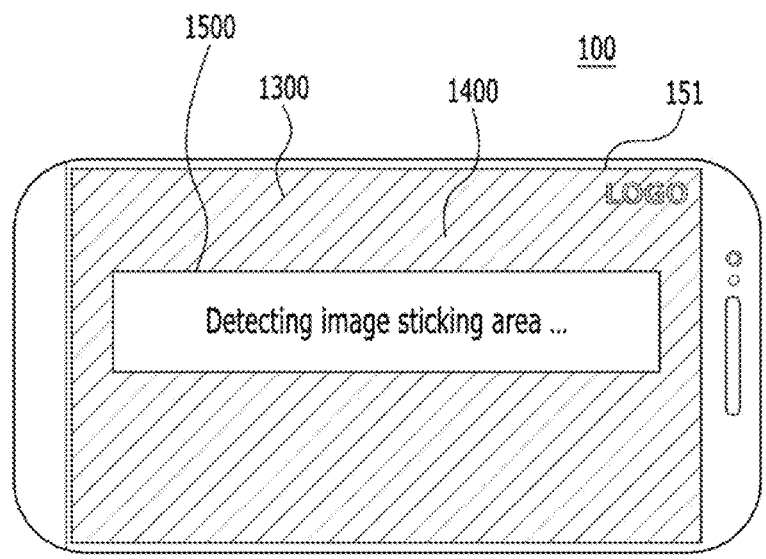
FIG. 35 illustrates an exemplary method for selecting an image sticking area in the mobile terminal according to the exemplary embodiment of the present disclosure.

FIG. 35 illustrates an exemplary method for selecting an image sticking area in the mobile terminal according to the exemplary embodiment of the present disclosure.

The controller 180 of the mobile terminal 100 may output the first image 1300, which is acquired by the camera 121, to the display unit 151. The first image 1300 may correspond to an image of the first display screen 610, which is outputted to the display unit 240 of the multimedia device 200, that is captured by the camera 121, as described above, and, according to the exemplary embodiment, the first image 1300 may also refer to the area that is finally selected by the indicator 1311 within the first image 1300 acquired by the camera 121, as described above with reference to FIG. 32.

The first image 1300 that is acquired by the camera 121 may be transmitted to the multimedia device 200 so as to be used for removing image sticking in the display unit 240 of the multimedia device 200. In this case, before the first image 1300 is transmitted to the multimedia device 200 from the mobile terminal 100, the controller 180 may detect the image sticking area that is included in the first image 1300. More specifically, the controller 180 may detect an area that is presumed as the image sticking S from the first image 1300.

According to the exemplary embodiment, in case the user directly selects the image sticking area from the first image 1300, as described above with reference to FIG. 34, the controller 180 may not detect the image sticking area, and, even if the user directly selects the image sticking area from the first image 1300, the controller 180 may still detect the image sticking area in order to enhance accuracy in the process of removing image sticking, and the controller 180 may also detect the image sticking area regardless of whether or not the user has directly selected the image sticking area from the first image 1300. Alternatively, according to the exemplary embodiment, in case the user directly selects the image sticking area from the first image 1300, as described above with reference to FIG. 34, the controller 180 may detect the image sticking area based upon the information related to the image sticking area, which is selected by the user.

For example, the controller 180 analyzes the luminance of the first image 1300 and, then, detects a first area having a luminance level equal to or less than a predetermined luminance level. And, in case a difference between the luminance of the detected first area and the luminance of the surrounding area of the detected first area is equal to or greater than a predetermined difference level, the controller 180 may detect the first area as the image sticking area. The controller 180 may store or temporarily store information related to the first area to the memory 170. For example, the information related to the first area may include at least one of luminance data of the first area, position data of the first area within the first image 1300, and form data (or shape data) of the first area.

According to the exemplary embodiment, after detecting the image sticking area from the first image 1300, the controller 180 may also output a guidance message so as to allow the user to verify the detected image sticking area. This will hereinafter be described in detail with reference to FIG. 36.

Figure 36:
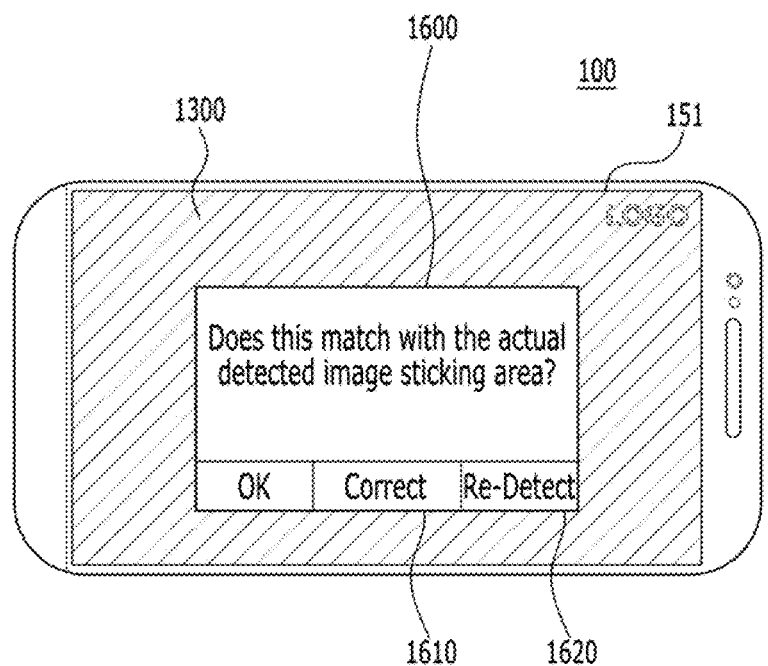
FIG. 36 illustrates an exemplary display screen being outputted to the display unit of the mobile terminal according to the exemplary embodiment of the present disclosure.

FIG. 36 illustrates an exemplary display screen being outputted to the display unit of the mobile terminal according to the exemplary embodiment of the present disclosure.

The controller 180 detects the image sticking image from the first image 1300, as described above with reference to FIG. 35, and, then, the controller 180 may output a guidance message 1600 to the display unit 151, wherein the guidance message 1600 allows the user to verify the detected image sticking area. According to the exemplary embodiment, the controller may also output outlines, arrows, and/or indicators, which indicate the detected image sticking area, on the first image 1300.

For example, by selecting a Correct menu 1610 from the guidance message 1600, the user may directly correspond at least a portion of the image sticking area, which is detected by the controller 180. As another example, by selecting a Re-Detect menu 1620 from the guidance message 1600, the user may allow the controller 180 to re-detect the image sticking area from the first image 1300.

According to the exemplary embodiment, the controller 180 may also include information related to letters (or characters), shapes, icons, logos, and so on, which correspond to the detected image sticking area, in the guidance message 1600 and may output the guidance message 1600 including the corresponding information. For example, the controller 180 may also output a guidance message 1600 including a question or statement, such as "Is the detected image sticking LOGO?".

Meanwhile, according to the exemplary embodiment of the present disclosure, the controller 180 of the mobile terminal 100 may allow the user to select a logo or indicator that is related to the image sticking. And, this will hereinafter be described in detail with reference to FIG. 37.

Figure 37:
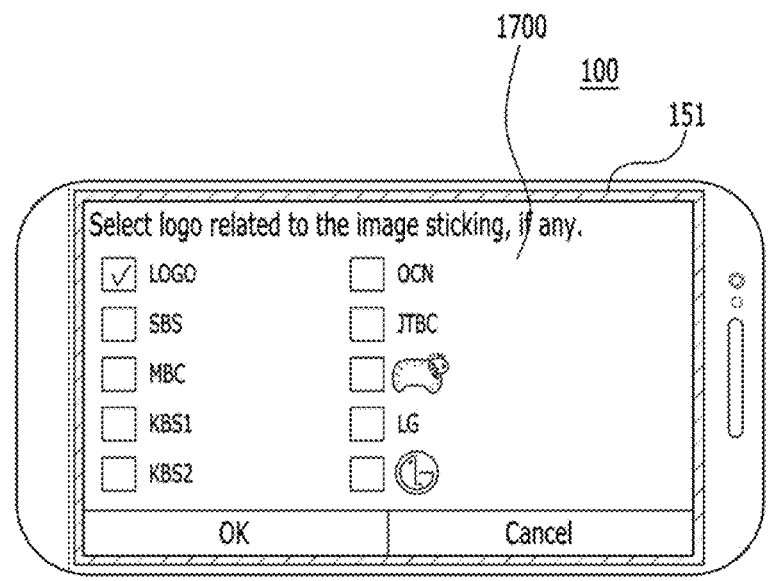
FIG. 37 illustrates an exemplary display screen being outputted to the display unit of the mobile terminal according to the exemplary embodiment of the present disclosure.

FIG. 37 illustrates an exemplary display screen being outputted to the display unit of the mobile terminal according to the exemplary embodiment of the present disclosure.

The controller 180 of the mobile terminal 100 may output a GUI to the display unit 151 in order to allow the user to select a logo/indicator that is related to the image sticking. For example, in the exemplary embodiment, a GUI 1700 allowing the user to select a logo that is related to the image sticking is illustrated in the drawing. Since the GUI that is provided to allow the user to select an indicator that is related to the image sticking is similar to the GUI that is described above with reference to FIG. 18, the detailed description of the same will be omitted for simplicity.

The memory 170 may store logo-related information that is related to a logo of a predetermined channel, a logo of a program being transmitted through each channel, and so on. Herein, the logo-related information may include at least one of first information being related to a form of the logo and second information being related to a location where the logo is being displayed within the display screen. Since such logo-related information is similar to the logo-related information described above with reference to FIG. 17, the detailed description of the same will be omitted for simplicity.

In case a specific logo is selected through the GUI 1700, information related to the selected logo may be stored or temporarily stored in the memory 170.

The controller 180 may output the GUI 1700 after the user has selected the image sticking area from the first image 1300, as described above with reference to FIG. 33 and FIG. 34, or the controller 180 may output the GUI 1700 before the user selects the image sticking area from the first image 1300, as described above with reference to FIG. 33 and FIG. 34, or the controller 180 may output the GUI 1700 before the first image 1200 or the first image 1300 is acquired, or the controller 180 may output the GUI 1700 after the image sticking area has been detected from the first image 1300, as described above with reference to FIG. 35 and FIG. 36, or the controller 180 may output the GUI 1700 before the image sticking area is detected from the first image 1300, as described above with reference to FIG. 35 and FIG. 36.

According to the exemplary embodiment, when information related to the first image 1300 is transmitted to the multimedia device 200, which will be described in detail later on with reference to FIG. 38, by transmitting the information related to the logo, which is selected through the GUI 1700, to the multimedia device 200, the controller 180 may contribute to enhancing accuracy in removing image sticking from the multimedia device 200.

Figure 38:
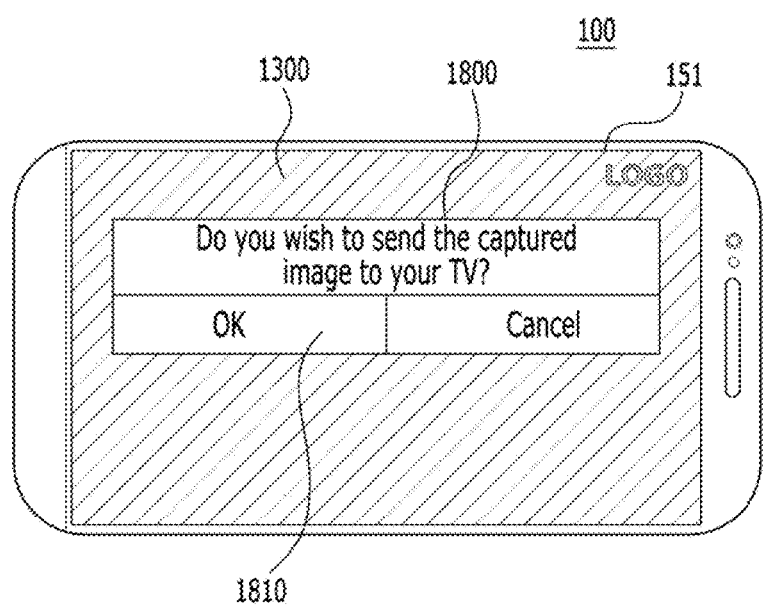
FIG. 38 illustrates an exemplary method for transmitting information related to an image to the multimedia device from the mobile terminal according to the exemplary embodiment of the present disclosure.

FIG. 38 illustrates an exemplary method for transmitting information related to an image to the multimedia device from the mobile terminal according to the exemplary embodiment of the present disclosure.

The controller 180 of the mobile terminal 100 may control the wireless communication unit 110 so that the information related to the first image 1300, which is acquired by the camera 121, can be transmitted to the multimedia device 200. Herein, the information related to the first image 1300 may include at least one of image data of the first image 1300, which is acquired by the camera 121, position data of an area that is presumed to be an image sticking (e.g., area detected by the controller 180 and/or area selected by the user) within the first image, shape data (or form data) of an area that is presumed to be an image sticking (e.g., area detected by the controller 180 and/or area selected by the user) within the first image, luminance data of an area that is presumed to be an image sticking (e.g., area detected by the controller 180 and/or area selected by the user) within the first image, data related to a logo of a specific channel, and data related to a specific indicator.

According to the exemplary embodiment, the controller may output a guidance message 1800 for verifying whether or not the first image 1300 is to be transmitted to the multimedia device 200 to the display unit 151. The guidance message 1800 may be outputted after the first image 1300 has been acquired, or the guidance message 1800 may be outputted after the image sticking area has been selected from the first image 1300 by the user, or the guidance message 1800 may be outputted after the sticking image area has been detected from the first image 1300 by the controller 180, or the guidance message 1800 may be outputted after the logo/indicator related to the image sticking has been selected by the user. Herein, the guidance message 1800 may be outputted on the first image 1300.

When the user selects an OK menu 1810 from the guidance message 1800, the controller 180 may control the wireless communication unit 110 so that the information related to the first image 1300 can be transmitted to the multimedia device 200.

The multimedia device 200 may then remove the image sticking included in the first display screen 810 based upon the information related to the first image 1300, which is transmitted from the mobile terminal 100. This will be described later on in more detail with reference to FIG. 39 and FIG. 40.

Figure 39:
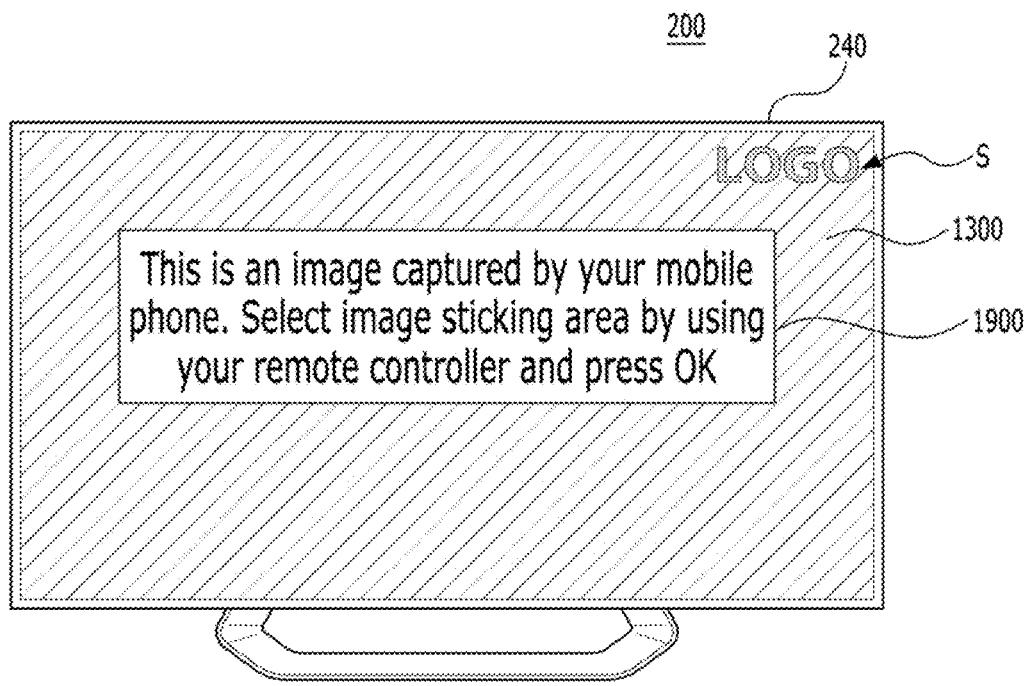
FIG. 39 illustrates an exemplary display screen being outputted to the display unit of the multimedia device according to the exemplary embodiment of the present disclosure.

FIG. 39 illustrates an exemplary display screen being outputted to the display unit of the multimedia device according to the exemplary embodiment of the present disclosure.

The controller 270 of the multimedia device 200 controls the network interface unit 213 so that information related to the first image 1300 transmitted from the mobile terminal 100 can be received.

The controller 270 may output the first image 1300 to the display unit 240 based upon the received information related to the first image 1300. For example, in case at least one of position data of an area that is presumed to be an image sticking (e.g., area detected by the controller 180 and/or area selected by the user) within the first image, shape data (or form data) of an area that is presumed to be an image sticking (e.g., area detected by the controller 180 and/or area selected by the user) within the first image, luminance data of an area that is presumed to be an image sticking (e.g., area detected by the controller 180 and/or area selected by the user) within the first image, data related to a logo of a specific channel, and data related to a specific indicator is not included in the received information related to the first image 1300, the controller 270 may output the first image to the display unit 240, thereby allowing the user to select the image sticking area from the first image 1300. Since the method for removing image sticking from the first image 1300 by using the remote controller is similar to the method described above with reference to FIG. 8 to FIG. 11, the detailed description of the same will be omitted for simplicity. Additionally, according to the exemplary embodiment, the controller 270 may output the GUI 400, which is described above with reference to FIG. 12, to the display unit 240, and detailed description of the same will be omitted for simplicity.

According to the exemplary embodiment, the controller 270 may also output a guidance message 1900 to the display unit 240, wherein the guidance message 1900 guides (or directs) the user to select an image sticking area by using the remote controller.

Figure 40:
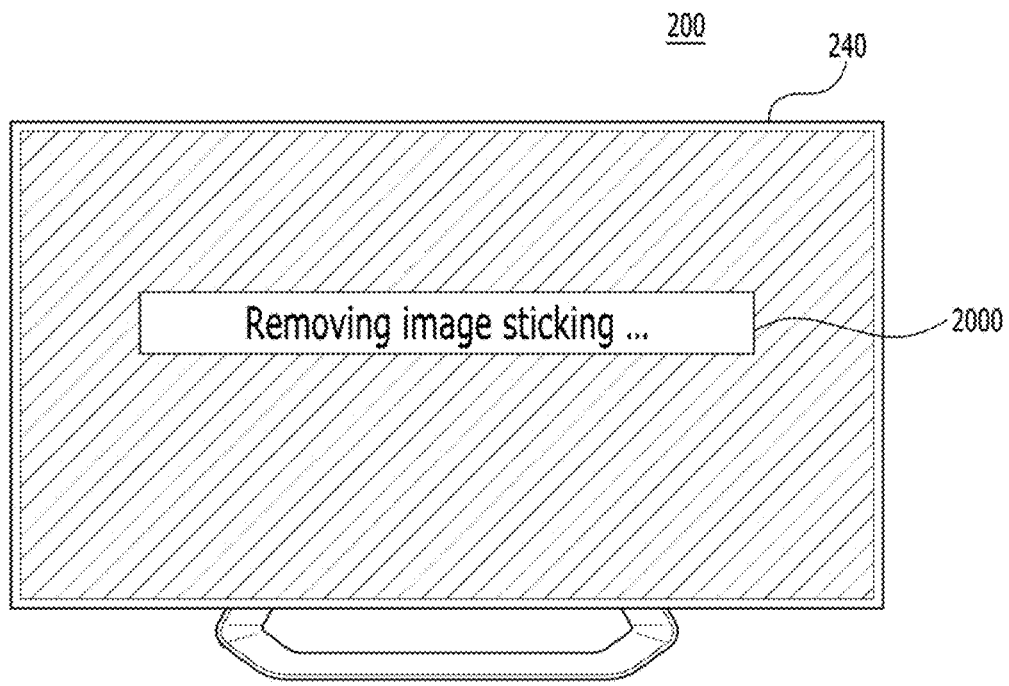
FIG. 40 illustrates a flow chart showing another exemplary method for removing image sticking in the display device according to the exemplary embodiment of the present disclosure.

FIG. 40 illustrates a flow chart showing another exemplary method for removing image sticking in the display device according to the exemplary embodiment of the present disclosure.

The controller 270 of the multimedia device 200 may detect an image sticking area from the first display screen based upon the information related to the received first image 1300.

For example, the controller 270 may detect the image sticking area from the first display screen 810 based upon the image sticking area, which is selected by the user as described above with reference to FIG. 39.

As another example, the controller 270 may detect the image sticking area from the first display screen 810 based on at least one of position data of an area that is presumed to be an image sticking (e.g., area detected by the controller 180 and/or area selected by the user) within the first image, shape data (or form data) of an area that is presumed to be an image sticking (e.g., area detected by the controller 180 and/or area selected by the user) within the first image, luminance data of an area that is presumed to be an image sticking (e.g., area detected by the controller 180 and/or area selected by the user) within the first image, data related to a logo of a specific channel, and data related to a specific indicator, which are included in the information related to the received first image 1300.

Thereafter, the controller 270 may adjust the luminance of the display unit 240, which corresponding to the surrounding area of the detected image sticking area. For example, by reducing the luminance of the light-emitting diode corresponding to the surrounding area of the detected image sticking area, the controller 270 may remove the image sticking S, which is recognized by the eyes of the user.

For example, the controller 270 may adjust the luminance of the display unit 240 by using the GUI, which is described above with reference to FIG. 13 to FIG. 15.

As another example, the controller 270 detects the luminance of the detected image sticking area and the luminance of the surrounding area of the image sticking area from the first display screen 810, based upon the image data of the first image 1300 included in the information related to the first image 1300. Thereafter, the controller 270 may automatically adjust the luminance of the display unit 240 corresponding to the surrounding area of the detected image sticking area, so that the difference between the luminance of the detected image sticking area and the luminance of the surrounding area can be reduced.

As yet another example, the controller 270 may automatically adjust the luminance of the display unit 240 corresponding to the surrounding area of the detected image sticking area, so that the difference between the luminance of the detected image sticking area and the luminance of the surrounding area can be reduced, based upon at least one of position data of an area that is presumed to be an image sticking (e.g., area detected by the controller 180 and/or area selected by the user) within the first image, shape data (or form data) of an area that is presumed to be an image sticking (e.g., area detected by the controller 180 and/or area selected by the user) within the first image, luminance data of an area that is presumed to be an image sticking (e.g., area detected by the controller 180 and/or area selected by the user) within the first image, data related to a logo of a specific channel, and data related to a specific indicator.

Figure 41:
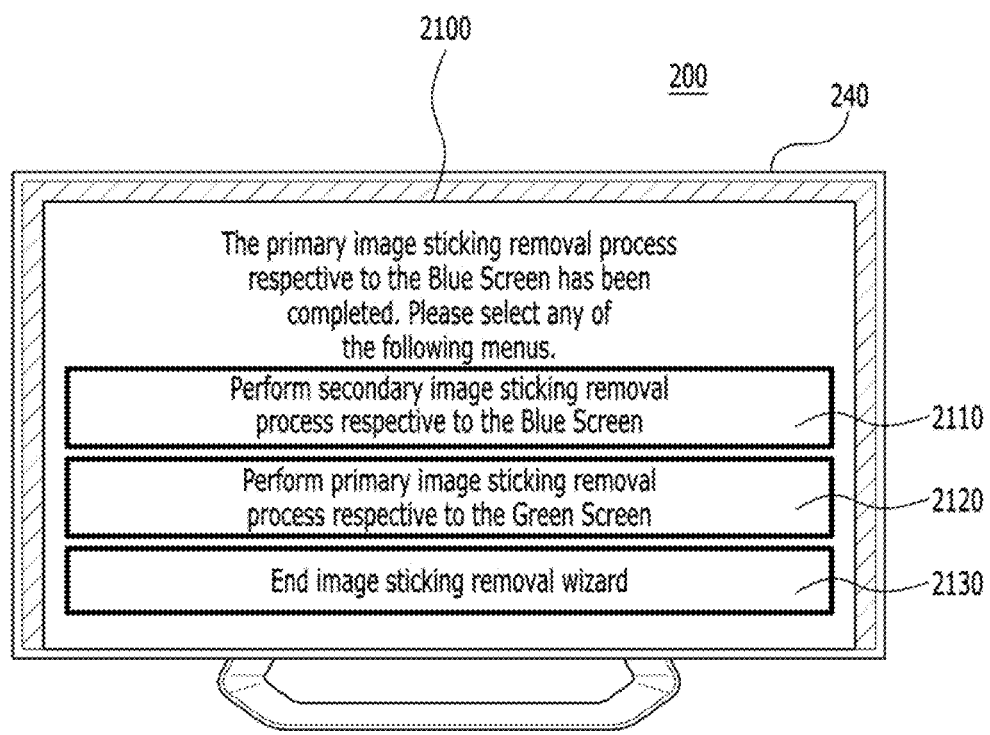
FIG. 41 illustrates an exemplary display screen being outputted to the display unit after a primary image sticking removal process is performed in the multimedia device according to the exemplary embodiment of the present disclosure.

FIG. 41 illustrates an exemplary display screen being outputted to the display unit after a primary image sticking removal process is performed in the multimedia device according to the exemplary embodiment of the present disclosure.

After the luminance of the display unit 240 corresponding to the surrounding area of the detected image sticking area is adjusted, the controller 270 of the multimedia device 200 may re-output the first display screen 810, wherein the first light-emitting diode is activated, to the display unit 240. The image sticking S may not be seen in the re-outputted first display screen 810, and, in case the image sticking removal process has not been performed perfectly, a more or less vaguely remaining image sticking S may be seen.

According to the exemplary embodiment, the controller 270 may display a guidance message 2100 to the display unit 240, wherein the guidance message 2100 guides (or directs) the user to a following process after a primary image sticking removal process has been completed with respect to the first light-emitting diode. For example, the guidance message 2100 may include a first menu for performing a secondary image sticking removal process with respect to the first light-emitting diode (e.g., Blue light-emitting diode), a second menu for performing a secondary image sticking removal process with respect to another light-emitting diode (e.g., Green light-emitting diode), and a third menu for ending (or terminating) the application for removing image sticking.

When the user selects the first menu 2110 from the guidance message 2100, at least a part of the process, which is described above with reference to FIG. 22 to FIG. 40, may be performed once again. According to the exemplary embodiment, in case the image sticking area is detected from the first display screen 810 during the secondary image sticking process respective to the first light-emitting diode, the controller 270 may refer to the image sticking area, which is detected from the first display screen 810 during the initial primary image sticking removal process. Additionally, even when deciding a gain value that is being used for adjusting the luminance of the display unit 240, which corresponds to the surrounding area of the image sticking area of the first display screen 810, during the secondary image sticking removal process respective to the first light-emitting diode, the controller 270 may refer to the gain value that has been used for adjusting the luminance of the display unit 240, which corresponds to the surrounding area of the image sticking area of the first display screen 810, during the initial primary image sticking removal process respective to the first light-emitting diode.

When the user selects the second menu 2120 from the guidance message 2100, at least a part of the process, which is described above with reference to FIG. 22 to FIG. 40, may be similarly performed with respect to the second light-emitting diode. Apart from the process being applied to the second light-emitting diode instead of the first light-emitting diode, since this process is similar to the process, which is described above with reference to FIG. 22 to FIG. 40, the detailed description of the same will be omitted for simplicity.

When the user selects the third menu 2130 from the guidance message 2100, the controller 270 may end (or terminate) the application for removing image sticking.

Hereinafter, an example of an image sticking removal process respective to the second light-emitting diode, which is included in the display unit 240 of the multimedia device 200, will be described in detail with reference to FIG. 42 to FIG. 44. Also, parts of the description that overlap with the description provided above with reference to FIG. 21 to FIG. 41 will be omitted for simplicity.

Figure 42:
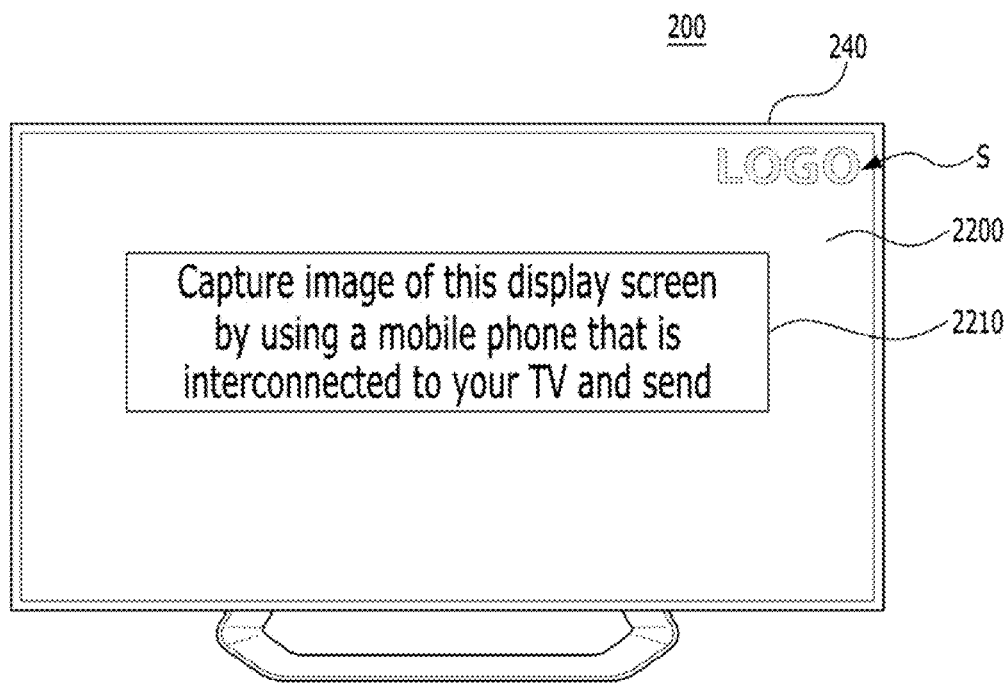
FIG. 42 illustrates an exemplary display screen being outputted to the display unit of the multimedia device according to the exemplary embodiment of the present disclosure.

FIG. 42 illustrates an exemplary display screen being outputted to the display unit of the multimedia device according to the exemplary embodiment of the present disclosure.

For example, in case the user has selected the Green light-emitting diode from the execution screen 410 of the application for removing image sticking, as described above with reference to FIG. 7, or in case the user has selected the Green light-emitting diode from the execution screen 1000 of the application for removing image sticking, as described above with reference to FIG. 26, or in case the image sticking removal process respective to the Blue light-emitting diode has been completed, as described above with reference to FIG. 22 to FIG. 40, a second display screen 2200 shown in FIG. 42 may be outputted to the display unit 240.

The controller 270 may output the second display screen 2200 on the display unit 240, wherein, among the light-emitting diodes included in the display unit 240, the second light-emitting diode (e.g., Green light-emitting diode) is activated, and wherein the other light-emitting diodes are deactivated. According to this exemplary embodiment, it is assumed that an image sticking S represented as "LOGO" is displayed (or shown) in the second display screen 2200.

According to the exemplary embodiment, the controller 270 may transmit a guidance message 2210 to the display unit 240, wherein the guidance message 2210 directs the user to capture an image (or perform imaging) of the second display screen 2200 by using the mobile terminal 100, which is interconnected to the multimedia device 200, and to transmit the captured image to the multimedia device 200.

Figure 43:
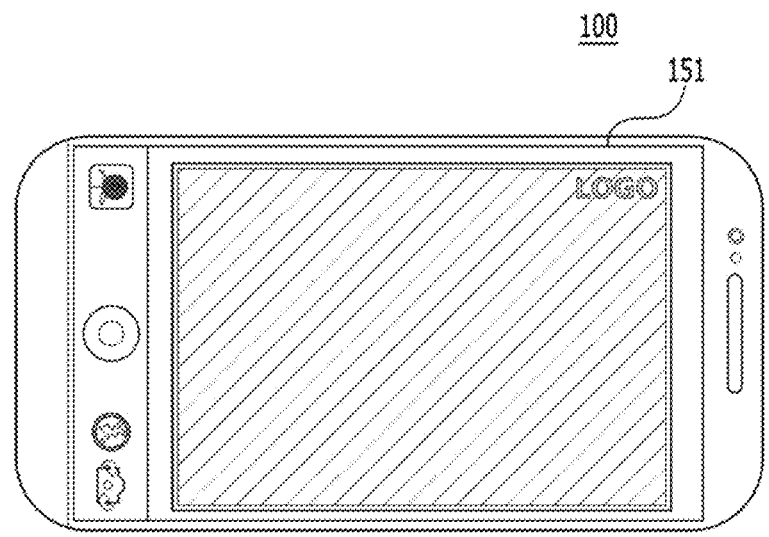
FIG. 43 illustrates an exemplary display screen being outputted to a display unit, in case an image sticking removal application is being executed in the mobile terminal according to the exemplary embodiment of the present disclosure.

FIG. 43 illustrates an exemplary display screen being outputted to a display unit, in case an image sticking removal application is being executed in the mobile terminal according to the exemplary embodiment of the present disclosure.

The controller 180 of the mobile terminal 100 may activate the camera 121 and may then output a preview image 1200, which is acquired by the camera 121, to the display unit 151. For example, in case the second display screen 2200 is outputted to the display unit 240, as shown in FIG. 42, the controller 270 of the multimedia device 200 transmits a predetermined first signal, which is configured to notify such output, to the mobile terminal 100 through the network interface unit 213. And, then, when the first signal is received through the wireless communication unit 110, the controller 180 of the mobile terminal 100 may activate the camera 121 and may then output the preview image 1200, which is acquired by the camera 121, to the display unit 151. As another example, in case the information related to the first image 1300 is transmitted to the multimedia device 200, as described above with reference to FIG. 38, the controller 180 of the mobile terminal 100 may activate the camera 121 once again and may then output the preview image 1200, which is acquired by the camera 121, to the display unit 151.

According to the exemplary embodiment, the controller 180 may also transmit a guidance message guiding (or directing) the user to perform a proper and correct method for capturing an image of the second display screen 2200 to the display unit 151 of the mobile terminal 100.

Since the following process steps of the image sticking removal process respective to the second light-emitting diode are similar to those described above with reference to FIG. 22 and FIG. 41, the detailed description of the same will be omitted for simplicity.

According to the exemplary embodiment, in case the image sticking removal process can be performed by self-capturing of the first display device, the first display device may capture a display screen, wherein each of the R/G/B/W light-emitting diodes, which are equipped to the display unit 151, is activated in accordance with a predetermined order, or the first display device may capture a display screen, wherein only the light-emitting diodes selected by the user, among the R/G/B/W light-emitting diodes, which are equipped to the display unit 151, are activated. Thereafter, the first display device may analyze the luminance of the captured display screen, and, then, the first display device may perform the image sticking removal process with respect to each light-emitting diode accordingly. In this case, with the exception for the fact that the subject acquiring the first image corresponds to the first display device instead of the second display device, since the rest of the process is identical or similar to the process, which is described above with reference to FIG. 21 to FIG. 31, the detailed description of the image sticking removal process performed by self-capturing of the first display device will be omitted for simplicity. Additionally, in case the image sticking removal process performed by self-capturing of the first display device can be performed, and in case the application for removing image sticking is executed, the first display device may perform the image sticking removal process with respect to each of the light-emitting diodes being included in the display unit without any separate user command (or user direction). Additionally, when a specific time point, which is reserved (or pre-arranged) by the user, is reached, by automatically executing the application for removing image, the first display device may perform the image sticking removal process with respect to each of the light-emitting diodes. Furthermore, in case the image sticking removal process performed by self-capturing of the first display device can be performed, such image sticking removal process may be performed periodically, or aperiodically, or in the background at a specific time reserved (or pre-arranged) by the user regardless of the power on/off state of the first display device.

Figure 44:
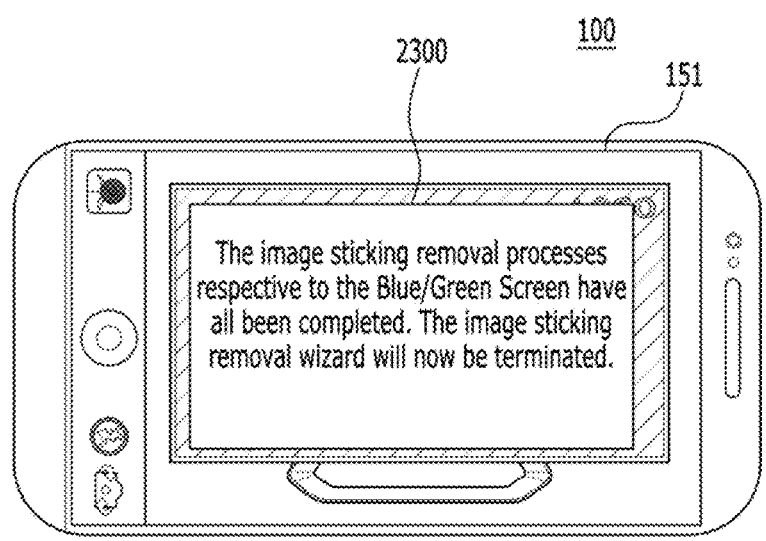
FIG. 44 illustrates an exemplary display screen being outputted to a display unit after a process of removing an image sticking of the multimedia device is completed in the mobile terminal according to the exemplary embodiment of the present disclosure.

FIG. 44 illustrates an exemplary display screen being outputted to a display unit after a process of removing an image sticking of the multimedia device is completed in the mobile terminal according to the exemplary embodiment of the present disclosure.

In case the image sticking removal process respective to all of the light-emitting diodes included in the display unit 240 of the multimedia device 200 is completed, or in case the image sticking removal process respective to predetermined types of light-emitting diodes, which are predetermined by the user among the light-emitting diodes included in the display unit 240 of the multimedia device 200, is completed, the controller 180 of the mobile terminal 100 may output a guidance message 2300 to the display unit 151, wherein the guidance message 2300 notifies the user of the ending (or termination) of the application for removing image.

In case a separate verification command inputted by the user is detected, or in case a predetermined period of time has elapsed since the output of the guidance message 2300, the controller 180 may end (or terminate) the application for removing image.

According to the exemplary embodiment, in case a separate verification command inputted by the user is detected, or in case a predetermined period of time has elapsed since the output of the guidance message 2300, the controller 180 may control the wireless communication unit 110 so that a predetermined second signal can be transmitted to the multimedia device 200. In case the second signal is detected through the network interface unit 213, the controller 270 of the multimedia device 200 may automatically end (or terminate) the application for removing image without any selected user command.

Hereinafter, referring to FIG. 45 to FIG. 48, in case the first display device corresponds to a first mobile terminal 100A, and in case the second display device corresponds to a second mobile terminal 100B, an example of the method for removing image sticking, which is described above with reference to FIG. 21, will be described in detail. However, part of the description that overlaps with the method described above with reference to FIG. 21 to FIG. 44 will be omitted for simplicity. In FIG. 45 to FIG. 48, with the exception that the first display device corresponds to the mobile terminal 100 and not the multimedia device 200, the method is mostly similar to the method described above with reference to FIG. 21 to FIG. 44.

Figure 45:
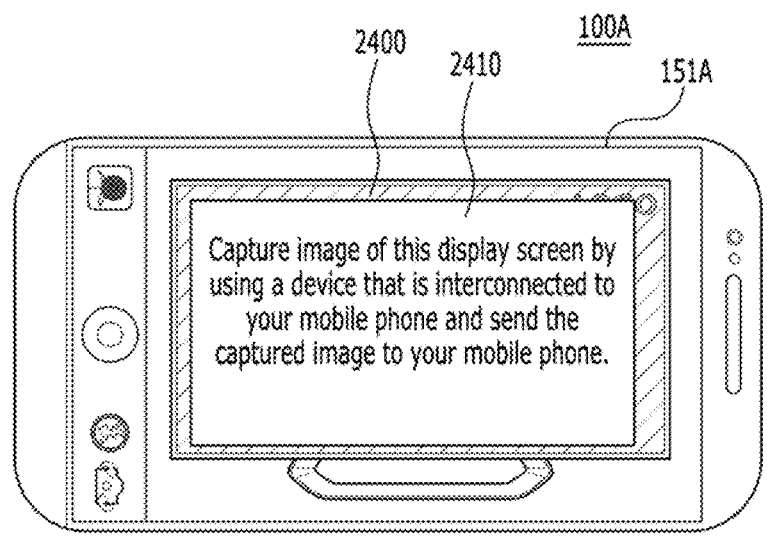
FIG. 45 illustrates an exemplary display screen being outputted to a display unit of a first mobile terminal, which is given as an exemplary of the first display device according to the exemplary embodiment of the present disclosure.

FIG. 45 illustrates an exemplary display screen being outputted to a display unit of a first mobile terminal, which is given as an exemplary of the first display device according to the exemplary embodiment of the present disclosure.

In case the application for removing image sticking is executed, the controller 180A of the first mobile terminal 100A may output a first display screen 2400 on the display unit 151A. Herein, the first display screen 2400 may correspond to a display screen, wherein, among the light-emitting diodes included in the display unit 151A, the first light-emitting diode corresponding to the first wavelength region is activated.

According to the exemplary embodiment, the controller 180A may output a guidance message 2410 to the display unit 151A, wherein the guidance message 2410 guides (or directs) the user to capture an image (or perform imaging) of the first display screen 2400 by using a device, which is interconnected to the first mobile terminal 100A, and to transmit the captured image to the first mobile terminal 100A.

Figure 46:
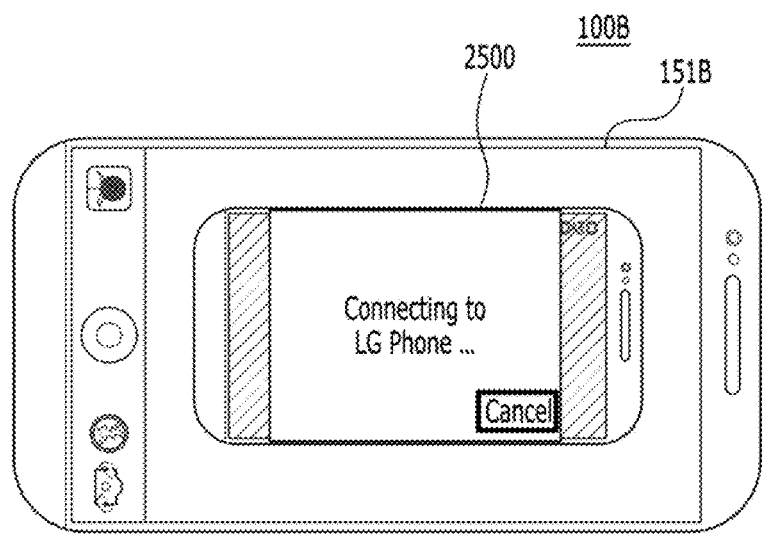
FIG. 46 illustrates an exemplary display screen being outputted to a display unit of a second mobile terminal, which is given as an exemplary of the second display device according to the exemplary embodiment of the present disclosure.

FIG. 46 illustrates an exemplary display screen being outputted to a display unit of a second mobile terminal, which is given as an exemplary of the second display device according to the exemplary embodiment of the present disclosure.

In case the application for removing image sticking is executed, the controller 180B of the second mobile terminal 100B may control the wireless communication unit 110B so as to establish wireless connection with a specific external device (i.e., the first mobile terminal 100A). Herein, the specific external device may correspond to The specific external device may correspond to a device among multiple devices having previous connection history with the second mobile terminal 100B, or the specific external device may correspond to a device that is selected by the user based upon a result of a discovery process searching for devices that can be connected to the second mobile terminal 100B via wireless communication.

According to the exemplary embodiment, the controller 180B may output a notification message 2500 to the display unit 151B, wherein the notification message 2500 notifies the user that connection to the specific external device is currently being established via wireless communication.

Figure 47:
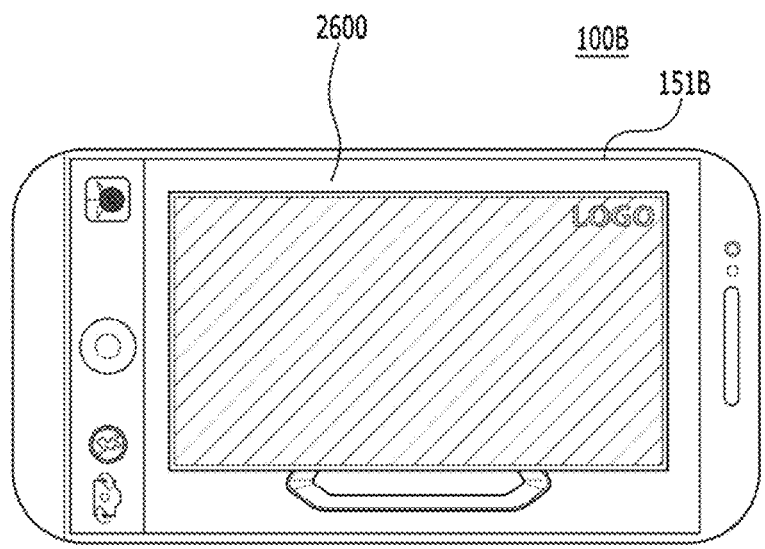
FIG. 47 illustrates an exemplary display screen being outputted to the display unit of the second mobile terminal according to the exemplary embodiment of the present disclosure.

FIG. 47 illustrates an exemplary display screen being outputted to the display unit of the second mobile terminal according to the exemplary embodiment of the present disclosure.

In case the application for removing image sticking is executed, the controller 180B of the second mobile terminal 100B may activate the camera 121B and may then output a preview image 2600, which is acquired by the camera 121B, to the display unit 151B.

According to the exemplary embodiment, the controller 180B may also transmit a guidance message guiding (or directing) the user to perform a proper and correct method for capturing an image of the first display screen 2400, which is outputted to the display unit 151A of the first mobile terminal 100A, to the display unit 151B of the second mobile terminal 100B.

Figure 48:
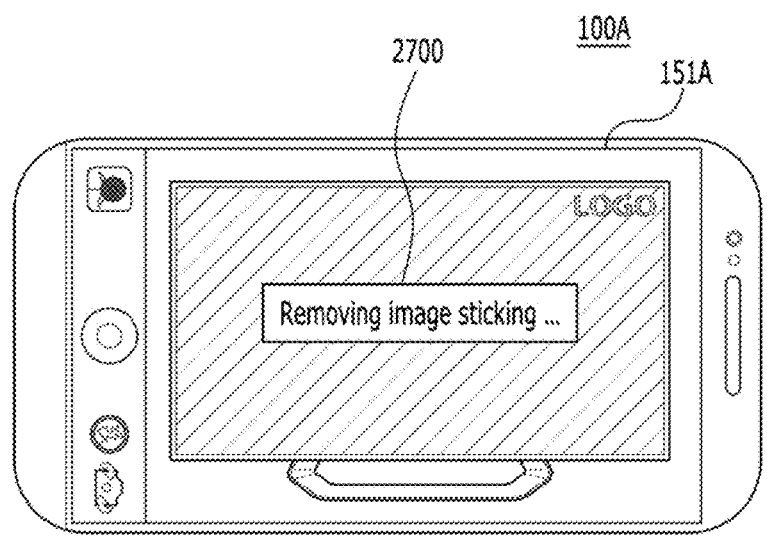
FIG. 48 illustrates an exemplary method for removing image sticking in a first mobile terminal according to the exemplary embodiment of the present disclosure.

FIG. 48 illustrates an exemplary method for removing image sticking in a first mobile terminal according to the exemplary embodiment of the present disclosure.

The controller 180A of the first mobile terminal 100A may detect the image sticking area from the first display screen 2400 based upon the information related to the first image, which is received from the second mobile terminal 100B. Since the method for detecting the image sticking area is similar to the method, which is described above with reference to FIG. 40, the detailed description of the same will be omitted for simplicity.

Thereafter, the controller 180A may adjust the luminance of the display unit 151A corresponding to the surrounding area of the detected image sticking area. Herein, since the method for adjusting luminance is similar to the method, which is described above with reference to FIG. 40, the detailed description of the same will be omitted for simplicity.

According to at least one exemplary embodiment of the present disclosure, in case a fixed image sticking (or afterimage) is generated in a display screen of a display unit at a level that can be recognized by the user, the present disclosure may provide a method for removing such image sticking.

As described above, the method for removing image sticking in a display device has the following advantages. According to at least one of the exemplary embodiments of the present disclosure, a method for removing image sticking that can remove image sticking generated on a screen (or display screen) of a display unit may be provided. And, according to at least another one of the exemplary embodiments of the present disclosure, a method for removing image sticking that can allow a user to remove the image sticking generated on the display screen of the display unit while verifying the process with his (or her) own eyes may be provided.

The above-described present disclosure may be realized as a code that can be read by a computer in a recording medium having a program recorded therein. The recording medium that can be read by the computer includes all types of recording devices storing data that can be read by a computer system. Examples of the recording media that can be read by the computer may include Hard Disk Drives (HDDs), Solid State Disks (SSDs), Silicon Disk Drives (SDDs), ROMs, RAMs, magnetic tapes, floppy disks, optical data storing devices, and so on. Also, an exemplary recording medium being realized in the form of a carrier wave (e.g., transmission via Internet) may also be included. Furthermore, the computer may also include a controller of a terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a display; and
   a controller to control the display to remove image sticking on the display, wherein the controller is configured to:
   execute an application for removing image sticking,
   control the display to display a display screen,
   identify an image sticking area from the display screen by using a remote controller, and
   adjust a luminance in an area of the display surrounding the image sticking area,
   wherein the controller is configured to control the display to display a GUI for adjusting a luminance in an area of the display adjacent to the image sticking area, and
   wherein the controller is configured to adjust the luminance in the area of the display adjacent to the image sticking area in accordance with a selection in the displayed GUI.

2. The display device of claim 1, wherein the controller detects a signal for selecting a portion of the display screen, and wherein the controller identifies the image sticking area based upon the portion of the display screen selected by the signal.

3. The display device of claim 1, further comprising:
   a memory configured to store information related to an indicator, the indicator being available for output on the display,
   wherein the information includes at least one of information of a form of the indicator or information of a position where the indicator is displayed on the display screen of the display.

4. The display device of claim 3, wherein the controller controls the display to display the GUI, the GUI including at least one indicator among a plurality of indicators related to the information stored in the memory,
   wherein the controller detects a signal to select the at least one indicator included in the GUI, and
   wherein the controller identifies the image sticking area based upon the information related to the selected indicator.

5. The display device of claim 1, further comprising:
   a memory configured to store information related to a logo of a channel available for viewing through the display device,
   wherein the information includes at least one of information of a form of the logo or information of a position where the logo is displayed on the display screen of the display.

6. The display device of claim 5, wherein the controller controls the display to display the GUI to include at least one logo among a plurality of logos related to the information stored in the memory,
   wherein the controller detects a signal for selecting the at least one logo included in the GUI, and wherein the controller detects the image sticking area based upon the information related to the logo selected by the signal.

7. The display device of claim 1, wherein the GUI includes an adjustment bar and an indicator on the adjustment bar corresponding to a luminance value, and wherein the selection in the displayed GUI moves the indicator on the adjustment bar to adjust the luminance in the area of the display adjacent to the image sticking area.

8. The display device of claim 7, wherein when the indicator is moved in a first direction within the adjustment bar, the controller is configured to increase the luminance corresponding to the surrounding area of the image sticking area, and when the indicator is moved in a second direction within the adjustment bar, the controller is configured to decrease the luminance corresponding to the surrounding area of the image sticking area.

9. The display device of claim 1, wherein the GUI includes a first menu item to adjust the luminance in the area of the display adjacent to the image sticking area to a first level and a second menu item to adjust the luminance in the area of the display adjacent to the image sticking area to a second level, the second level being lower than the first level.

10. The display device of claim 1, wherein the display includes at least a first light-emitting diode corresponding to a first wavelength and a second light-emitting diode corresponding to a second wavelength,
wherein the display screen corresponds to a screen in which the first light-emitting diode is activated among the first light-emitting diode and the second light-emitting diode, and
wherein the controller adjusts a luminance of the first light-emitting diode in the area of the display adjacent to the image sticking area.

11. A display device, comprising:
a network interface configured to establish wireless communication with an external device;
a display; and
a controller to control the display to remove image sticking on the display,
wherein the controller is configured to:
control the network interface to establish wireless communication with a prescribed external device,
execute an application for removing image sticking in accordance with a predetermined condition,
control the display to display a specific display screen,
control the network interface to receive information related to an image corresponding to the specific display screen from the prescribed external device, the prescribed external device establishing wireless communication with the network interface,
identify an image sticking area on the specific display screen based upon the received information related to the image, and
adjust a luminance in an area of the display corresponding to the identified image sticking area,
wherein the controller is configured to control the display to display a GUI for adjusting a luminance in an area of the display adjacent to the image sticking area, and
wherein the controller is configured to adjust the luminance in the area of the display adjacent to the image sticking area in accordance with a selection in the displayed GUI.

12. The display device of claim 11, wherein the information related to the image includes at least one of captured image data of the specific display screen, the captured image data being acquired by a camera of the prescribed external device, position data of an area associated with image sticking, shape data of an area associated with image sticking, luminance data of an area associated with image sticking, data related to a logo of a specific channel within the image, or data related to a specific indicator within the image.

13. The display device of claim 12, wherein the controller adjusts the luminance of the display based upon the luminance data to reduce a difference in luminance in the identified image sticking area and the area adjacent to the image sticking area to a predetermined difference level or lower.

14. The display device of claim 11, wherein the predetermined condition includes at least one of a condition of receiving a signal from a remote controller to execute an application for removing image sticking or a condition of receiving a predetermined signal from the prescribed external device through the network interface.

15. The display device of claim 11, wherein the controller controls the display to output a guidance message that guides a user to capture an image of the specific display screen by using the prescribed external device.

16. The display device of claim 11, wherein the controller controls the display to display the GUI to adjust a luminance of the display corresponding to an area of the display that surrounds the image sticking area, and
wherein the controller adjusts the luminance of the display in the area surrounding the image sticking area in accordance with a selection received through the GUI.

17. A display device, comprising:
a wireless communication interface configured to establish wireless communication with an external device;
a camera;
a display; and
a controller to control the camera and the display for removal of image sticking, wherein the controller is configured to:
execute an application for removing image sticking on a prescribed external device,
control the wireless communication interface to establish wireless communication with the prescribed external device,
activate the camera,
acquire an image of the prescribed external device by using the activated camera when an image capture command is detected, and
control the wireless communication interface to transmit information related to the acquired image to the prescribed external device which is connected via wireless communication.

18. The display device of claim 17, wherein, when the camera is activated, the controller outputs a guidance message on the display, the guidance message configured to guide a user to capture the image that includes a display screen of the prescribed external device.

19. The display device of claim 17, wherein the controller detects an area having a luminance equal to or lower than a predetermined luminance level from the image, and
wherein the information related to the image includes at least one of luminance data of the detected area within the image, position data of the detected area within the image, or shape data of the detected area within the image.

20. The display device of claim 17, wherein the controller outputs the acquired image to the display, wherein the controller detects a signal configured to select an image sticking area from the outputted image, and wherein the information related to the image includes information related to the selected image sticking area within the image.

* * * * *